US011947621B2

(12) United States Patent
Koren et al.

(10) Patent No.: US 11,947,621 B2
(45) Date of Patent: *Apr. 2, 2024

(54) SYSTEM AND METHOD FOR THE CREATION AND UPDATE OF HIERARCHICAL WEBSITES BASED ON COLLECTED BUSINESS KNOWLEDGE

(71) Applicant: Wix.com Ltd., Tel Aviv (IL)

(72) Inventors: Dan Koren, San Francisco, CA (US); Mor Philosoph, Tel Aviv (IL); Ilana Dreizis, Ramat Gan (IL); Igor Zelmanovich, Rehovot (IL); Eyal Sadeh, Beersheva (IL)

(73) Assignee: Wix.com Ltd., Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/717,077

(22) Filed: Apr. 10, 2022

(65) Prior Publication Data

US 2022/0237255 A1 Jul. 28, 2022

Related U.S. Application Data

(63) Continuation of application No. 16/901,162, filed on Jun. 15, 2020, now Pat. No. 11,301,541, which is a
(Continued)

(51) Int. Cl.
*G06F 9/44* (2018.01)
*G06F 3/0484* (2022.01)
(Continued)

(52) U.S. Cl.
CPC .......... *G06F 16/972* (2019.01); *G06F 3/0484* (2013.01); *G06F 16/9535* (2019.01);
(Continued)

(58) Field of Classification Search
CPC .. G06F 16/972; G06F 16/958; G06F 16/9535; G06F 16/2246; G06F 3/0484; G06Q 10/101
See application file for complete search history.

(56) References Cited

U.S. PATENT DOCUMENTS

| 6,219,680 B1 | 4/2001 | Bernardo et al. |
| 7,039,863 B1 | 5/2006 | Caro et al. |
| | (Continued) | |

FOREIGN PATENT DOCUMENTS

| CA | 2904813 | 9/2014 | |
| CN | 103443786 A | * 12/2013 | ........... G06F 16/957 |
| | (Continued) | | |

OTHER PUBLICATIONS

Emilio Ferrara, Web Data Extraction, Applications and Techniques: A Survey, 2014, pp. 1-41. https://arxiv.org/pdf/1207.0246.pdf (Year: 2014).*

(Continued)

*Primary Examiner* — Mongbao Nguyen
(74) *Attorney, Agent, or Firm* — HEIDI BRUN ASSOCIATES LTD.

(57) ABSTRACT

A system and method for generating questionnaires as part of building a website within a website building system (WBS). The method includes gathering data from data sources internal and/or external to the WBS, analyzing the gathered data to determine what information is required to further the website building process and what of the required information is to be collected either directly or indirectly from the user via the questionnaires, dynamically producing the questionnaires and running them to receive the collected information directly or indirectly from the user, and selecting whether to integrate the collected information into the
(Continued)

website building process or to use the collected information for further gathering, analyzing and dynamically producing.

18 Claims, 24 Drawing Sheets

Related U.S. Application Data continuation of application No. 16/120,324, filed on Sep. 3, 2018, now Pat. No. 10,685,080, which is a continuation of application No. 15/607,586, filed on May 29, 2017, now Pat. No. 10,073,923.

(60) Provisional application No. 62/342,955, filed on May 29, 2016, provisional application No. 62/346,581, filed on Jun. 7, 2016.

(51) Int. Cl.
| | | |
|---|---|---|
| G06F 9/445 | (2018.01) | |
| G06F 9/455 | (2018.01) | |
| G06F 16/9535 | (2019.01) | |
| G06F 16/958 | (2019.01) | |
| G06Q 10/101 | (2023.01) | |
| G06F 16/22 | (2019.01) | |

(52) U.S. Cl.
CPC ......... *G06F 16/958* (2019.01); *G06Q 10/101* (2013.01); *G06F 16/2246* (2019.01)

(56) References Cited

U.S. PATENT DOCUMENTS

| | | | |
|---|---|---|---|
| 7,668,913 | B1 | 2/2010 | Underwood et al. |
| 7,779,352 | B1 | 8/2010 | Underwood et al. |
| 7,945,578 | B2 | 5/2011 | Leung |
| 7,984,374 | B2 | 7/2011 | Caro et al. |
| 8,126,766 | B2 | 2/2012 | Alexander |
| 8,229,977 | B1 | 7/2012 | Anderson |
| 8,861,017 | B2 | 10/2014 | O'Brien-Strain |
| 9,008,416 | B2 | 4/2015 | Movellan |
| 9,031,988 | B2 | 5/2015 | Tymoshenko |
| 9,087,035 | B1 | 7/2015 | Bandaru |
| 9,208,132 | B2 | 12/2015 | Deblois |
| 9,275,641 | B1 | 3/2016 | Gelfenbeyn |
| 9,342,601 | B1 | 5/2016 | Finkelstein |
| 9,639,263 | B2 | 5/2017 | Bloch |
| 10,521,492 | B2 * | 12/2019 | Homer ................ A24F 40/50 |
| 10,796,079 | B1 * | 10/2020 | Bradley ............ H04L 43/0852 |
| 2004/0123244 | A1 | 6/2004 | Campbell |
| 2006/0167772 | A1 | 7/2006 | Zilberman |
| 2007/0061408 | A1 | 3/2007 | Saras |
| 2008/0052668 | A1 | 2/2008 | Craig |
| 2009/0281896 | A1 | 11/2009 | Brooks |
| 2010/0199197 | A1 | 8/2010 | Faletski |
| 2010/0299325 | A1 | 11/2010 | Tzvi |
| 2011/0054960 | A1 * | 3/2011 | Bhatia ................ G06F 16/958 |
| | | | 715/243 |
| 2011/0106731 | A1 | 5/2011 | Pearson |
| 2012/0144327 | A1 | 6/2012 | Johnson |
| 2013/0044194 | A1 | 2/2013 | Tilt |
| 2013/0167012 | A1 | 6/2013 | Fischer |
| 2013/0219263 | A1 | 8/2013 | Abrahami |
| 2013/0232403 | A1 | 9/2013 | Abrahami |
| 2013/0297553 | A1 | 11/2013 | Bierner |
| 2014/0040134 | A1 | 2/2014 | Ciurea |
| 2014/0047413 | A1 | 2/2014 | Sheive |
| 2014/0096013 | A1 | 4/2014 | Grosz |
| 2014/0108373 | A1 | 4/2014 | Abrahami |
| 2014/0149845 | A1 | 5/2014 | Ansel |
| 2014/0173563 | A1 | 6/2014 | Dias |
| 2014/0180766 | A1 | 6/2014 | Tetreault |
| 2014/0282218 | A1 | 9/2014 | Kaufman et al. |
| 2014/0365555 | A1 | 12/2014 | Jwalanna |
| 2014/0372184 | A1 | 12/2014 | Blumenthal |
| 2015/0006333 | A1 | 1/2015 | Silveira |
| 2015/0026172 | A1 | 1/2015 | Adekile |
| 2015/0074516 | A1 | 3/2015 | Ben-Aharon et al. |
| 2015/0140526 | A1 | 5/2015 | Marino |
| 2015/0154164 | A1 | 6/2015 | Goldstein |
| 2015/0154934 | A1 | 6/2015 | Spitzer |
| 2015/0220312 | A1 | 8/2015 | Jemiolo |
| 2015/0277681 | A1 * | 10/2015 | Isaacson ............... G06F 16/958 |
| | | | 715/780 |
| 2015/0310124 | A1 | 10/2015 | Ben-Aharon et al. |
| 2015/0348071 | A1 | 12/2015 | Cochrane |
| 2015/0379047 | A1 | 12/2015 | Har-Noy |
| 2016/0041957 | A1 | 2/2016 | Finsterwald |
| 2016/0062635 | A1 | 3/2016 | Feit |
| 2016/0110313 | A1 | 4/2016 | Prakash |
| 2016/0124839 | A1 | 5/2016 | Mordo et al. |
| 2016/0125082 | A1 | 5/2016 | Katic |
| 2016/0180242 | A1 * | 6/2016 | Byron .................... G06N 5/041 |
| | | | 706/11 |
| 2016/0232141 | A1 | 8/2016 | Fischer |
| 2016/0259775 | A1 | 9/2016 | Gelfenbeyn |
| 2016/0342315 | A1 | 11/2016 | Jaramillo, III |
| 2017/0024363 | A1 * | 1/2017 | Tocchini ................. G06N 7/01 |
| 2017/0046317 | A1 | 2/2017 | Geva et al. |
| 2017/0075661 | A1 | 3/2017 | Gulwaru |
| 2017/0098178 | A1 | 4/2017 | Belhaj Amor |
| 2017/0103050 | A9 | 4/2017 | Underwood |
| 2017/0109442 | A1 | 4/2017 | Berk |
| 2017/0109455 | A1 * | 4/2017 | Berk .................... G06F 16/3344 |
| 2017/0220971 | A1 | 8/2017 | Giammaria |
| 2017/0242915 | A1 | 8/2017 | Torisawa |
| 2017/0337321 | A1 | 11/2017 | Hoford |
| 2018/0011608 | A1 | 1/2018 | Saragossi |

FOREIGN PATENT DOCUMENTS

| | | | | |
|---|---|---|---|---|
| JP | 2014514634 | A * | 6/2014 | ........... G06F 16/957 |
| WO | 2015092079 | A1 | 6/2015 | |

OTHER PUBLICATIONS

Elisabeth Cuddihy, From Web Designer to Researcher: Using Experiment Patterns to Research Web Design Decisions, 2012, pp. 1-10. https://ieeexplore.ieee.org/stamp/stamp.jsp?tp=&arnumber=6408636 (Year: 2012).*
Elisabeth Cuddihy, From Web Designer to Researcher: Using Experiment Patterns to Research Web, 2012, pp. 1-10. https://ieeexplore.ieee.org/stamp/stamp.jsp?tp=&arnumber=6408636 (Year: 2012).*
International Search Report for corresponding PCT application PCT/IB2017/053153 dated Oct. 2, 2017.
Adobe muse, Building your first website, 2014, pp. 1-48. https://helpx.adobe.com/pdf/muse_reference.pdf (Year: 2014).
Eric Sharp, How to Design the Structure of a Website with Sitemapping in Eight Steps, 2014, pp. 1-11. https://www.protofuse.com/blog/details/how-to-design-structure-website-with-sitemapping/ (Year: 2014).
Rachel Shillcock, Building Content Hierarchy Through Design, 2013, pp. 1-7. https://webdesign.tutsplus.com/articles/building-content-hierarchy-through-design--webdesign-14969 (Year: 2013).
Cameron Chapman, 45 Incredibly Useful Web Design Checklists and Questionnaires, 2009, pp. 1-18, https://www.smashingmagazine.com/2009/06/45-incredibly-useful-web-design-checklists-and-questionnaires/ (Year: 2009).
Umi Kalsom Yusof, Balancing between Usability and Aesthetics of Web Design, 2010, pages https://ieeexplore.ieee.org/stamp/stamp.jsp?tp=&arnumber=5561310 (Year: 2010).
Charles J. Cooper, Web-based data collection: detailed methods of a questionnaire and data gathering tool, 2006, pp. 1-11, https://www.ncbi.nlm.nih.gov/pmc/articles/PMC1343557/ (Year:2006).
Supplementary European Search Report for corresponding European application 17 80 5971.3 dated Dec. 16, 2019.
Kundan Singh, Building Communicating Web Applications Leveraging Endpoints and Cloud Resource Service, 2013, pp. 486-493. https://ieeexplore.ieee.org/stamp/stamp.jsp?tp=&arnumber=6676731 (Year: 2013).

(56) References Cited

OTHER PUBLICATIONS

Waralak, User Persona Roles in the End-user Web Developing Approach, 2012, pp. 415-420. https://ieeexplore.ieee.org/stamp/stamp.jsp?tp=&arnumber=6215394. (Year: 2012).

Goulas Charalampos, Intelligent Information Gathering System in Cultural Content Dissimination, 2014, pp. 1-5. https://ieeexplore.ieee.org/stamp/stamp.jsp?tp=&arnumber=6878807. (Year: 2014).

Beewits, A Complete 70+ Website Design Questionnaire to Impress Clients, Mar. 2016, pp. 1-21. https://www.beewits.com/website-design-questionnaire/ (Year: 2016).

* cited by examiner

SYSTEM AND METHOD FOR THE CREATION AND UPDATE OF HIERARCHICAL WEBSITES BASED ON COLLECTED BUSINESS KNOWLEDGE

CROSS REFERENCE TO RELATED APPLICATIONS

This application is a continuation application of U.S. patent application Ser. No. 16/901,162, filed Jun. 15, 2020, which is a continuation application of U.S. Ser. No. 16/120,324, filed Sep. 3, 2018, which is a continuation application of U.S. patent application Ser. No. 15/607,586 filed May 29, 2017, which claims priority from U.S. provisional patent applications 62/342,955 filed May 29, 2016, and 62/346,581 filed Jun. 7, 2016, all of which are incorporated herein by reference.

FIELD OF THE INVENTION

The present invention relates to website building systems generally and to automated systems based on knowledge in particular.

BACKGROUND OF THE INVENTION

Website building systems are used by both novices and professionals to create interactive websites. Existing website building systems are based on a visual editing model and most website building system providers typically provide multiple templates, with a template possibly including a complete sample website, a website section, a single page or a section of a page.

A website building system may be a standalone system, or may be embedded inside a larger editing system. It may also be on-line (i.e. applications are edited and stored on a server), off-line or partially on-line (with websites being edited locally but uploaded to a central server for publishing).

The website building system may handle entities such as applications (such as a visually designed application (e.g. a website) consisting of pages, containers and components), pages (each of which are separately displayed and contain components) and components. The components may be arranged in a hierarchy of containers (single-page and multi-page) inside the page containing atomic components. A multi-page container may display multiple mini-pages, each of which containing components.

Pages may also include list applications (such as discussed in US Patent Publication No. US 2014/0282218 entitled "Website Building System Integrating Data Lists with Dynamic Customization and Adaptation" published 18 Sep. 2014 and assigned to the common assignee of the present invention) and third party applications. Components may include simple (atomic) components such as text objects, buttons, frames, decorations, images and video players, composite/container components (such as galleries and sliders) as well more complex components such as third party applications noted above or entire e-shops.

Pages may use templates, general page templates or component templates. Specific cases for templates include the use of an application master page containing components replicated in all other regular pages, and the use of an application header/footer (which repeats on all pages). Templates may be used for the complete page or for page sections. The system may provide inheritance between templates, pages or components, possibly including multi-level inheritance, multiple inheritance and diamond inheritance (i.e. A inherits from B and C and both B and C inherit from D). The arrangement of components inside a page is called a layout.

The website building system provider may provide templates ranging from the very generic (e.g. mobile site, e-store) through the more specific (e.g. law office, restaurant, florist) to the highly specific ones (e.g. a commercial real-estate law office or a Spanish tapas restaurant). Such templates are typically stored in a repository accessible to users of the website building system and are typically classified according to business type, sub-type or industry. Templates may also be created (and classified) according to style, color range or other parameters and not just according to business type.

Users have the option to start with an empty site (essentially a "blank page" template) but may typically start with an actual template. Thus a typical first experience for a user with such a website building system would be choosing a template (e.g. according to style or industry type/sub-type). The user then edits it via the visual editor, including editing of content, logic, layout and attributes. Such editing would include (in particular) adapting the template and its elements to the details of the user's business. Once he has finished editing, the user publishes the modified site.

It will be appreciated, that various pieces of information (such as the business name or a description of the management team) are included in multiple locations in the template's pages. Thus, the user may have to change the business name (for example) in multiple places throughout the template.

Furthermore, some template elements (e.g. a generic product page) may appear multiple times, with each appearance displaying the details of a different instance of an underlying entity (e.g. different products offered on the site). Such multiple instances may be manually specified (e.g. the details of different persons in the company's management team) or dynamically derived from an external database (e.g. product details from the "products on sale" database).

Thus the website building system may allow the template designer to specify fields (also known as "placeholders") for the insertion of values inside the templates, such as {CompanyName}, {ProductName}, {ProductPrice} etc. The user may then specify the values for the fields defined in the template selected for the website.

The website building system may also allow the user to enter simple or complex values (e.g. text and images), as well as additional (non-field) information such as the selection of included pages or website areas, colors, style information, links, formatting options, website display options, decoration elements (such as borders and backgrounds) etc.

The website building system also may also allow the user to enter some of this additional information before selecting a template, and use this information to help in selecting a template (i.e. by narrowing the set of proposed templates). For example, the user may select a certain generic color scheme (e.g. pastel colors) or style (e.g. business/formal), and the website building system may then use this selection to narrow the set of proposed templates.

Furthermore, the website building system may display a series of views or questionnaires to allow the user to enter values or selections (for both the defined fields and the additional information above). It may then create a connection (or binding) between a multiple-instance element of the template (as described above) and an internal or external database which provides the data instances used to generate the displayed instances.

Once a template has been selected and its fields and additional information have been specified (e.g. through the questionnaires or through binding to data sources), existing website building systems may generate the website containing the combined information. The user may then publish the site (through the website building system or otherwise). Some systems may further allow the user to edit and customize the generated site. Such editing may include re-running (some or all) of the sequence of questionnaires used to enter values or select options for the site. The user may enter modified values for some of the values or options, and the site would be regenerated according to the modified values. The editing may also include performing visual editing of the generated site. Such editing may be limited, or allow the full gamut of editing operations to be performed on the site. The editing may further include modifying specific attributes of the generated site (e.g. the background or border type of a given component).

Other website building systems of the prior art as described herein above, have been described in the following patents: U.S. Pat. Nos. 7,668,913, 7,779,352, 6,219,680, 7,984,374 and 7,039,863.

SUMMARY OF THE PRESENT INVENTION

There is therefore provided, in accordance with a preferred embodiment of the present invention, a method for generating questionnaires as part of building a website within a website building system (WBS). The method includes gathering data from data sources internal and/or external to the WBS, analyzing the gathered data to determine what information is required to further the website building process and what of the required information is to be collected either directly or indirectly from the user via the questionnaires. The method also includes dynamically producing the questionnaires and running them to receive the collected information directly or indirectly from the user, and selecting whether to integrate the collected information into the website building process or to use the collected information for further gathering, analyzing and dynamically producing.

Moreover, in accordance with a preferred embodiment of the present invention, the internal data sources include user information, family of the user, industry of the user, editing history of the user, business intelligence of the user's business, website of the user, content elements of the website of the user, layout elements of the website of the user, other websites of the user, websites of other users, previous answers of the user and of other users, or previous questionnaire user experience data.

Further, in accordance with a preferred embodiment of the present invention, the external data sources include crowd-sourced data, questionnaire marketplaces, industry standard databases, various web services, external websites belonging to the user, external websites not belonging to the user, social media presence of the user, other social media sites or services.

Still further, in accordance with a preferred embodiment of the present invention, the analyzing includes using AI/ML (artificial intelligence/machine learning), answer analysis, industry analysis and/or natural language processing analysis.

Moreover, in accordance with a preferred embodiment of the present invention, the dynamically producing also includes generating questions for the user to provide information, storing the generated questions in a database, merging questionnaires from internal and external sources, selecting questions for a new instance of a questionnaire, and/or designing layout of the new questionnaire.

Further, in accordance with a preferred embodiment of the present invention, the questions are regular questions or guiding questions. In response to the guiding questions, the method performs one of the following: ordering a sequence of questionnaires, choosing new questions from the database of questions, ordering questions to be added to the questionnaire, and choosing default answers to selected questions.

Still further, in accordance with a preferred embodiment of the present invention, the generating questions, merging questionnaires, selecting questions, and designing questionnaire layouts include activating an expert system, a rules engine or an AI/ML engine.

There is also provided, in accordance with a preferred embodiment of the present invention, a system for generating questionnaires as part of building a website within a WBS. The system includes data gatherer/analyzers, a questionnaire creator and a questionnaire runner. The data gatherer/analyzers gather data from data sources internal and external to the WBS and analyze the gathered data to determine what information is required to further the website building process and what of the required information is to be collected either directly or indirectly via the questionnaires. The questionnaire creator dynamically produces the questionnaires and runs them to receive the collected information directly or indirectly from the user. The questionnaire runner selects whether to integrate the collected information into the website building process or to use the collected information for the data gatherer/analyzers, the questionnaire creator and the questionnaire runner.

Moreover, in accordance with a preferred embodiment of the present invention, the internal data sources include a questionnaire type repository, a user information repository, a family/industry repository, an editing history repository, a business intelligence repository, a WBS site repository, a CER (content element repository), a LER (layout element repository), a questionnaire type repository, an editing history repository, a filled questionnaires repository and/or an ML/AI (machine learning/artificial intelligence) repository.

Further, in accordance with a preferred embodiment of the present invention, the data gatherer/analyzers include an internal data gatherer, an external data gatherer, an AI/ML (artificial intelligence/machine learning) engine, an answer analyzer, an industry analyzer, a natural language engine, a crowd source data analyzer, an external website importer/analyzer, a user data analyzer, a BI analyzer and/or an EH (editing history) analyzer.

Still further, in accordance with a preferred embodiment of the present invention, the questionnaires are regular questions or guiding questions. The questionnaire runner also, in response to the guiding questions, orders a sequence of questionnaires, chooses new questions from the database of questions, orders questions to be added to the questionnaire, and/or chooses default answers to selected questions.

Finally, in accordance with a preferred embodiment of the present invention, the questionnaire runner includes a rule engine and an expert system. The rule engine controls adjustments to questionnaires via a set of predefined rules. The expert system controls adjustments to questionnaires via analysis of at least one of internal and external information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
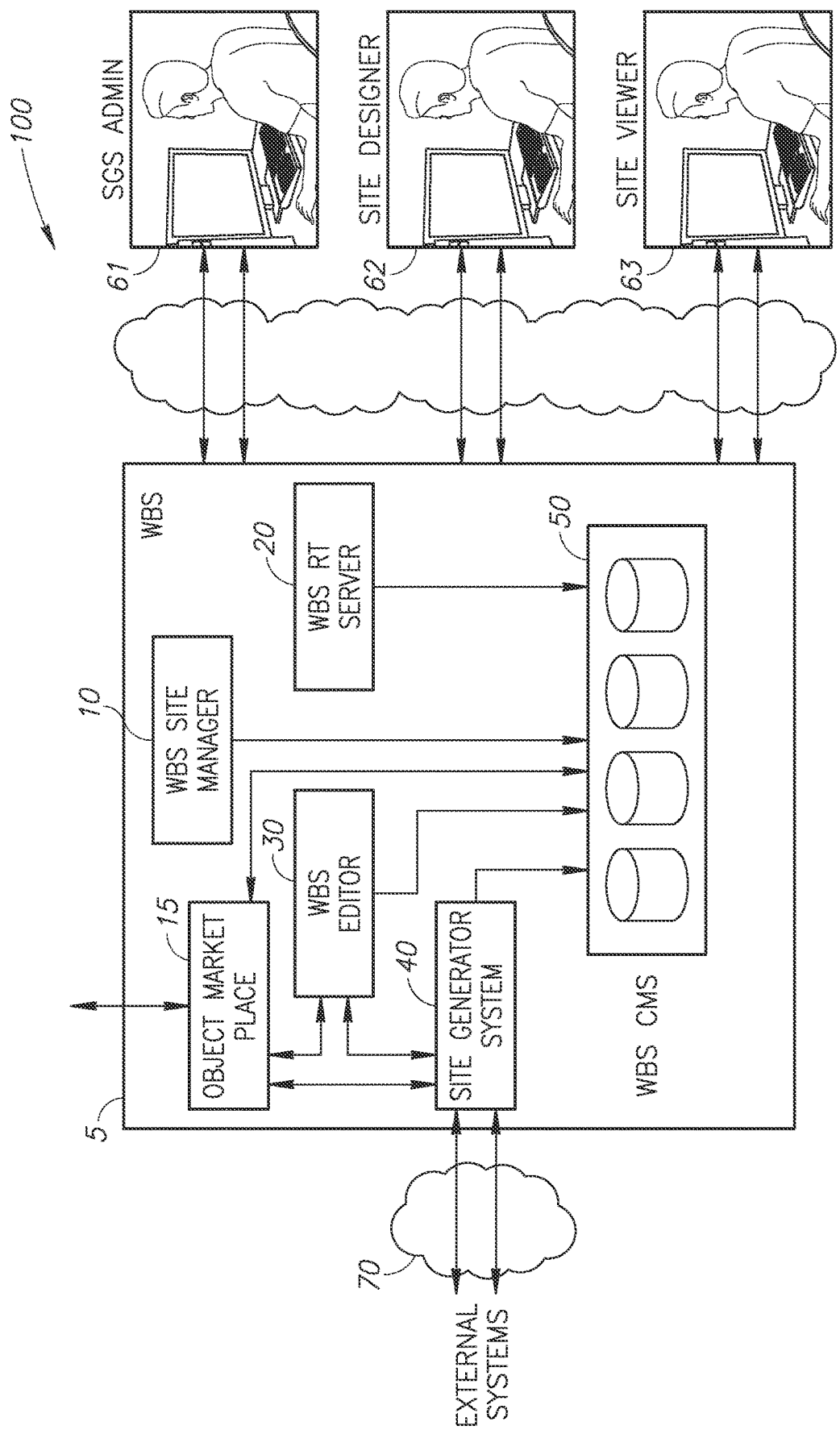
FIG. 1 is a schematic illustration of a system for the creation and update of hierarchical websites based on collected business knowledge; constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that existing website building systems as described herein above, do not support the user in the actual creation of content (including website text elements in particular), and do not provide sufficient guidance and recommendations as to the best practices in the creation of websites for specific purposes (such as a specific business or industry). Nor do they provide comprehensive support for the user in importing and arranging data from external sources and integrating it with the rest of the site.

Applicants have further realized that although existing website building systems do typically provide a set of site templates (including industry-specific templates), once the designer has begun modifying the template, he is "on his own" since the designer has deviated from the original template, and the website building system does not provide further guidance and support in the site editing process. In particular, in existing systems, the user has no way of knowing if the visual changes made to the template preserve the quality of the site. Once the designer has deviated from an original template provided by the system he will typically be limited to performing further updates through the visual editing interface only, and will not be able to return and use the structured (questionnaire) interface for further updates.

In existing systems which provide templates, the templates are typically not flexible or adaptable enough to support different sites which may have substantially different amounts of content data.

Applicants have also realized that existing website building systems do not leverage the wisdom of the crowds. A website building system serving millions of users gathers a substantial amount of information on how templates are used and how sites are edited. Existing systems do not collect this information, nor do they leverage the information to help new designers in designing their websites.

Applicants have realized that the above mentioned issues may be overcome by a website building system that includes a component based site generation system that can generate a site based on the integration and analysis of information from multiple sources including information entered by the user, information pre-specified within the system and information retrieved from external sources etc. The site generation system may allow for the rapid generation and maintenance of websites while minimizing or eliminating the required manual editing although it may allow some editing where necessary via a (possibly adapted) visual editor.

Applicants have further realized that the architecture of such a system should include two flexible and interconnected hierarchies, having content elements which describe the user's business or organization, and layout elements which represent the displayed site content. A higher-level layout element which contains internal layouts (and possibly other components) may be known as a layout group and a lower-level layout (which does not contain other layout elements) may be known as an atomic layout element.

It will be appreciated that higher level content elements may include multi-instance content elements (such as a "team" content element which contains multiple similar "team member" content elements). Such content elements are typically mapped to repeater layout elements (as described in more detail herein below), which may include header, footer and list member elements. The per-list-member element of the repeater would be duplicated for each instance in the multi-instance content element.

The system should therefore also include a content element repository storing content elements which may be filled based on a number of sources, including user answers to questionnaires and information pre-defined in the system together with other business identifying information gleaned by the website building system such as user location determined from a GPS or IP address, information extracted through the user's smartphone camera or sensors and client device and software details. Such information (including underlying media resources such as background images and fixed texts) is typically stored in the content management system associated with the website building system. Other information stored may include information extracted from on-line sources related to the user including specifically websites and other on-line presence assets belonging to the same or other users (deployed on the current or other platforms), as well as information extracted from off-line sources related to the user, e.g. manually provided by the website building system personnel or extracted from off-line documentation.

Other content may include crowd-sourced information extracted from other sites or on-line presence assets built by other users, subject to the relevant privacy and intellectual property laws (such as copyright and trademark laws) governing use of such information. These could be (for example) other users in the same or similar industries.

The system may analyze the data to detect (or provide a limited set of possibilities) relevant business information. For example, the system may gather information about nearby businesses and attempt to identify information about the user's own business based on business directory information.

The system may then use pre-defined layout elements to create the generated site that is to be presented to the user. The system may further allow the editing of the generated site using a visual editor that is part of the website building system enabling the designer to precisely customize the generated site. The system may further allow a bi-directional flow of changes between the generated site and the website building system.

Thus in a typical scenario, a user setting up a website for the first time may be asked by the website building system via questionnaire, a series of questions related to his line of business. The answers may all be stored and analyzed with each answer adding to the accumulated knowledge of the website building system itself. The initial questions could be (for example) an exact business type definition, which would be used to generate the series of questionnaires containing the questions.

The combined answers may be stored as content elements in a specific content elements repository (as described in more detail herein below). The website building system may then create multiple versions of the site elements (e.g. pages or page elements) which incorporate information from the content elements repository and use multiple layout options (layout elements). These layout options are presented to the user who selects his favorite layout (layout elements) which is stored in a separate layout repository. The system may then generate the actual website based on the layout selection. Finally, the user may directly edit the generated site with any changes affecting both the content element repository and the layout element repository as described in more detail herein below. Such editing may include the editing of content, logic, layout and attributes.

In another possible embodiment, the user may provide the system with key details which allow the system to retrieve and collect information about the user. Such key details could include, for example, information identifying the business (e.g. the business name or address) or an existing business website. The system could use such key details to retrieve information about the business, and would possibly construct questionnaires to complete any details which weren't found by the retrieval process.

It will also be appreciated that the system may use a number of methods to combine the possible layout elements offered to the user for evaluation into coherent and high-quality visual layouts.

The system may arrange the layout elements in multiple pages, or create a single page site (including intra-page navigation aids such as side mini-menus or section navigation buttons typically included in such single page sites). The system may also generate multiple layout element placements by generating the (numerous) possible page permutations, and filtering the possible permutations according to layout and aesthetical rules as described in more detail herein below. The system may generate all theoretical possible permutations, or enforce certain structural limitations even before filtering (e.g. pre-classifying layout elements into page header, side menu, body and page footer, and only placing layout elements according to their pre-defined roles). The system may also generate multiple permutations at multiple levels, e.g. generate multiple layout element variations, multiple layout element arrangements in each website page and multiple page arrangements.

Reference is now made to FIG. 1 which illustrates a system 100 for the creation and update of hierarchical websites based on collected business knowledge according to an embodiment of the present invention.

FIG. 1 may comprise a website building system 5 in communication with client systems operated by a SGS (site generation system) administrator 61, site designer 62, site viewer 63 and with external systems 70. Website building system 5 may further comprise a WBS (website building system) site manager 10, an object marketplace 15, a WBS (website building system), a RT (runtime) server 20, a WBS (website building system) editor 30, a site generation system 40 and a WBS content management system 50. It will be appreciated that in the discussion herein below site viewers 63 may also include site designers 62.

It will be appreciated that collected business knowledge refers to the collection of relevant content to the website being created which may be gleaned from external systems 70 as described in more detail herein below.

It will also be appreciated that administrator 61 may typically be an employee of the pertinent website building system vendor and may create and maintain the various system elements such as questionnaires, content elements, layout elements, layout groups, preset page sections and design kits as discussed in more detail herein below. Site designer 62 may use website building system 5 to build his site for use by site viewers 63. Site designer 62 may typically be an external site designer or consultant, though the website building system vendor may employ site designers 62, for example for the creation of template sites for inclusion in the website building system. Site viewers 63 may only view the system. In alternative embodiments to the present invention, site viewers 63 may be allowed some form of site input (such as talkback sending or blog article posting). In another embodiment, system 100 may allow a limited site generation system 40 that may allow a viewer 63 to build (for example) a user page within a club site.

WBS site manager 10 may be used by site designer 62 to manage his created sites (for example to handle payment for the site hosting or set permissions for site access).

WBS RT (runtime) server 20 may handle the run-time access by (possibly numerous) site viewers 63. Such access may be read-only, but may also involve interactions which may affect back-end data (such as purchasing a product or posting a comment in a blog). In some embodiments of system 100, WBS RT server 20 may also serve pages to site designers 62 (e.g. when previewing the site, or as a front-end to WBS editor 30).

Object marketplace 15 may allow for the trading of objects (such as element types) between object vendors and site designers 62 through website building system 5 as described in more detail herein below.

WBS editor 30 may allow site designer 62 to edit layout solutions presented to him including the editing of content, logic, layout and attributes i.e. may allow site designer 62 to adapt a particular template and its elements according to his business or industry.

Site generation system 40 may create the actual site based on the integration and analysis of information entered by site designer 62 (via questionnaires as described in more detail herein below), pre-specified and stored in content management system 50 together with information from external sources 70 and internal information held within CMS 50 that may be gleaned from use of the website information system by other designers. In an alternative embodiment, CMS 50 may be held in local storage or locally by site designer 62.

Figure 2:
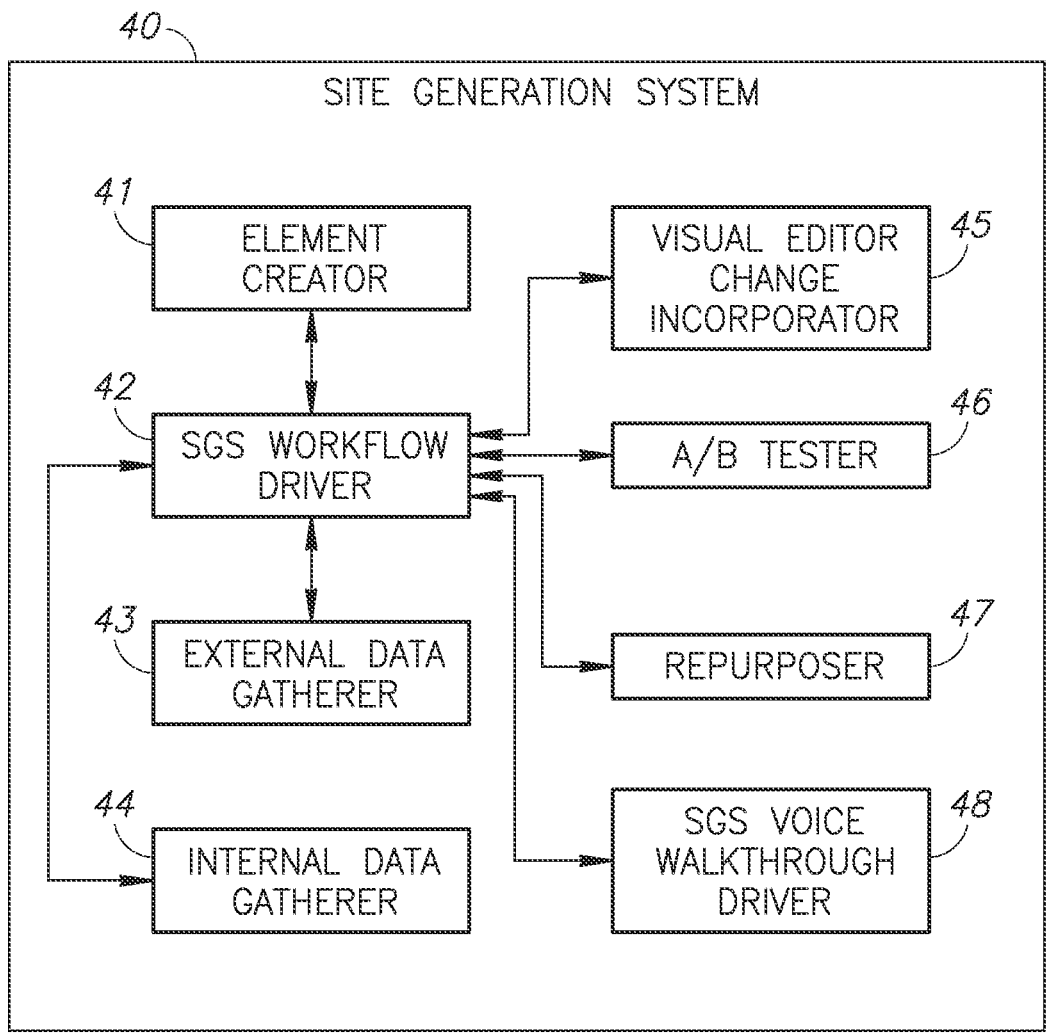
FIG. 2 is a schematic illustration of the elements of the site generation system of FIG. 1; constructed and operative in accordance with the present invention.

Reference is now made to FIG. 2 which illustrates the elements of site generation system 40. Site generation system 40 may comprise an element creator 41, a SGS (site generator system) workflow driver 42, an external data gatherer 43, an internal data gatherer 44, a visual editor change incorporator 45, an A/B tester 46, a repurposer 47 and an SGS voice walkthrough driver 48. The functionality of these elements is discussed in more detail herein below.

Site generation system 40 may set up content and layout elements for SGS admin 61 and site designer 62, may run the questionnaires and gather and analyze data to detect (or provide a limited set of possibilities) further user and business information. For example, site generation system 40 may gather information about nearby businesses and attempt to identify the user's own business based on business directory information.

It will be appreciated that site generation system 40 may generate multiple possible visual representations of the information contained in a content element repository, present them to the user, and based on the user's feedback create a website representing the displayed site content and layout information. The generated layout element arrangements can be defined using combinations of preset page sections as further described in more detail herein below.

Figure 3A:
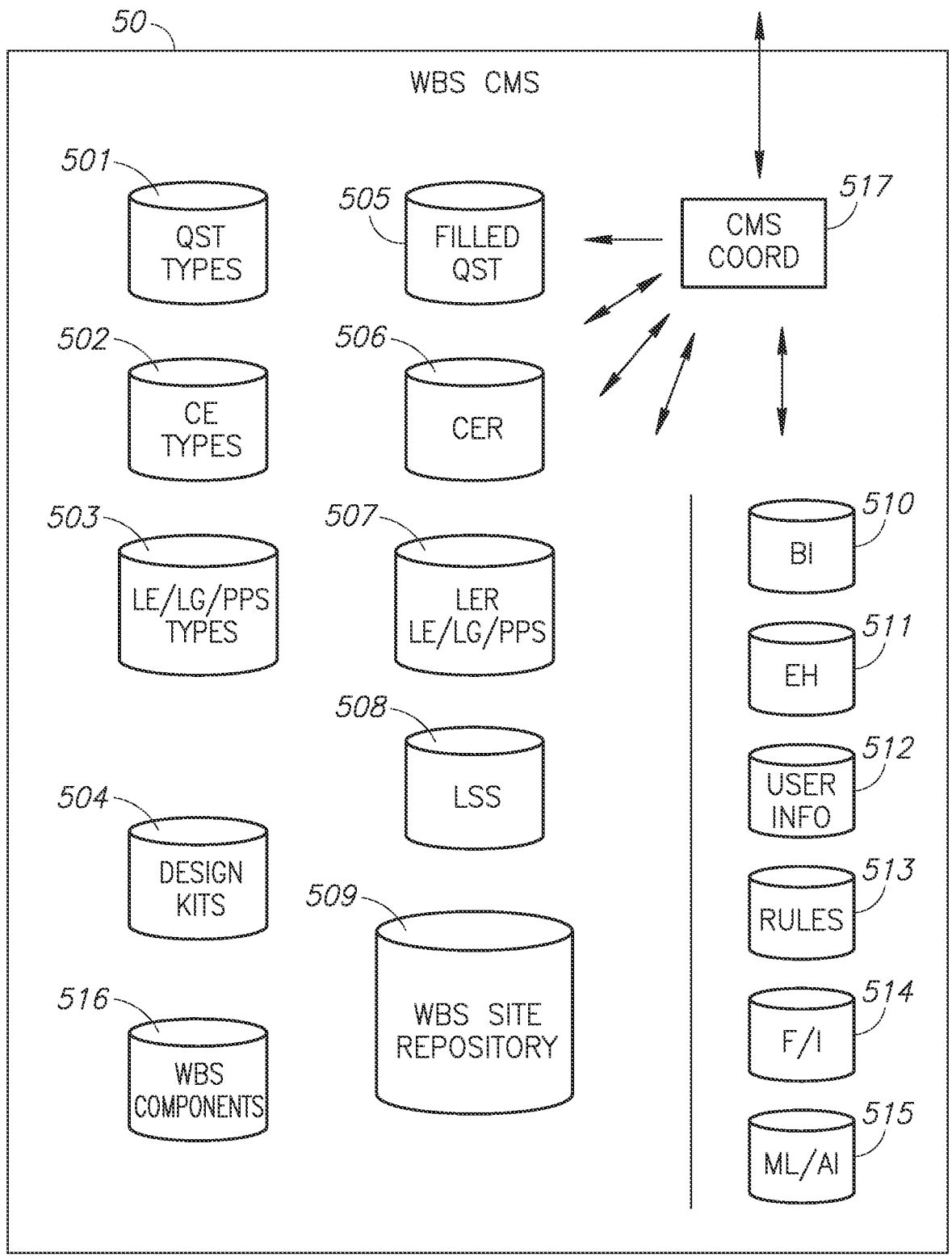
FIG. 3A is a schematic illustration of the elements of the content management system of FIG. 1; constructed and operative in accordance with the present invention.
Figure 3B:
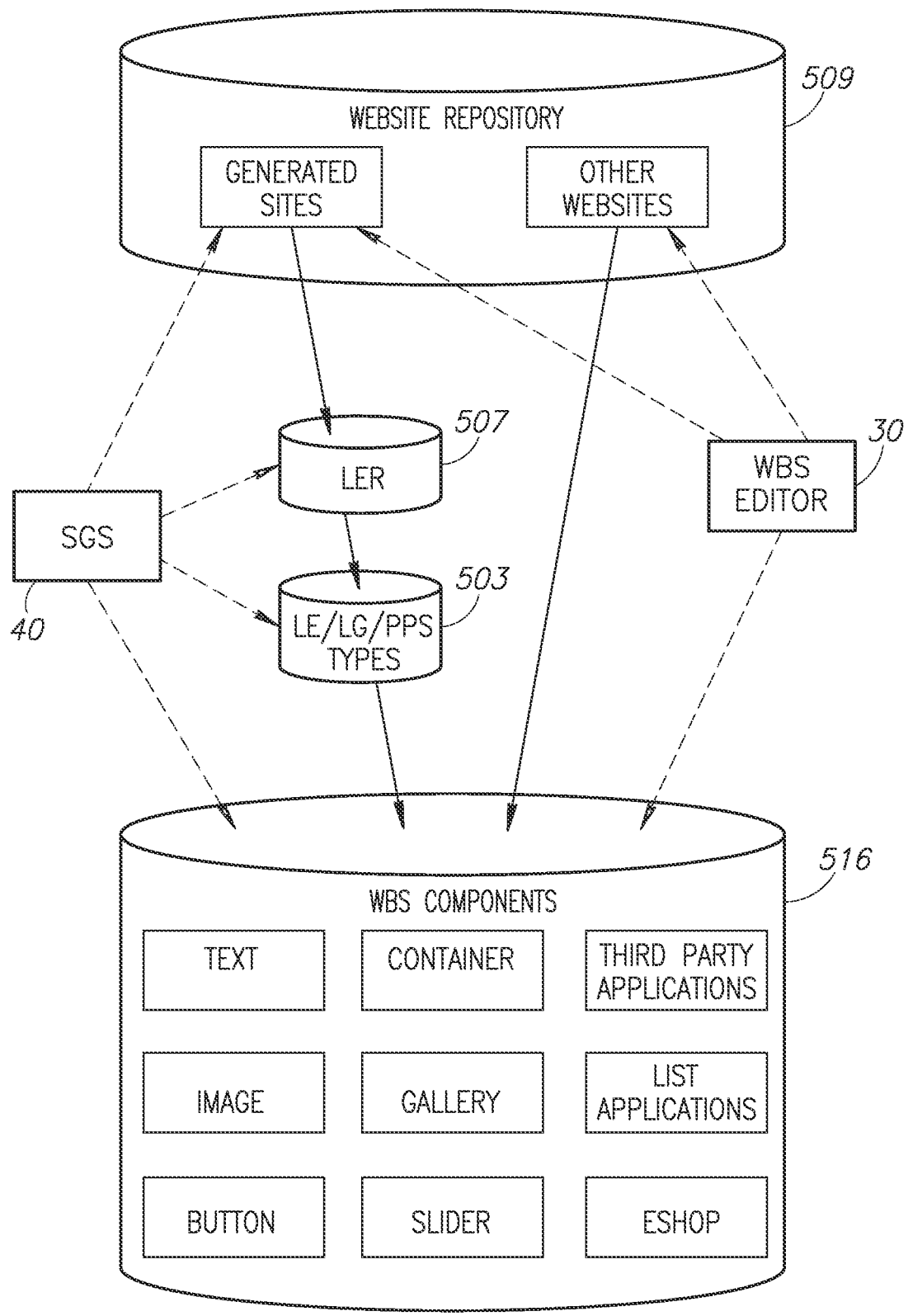
FIG. 3B is a schematic illustration of the relationships between the repositories FIG. 3A and their editing options, constructed and operative in accordance with the present invention.

Content management system 50 may hold all forms of content and layout pertinent to website building system 5 as is illustrated in FIG. 3A to which reference is now made. Content management system 50 may comprise a questionnaire type repository 501, a content element type repository 502, a LE (layout element)/LG (layout group)/PPS (preset page section) type repository 503, a design kit repository 504, a filled questionnaires repository 505, a CER (content element repository) 506, a LER (layout element repository) 507, a layout selection store 508, a WBS site repository 509, a business intelligence repository 510, an editing history repository 511, a user information repository 512, a rules repository 513, a family/industry repository 514, a ML/AI (machine learning/artificial intelligence) repository 515 a WBS (website building system) component repository 516 and a CMS coordinator 517 to coordinate data between CMS 50 and system 100.

WBS site repository 509 may include both generated sites (created by site generation system 40) and other WBS sites (created by WBS editor 30 or other means, such as direct conversion from other systems). It will be appreciated that the categories are not distinct, as generated sites may be further edited by WBS editor 30.

WBS component repository 516 may include the website building system 5 component type definitions, i.e. may describe the parameters and properties of the various element types (such as text component, media components, containers and complex components such as galleries, sliders and third party applications). These component type definitions are in turn used by WBS editor 30 to provide interactive direct editing of sites (e.g. allowing visual WYSIWYG editing of pages) as described in more detail herein below. These component types are also used as the basic building blocks of the various layout element types described above (layout elements, layout groups and preset page sections).

CMS 50 may be implemented using a single database or multiple databases, based on one or more servers or server farms. The content of CMS 50 may be apportioned based on a logical relation (e.g. keeping information related to a single site together), geography, connectivity (e.g. available bandwidth), security, data profile, access profile or other parameters.

It will be appreciated that both CER 506 and LER 507 may consist of hierarchical collections of data elements which are created as instances of generic element types. It will further be appreciated that reference to CER 506 and LER 507 refers to specific collections of elements related to a given site (or possibly to a set of related sites).

Both repositories 506 and 507 may implement an arbitrary hierarchical structure, a limited one (e.g. consisting of a given number of levels only) or a specific/fixed one (e.g. consisting of a page/preset page sections/layout element hierarchy only). In another embodiment, system 100 may use a strict 3-level hierarchy such as page→layout group→layout element or page→preset page sections→layout elements.

Each of repositories 506 and 507 may also implement inheritance between their elements and element types, including multi-level inheritance, multiple inheritances and diamond inheritance. Such inheritances may include type-to-type inheritance as well as type-to-instance inheritance.

It will be appreciated that CER 506 and LER 507 are the specific repositories for the content element and layout element instances for the site(s) being generated, and not the total repositories of all available (e.g. pre-generated) content element and layout element types.

CER 506 may consist of a hierarchical arrangement of content elements. Each content element is a strongly-typed record describing actual business-related entity. For example, a team member content element may contain an employee's name, a picture and a job description.

A content element consists of fields and (single or multiple) occurrences of contained content elements. For example, a business content element may contain a single contact detail content element and multiple employee content elements.

It will be appreciated that a layout element type definition (as described in more detail herein below) and any layout element created according to it, may contain the following elements: layout element metadata (name etc.), sub-element information, contained fields/components, layout elements or layout element placeholders, layout information, additional style information and content element association information (as discussed in more detail herein below).

It will also be appreciated that a layout element type definition may also include an exceptions behavior definition, e.g. overflow areas used to handle text above an expected amount as discussed in US Patent Publication No. 2013/0219263 entitled "Website Design System Integrating Dynamic Layout and Dynamic Content" published 22 Aug. 2013 and assigned to the common assignee of the present invention. It may further include display rules and rules controlling how the layout should be placed (by itself and in relation to other layout elements).

It will be appreciated that the description above may be associated with layout elements at all levels (i.e. atomic layout elements and higher-level layout groups).

Furthermore, system 100 may support disjoint layout groups. Layout groups typically occupy a single contiguous page region. However, the system may support layout groups which include multiple disjoint (non-contiguous) layout elements.

For example, system 100 may define a layout group which includes a matching page header and page footer, or a matching video player window and a separate "remote control" box.

The advantage in having such a disjoint layout group is that system 100 may offer multiple design alternatives (e.g. for both the header and the footer) and site designer 62 may be able to select proper design alternatives for both the header and the footer in one selection.

CMS 50 may comprise a content element type repository 502 and CER 506 which may contain a tree of instances of these content element types.

Content elements and content element types may be reused by multiple containing objects. For example, a single employee details content element may be used by the "our team" containing content element as well as the "company phone directory" containing content element, thus creating a Direct Acyclic Graph. This may apply to content element type definitions as well as the actual content element instances.

It will be appreciated that content elements do not typically contain layout and formatting information, e.g. associated screen position, size, formatting and other information (except for local display hints described below).

It will be further appreciated that system 100 may support content elements which include local display hints. Such local display hints allow a content element to provide some hints to layout elements which are associated with it.

For example, field-level display hints may apply to fields in the content element, e.g. "Always display this ID field in a bold font". Such a specification may override the relevant attribute (bold text) in the regular layout element specification.

In particular, system 100 may allow some or all fields of a given content element to include a per-field "show/hide" hint, so site designer 62 entering data may ask that the field be hidden (and not displayed) in the final display. For example, a business which does not have a fax contact option may mark the "fax number" field in the "contact options" form as hidden.

System 100 may also use dynamic layout techniques (described in more detail herein below) to "close the gaps" created in the displayed layout due to fields being hidden.

It will be appreciated that SGS admin 61 may use element creator 41 to create and update different element types for use by site designer 62. These created elements may be filled with actual content though a series of questionnaires presented to site designer 62 or through extraction from various sources (as discussed in more detail herein below). Questionnaires may also be automatically created from content elements (or sets of content elements), or may be predefined and associated with content elements (or sets of content elements).

It will be appreciated that system 100 may also analyze user-related sources (such as other user websites or social media presence), extract information and use it to fill CER 506. Such data could be accessed based on key details (such as the business name) provided by site designer 62 as described in more detail herein below.

As discussed herein above, system 100 may further use data from external systems 70 (such as industry standard databases or various web services) to fill in additional information in the content elements. For example, site designer 62 may fill in an address into a content element, and system 100 may complete the ZIP code information through an address to a ZIP code conversion web service.

LER 507 may consist of a hierarchical arrangement of layout elements. Layout elements are visual templates of entire web pages or web page sections, possibly containing multiple elements (components or other layout elements).

Layout elements may contain placeholders for data extracted from the content elements and are used to display content elements. Such placeholders may be strongly typed, but may be configured so as to display multiple types.

Layout elements may also include additional layout-related information, including (for example) exception handling guidelines (e.g. what to do in case of field content overflow) and display rules (what combinations of layout elements are allowed) as discussed in more detail herein below.

It will be appreciated that like content elements, layout elements may also be organized in a Direct Acyclic Graph. Unlike content elements, layout elements include full layout information, including contained element position, size, z-order, display attributes etc.

Layout elements may be organized in a structured manner which may include pre-defined sub-element repetitions. For example, a given layout element may contain a header layout element, a repeating member layout element and a footer layout element. This may be implemented via repeater elements, as described in more details herein below.

As discussed herein above, layout elements may also be organized into higher level entities such as layout groups and preset page sections (described in more detail herein below). System 100 may allow site designer 62 to interact (e.g. select version, select position and edit) at the layout element level or at the higher level entity level (e.g. allow selection and editing of preset page sections only, and allowing only re-arrangement of preset page sections and not of the underlying layout elements).

Thus even if site generation system 40 allows limited manipulation of layout elements or layout groups, the generated sites (as described in more detail herein below) may be edited in a more comprehensive manner via WBS editor 30.

System 100 may map page-level (or other) layout elements into specific screen areas. It may fill an entire screen or just a portion thereof. System 100 may require the layout elements to fill the screen completely (i.e. leave no empty spaces between them), or allow arbitrary placement and "holes" between the layout elements.

As discussed herein above, WBS components repository 516 includes the basic component type definitions used throughout website building system 5 (such as text, images, containers and galleries). It will be appreciated that WBS editor 30 may allow direct visual creation and editing of the website building system sites stored in WBS site repository 509 based on component types from WBS component repository 516. WBS editor 30 may also edit generated sites in WBS site repository 509.

It will be further appreciated that site generation system 40 generates (and edits) generated sites in WBS site repository 509 based on instances of layout-related elements (layout elements/layout groups/preset page sections) stored in LER 507. The layout-related element instances in LER 507 are defined based on layout types in layout types repository 503, which are in turn defined based on the website building system components definition stored in WBS components repository 516.

It will be appreciated that system 100 may use layout elements from a variety of sources, including predefined layout elements (such as preset page sections described herein above), layout elements extracted from layout definitions used in other sites (while preserving the other site's rights, such as copyrights, privacy and anonymity) and layout elements created dynamically by generating multiple possible alternatives for placement of the required components, and pruning the (typically very large) generated alternatives space using rules related to aesthetics and semantic content of the layout elements.

As discussed herein above, CER 506 and LER 507 are separate repositories. Although system 100 may generate layout elements from CER 506, the two repositories may be updated separately and may be later synchronized as discussed in more detail herein below. However, system 100 may maintain a connection between them (e.g. through pointers/back pointers, shared IDs, association attributes etc.) as described in more detail herein below.

WBS site repository 509 may contain the actual site elements, such as pages, containers and components. System 100 may maintain LER 507 and WBS site repository 509 as separate repositories (while maintaining a connection between them). System 100 may also maintain an integrated layout element repository/generated repository, by keeping (for example) the layout elements as transparent or invisible containers or frames inside the generated site. In the latter case, some types of generated site editing may damage the embedded LER 507 structures inside the generated sites, for example moving a component to the outside of a transparent layout element-originated container inside the generated site may make the layout element container non-conformant with the layout element definition.

System 100 may implement a many-to-many relationship between content elements and layout elements. A single content element may include information fields used in multiple layout elements, and a single layout element may present information from multiple content elements. In an alternative embodiment, system 100 may implement a simpler model (e.g. 1:1, 1:m or m:1 content element-layout element relationship model).

System 100 may associate layout elements to a content element using a number of mechanisms (such as matching through common keywords associated with both content elements and layout elements) as described in more detail herein below.

It will be appreciated that the use of layout elements may provide substantial benefits for a user, and in particular for advanced users such as professional designers who create site elements and templates for other designers (such as an internal design studio inside the website building system 5 vendor). Instead of designing full page (or site) templates, the advanced designer may design separate layout element types (or preset page sections) and template sections which are repeated. Thus, the resulting layout element instances may be mixed and matched like Lego™ bricks.

As discussed herein above, system 100 may also implement a specific type of predefined layout elements and layout groups known as preset page sections (PPSs). Such preset page sections may contain multiple layout elements and system 100 may attempt to build visual configurations consisting of such preset page sections (possibly combined with additional non-preset page sections, layout elements and layout groups).

Such a preset page section may be an arbitrary sub-page area, or may be a "coast-to-coast" strip extending from the left side of the screen to the right side. Such a strip may be defined using a responsive layout mechanism in order to adapt to multiple screen widths (e.g. when using the generated site on both a desktop and a mobile device).

System 100 may visually combine preset page sections in multiple ways. For example, if the preset page sections are all coast-to-coast horizontal strips, the possible permutations would be limited to a different vertical order of the strips, or to the division into pages.

System 100 may also provide tools to support the editing, re-arranging and positioning of such strips, as further described in US Patent Publication No. 2017/0046317 entitled "Method and System For Section-Based Editing of a Website Page" published 16 Feb. 2017 and US Patent Publication No. 2013/0232403 entitled "A Method and System For the Use of Adjustment Handles to Facilitate Dynamic Layout Editing" published 5 Sep. 2013, both of which are assigned to the common assignee of the present invention.

A preset page section may contain a number of elements (in addition to those contained in regular layout elements) such as additional non-layout elements with specific decorations (e.g. background, borders, separating lines, icons) and state and configuration information, i.e. a specific element (placeholder component or decoration) may be assigned a given set of attributes and style information, such as alignment, border, font etc. It may also contain dynamic layout definitions which control the way the preset page section sub-elements are modified when the preset page sections are resized (as further described in US Patent Publication No. 2013/0219263 entitled "Website Design System Integrating Dynamic Layout and Dynamic Content" published 22 Aug. 2013, and assigned to the common assignee of the present invention.)

It will also be appreciated that a preset page section may include multiple conditional configurations. For example, a given preset page section containing two text fields (A and B) may be configured so that A and B are displayed side-by-side by default, but if a sufficiently large amount of text is included in either field, the fields are displayed one above the other. Such a conditional definition may be specified using a set of rules associated with the preset page section. The preset page section in this case may contain multiple definitions for the placement or regular component as well as the decorative ones.

It will be appreciated that preset page sections (like other layout elements) may be created manually by a professional designer, or may be created by manually selecting the best-looking possibilities from a multitude of preset page sections generated by system 100. In both cases, the professional designer may perform specific adjustments to the preset page section and add any relevant decorations and embellishments, as well as any relevant layout and (multiple) configuration information.

Figure 4:
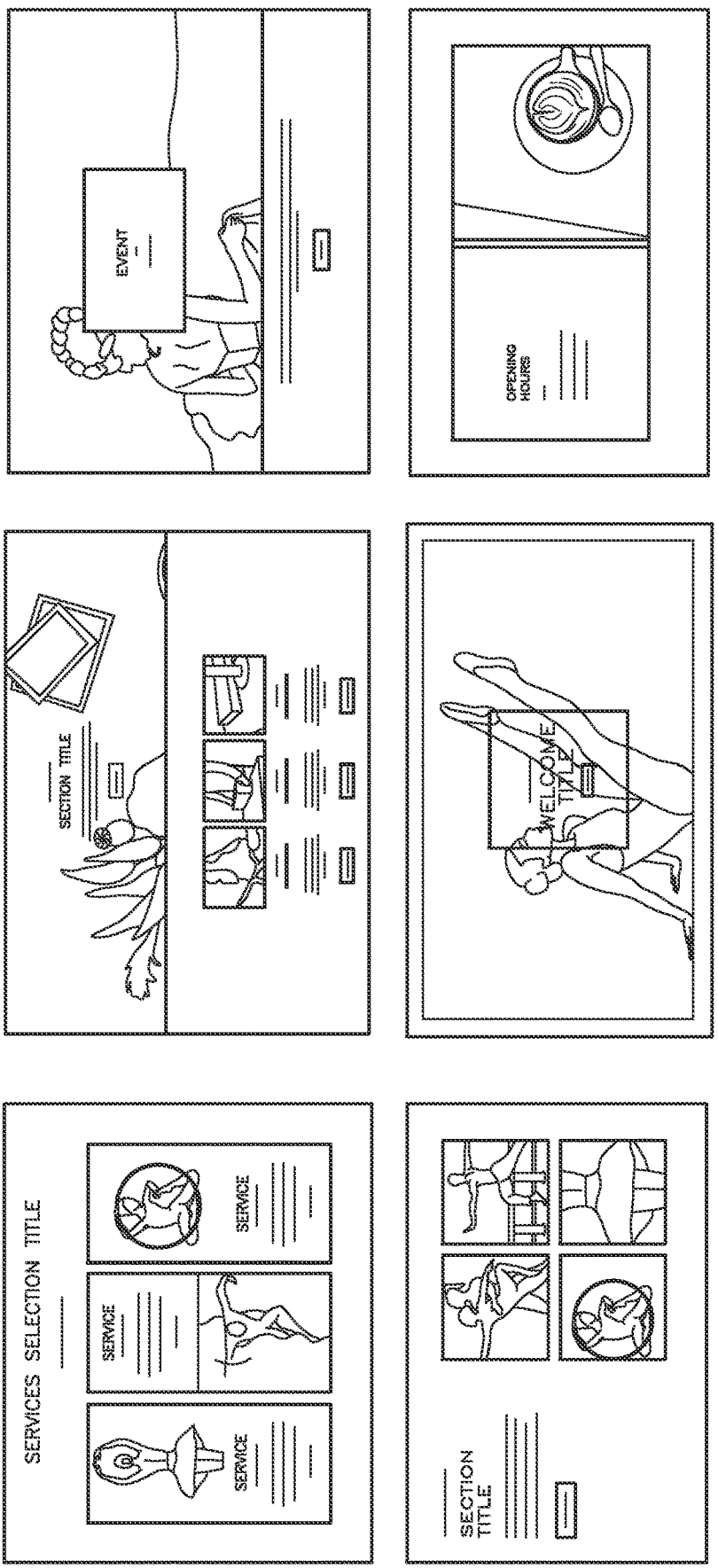
FIG. 4 is a schematic illustration of preset page sections; constructed and operative in accordance with the present invention.

Reference is now to FIG. 4 which displays a number of sample preset page sections. As can be seen, system 100 uses initial field content (e.g. text, media) to illustrate the purpose of the specific fields, although this content is typically replaced or modified for the actual site. Alternatively, system 100 may use sample preset page sections which do not contain any illustration content or media.

It will also be appreciated that preset page sections are often grouped in preset page section categories (which may correspond to the main areas of the site). Such categories may include common site sections, such as welcome, about, services, projects, products, team, testimonials, clients, features, FAQ (frequently asked questions), events, CV (curriculum vitae), classes, opening hours, subscribe, contact etc.

As can be seen from the list, some preset page section categories are applicable to certain website types or structures (or family/industry selections as described in more detail herein below). For example, the "opening hours" preset page section is relevant to restaurants and similar service businesses but not to a manufacturing company.

System 100 may also implement generic preset page sections. Such preset page sections may be created, for example, to display a useful combination of field types which may be reused for multiple purposes. For example, Applicants have realized that the following field/component combination is used in numerous websites: title, sub-title, text paragraph, media field (for image or otherwise) and button. Thus, a set of well-designed preset page sections based on this combination may serve multiple needs.

Content management system 50 may hold information extracted from external systems 70 as described herein above. It also may hold crowd-sourced information extracted from other sites or on-line presence assets as described herein above.

System 100 may also extract semantic knowledge from CER 506 for use by systems outside of website building system 5 via repurposer 47 as described in more detail herein below. Sample uses may include the generation of a content element repository based search-engine-friendly site version for better indexing by search engine spiders and re-targeting semantic knowledge (e.g. "site offers services A, B, C") for registration in professional index sites or similar indices and repositories.

As discussed herein above, site designer 62 may start his website building process by answering one or more questionnaires, the answers to which may be used to create content element types 4 as described in more detail herein below.

It will be appreciated that system 100 may contain multiple rule engines at various levels (questionnaire building, content element building, layout element building etc.). System 100 may contain rule editing or specification sub-systems for these rule engines, with such sub-system typically used by website building system 5 vendor staff only, and prior to the use of system 100 by site designers 62. Rule engines are discussed in more detail herein below.

Figure 5:
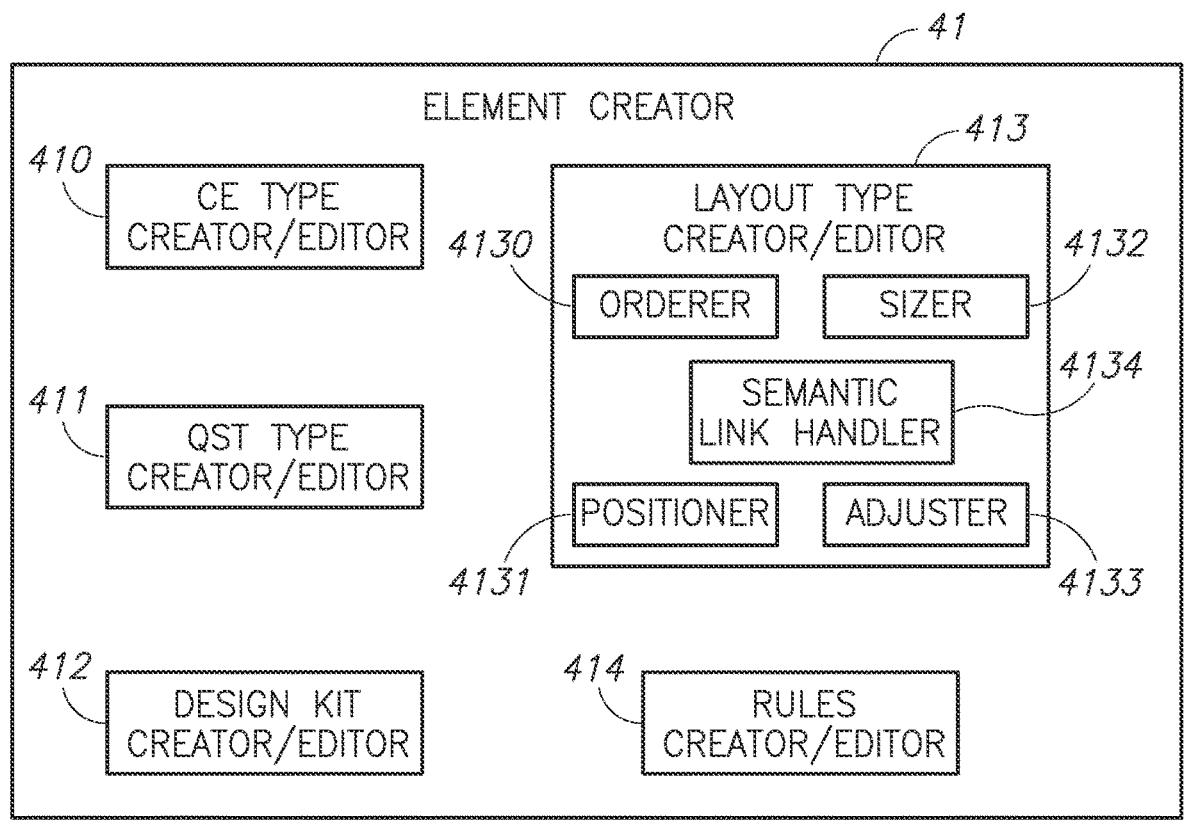
FIG. 5 is a schematic illustration of the elements of the element creator of FIG. 2; constructed and operative in accordance with the present invention.

Reference is now made to FIG. 5 which illustrates the components of element creator 41. Element creator 41 comprises a CE type (content element) creator/editor 410, a questionnaire type creator/editor 411, a design kit creator/editor 412, a layout element type creator/editor 413 and a rules creator/editor 414. Layout element type creator/editor 413 may further comprise an orderer 4130, a positioner 4131, a sizer 4132, an adjuster 4133 and a semantic link handler 4134

As discussed herein above content element type repository 502 may store content element types, used to build the actual content elements reflecting the user business information. Furthermore, content element type repository 502 may support inheritance between its members (including multiple, multi-level and diamond inheritance), so that content element types may be derived from other content element types or combinations thereof.

It will be appreciated that CE type creator/editor 410 may create content element types in a number of different ways. CE type creator/editor 410 may allow site designer 62 to use a specific editing user interface or other interface to directly define such content element types.

CE type creator/editor 410 may create content element types by defining them directly through a language which supports definition of schemas or structures (such as XML, JSON, SQL, etc.)

CE type creator/editor 410 may also extract a definition for an existing site page or a subset thereof. Such a site could originate with website building system 5 or be external to it.

CE type creator/editor 410 may also import a schema from an external source such as a database (e.g. a relational database data dictionary), an industry standard definition or web services interface definition.

It will be appreciated that system 100 may typically include a "general" content element type, which may serve as a repository for various system-wide data fields which are not a part of any specific content element type (e.g. "business name", "currency to use" etc.), similar to the use of global variables in ordinary programming languages.

It will be further appreciated that content element type fields may also contain data-dictionary related information, such as validation formulae, lists of possible values etc. Such a definition may be created by the system vendor's internal staff for use by designers or by the designers themselves, either for their own use, or by designers offering content element types through a content element type marketplace or exchange (separate or unified with other markets).

It will be appreciated that content element types are associated with questionnaires (as described in more detail herein below) which are used to create content element instances with assigned field values, although the association may be a many-to-many relationship.

Questionnaire type repository 501 may hold questionnaires. It will be appreciated that the questionnaires may be created manually by SGS admin 61 as part of the creation of associated or related content element types as described herein above. This may be done using a separate questionnaire editor, or using the regular website building system 5 page or form editor in questionnaire editing mode (e.g. limiting some capabilities and adding question-related attributes such as question order, timeout etc.). In another embodiment, site designer 62 may also create new content elements and questionnaires.

Questionnaire type creator/editor 411 may automatically create questionnaires from an associated content element type, e.g. using a layout algorithm which creates an on-line form from the fields in the content element type definition. This may be similar to the layout algorithm detailed below for automatic layout creation, but is applied to question mini-forms (small UI sections which allow entry for a single questionnaire field) in order to merge them into complete and coherent questionnaires.

Questionnaire type creator/editor 411 may also create questionnaires from external sources (such as a questionnaire marketplace or exchange, similar to the content element type marketplace described herein above).

It will be appreciated that questionnaire type creator/editor 411 may combine questionnaires from multiple sources and may edit generated or imported questionnaires. System 100 may also provide for the automatic integration and arrangement of questionnaires into a complete questionnaires sequence.

CE type creator/editor 410 may tag both content element types and questionnaires with various attributes and metadata. Such attributes may be used to match content element types and questionnaires.

It will also be appreciated that questions may be related to specific content element fields, to general user business information or to a selection of site parameters (such styles, design information or other parameters). The mapping of the specific questions to content fields may be created by CE type element creator/editor 410 during the questionnaire creation process. Questions which are mapped to general information may be included in multiple content elements (or may be stored in general content elements as described herein above).

Typical questions (and the associated use of their answers) may include type of business, purpose of business, name of business (to be used in multiple content elements), address of business (to be used as a textual field value, to locate the business ZIP code, to initialize a map field in a "how to reach us" page and to better identify the exact business when searching for data from similarly named businesses) and a description of the business (to be analyzed using natural language processing, with extracted keywords used as suggested pages/page titles as well as search keywords in the generated site).

Other questions may typically be provided services and products, team members (used in both "team members" and "company directory" pages), a list of pages to include in the created site (selecting from a multi-selection list), a website main style (from a list of suggested styles) and a website main color theme (from a list of suggested color themes).

It will be appreciated that system 100 may employ crowd-sourcing of knowledge in the design and filling of the questionnaires, e.g. modify questionnaires based on their use by other members of the user community. This could be done by an expert system (learning from existing answers), pre-defined rules or other technology as described in more detail herein below.

Figure 6:
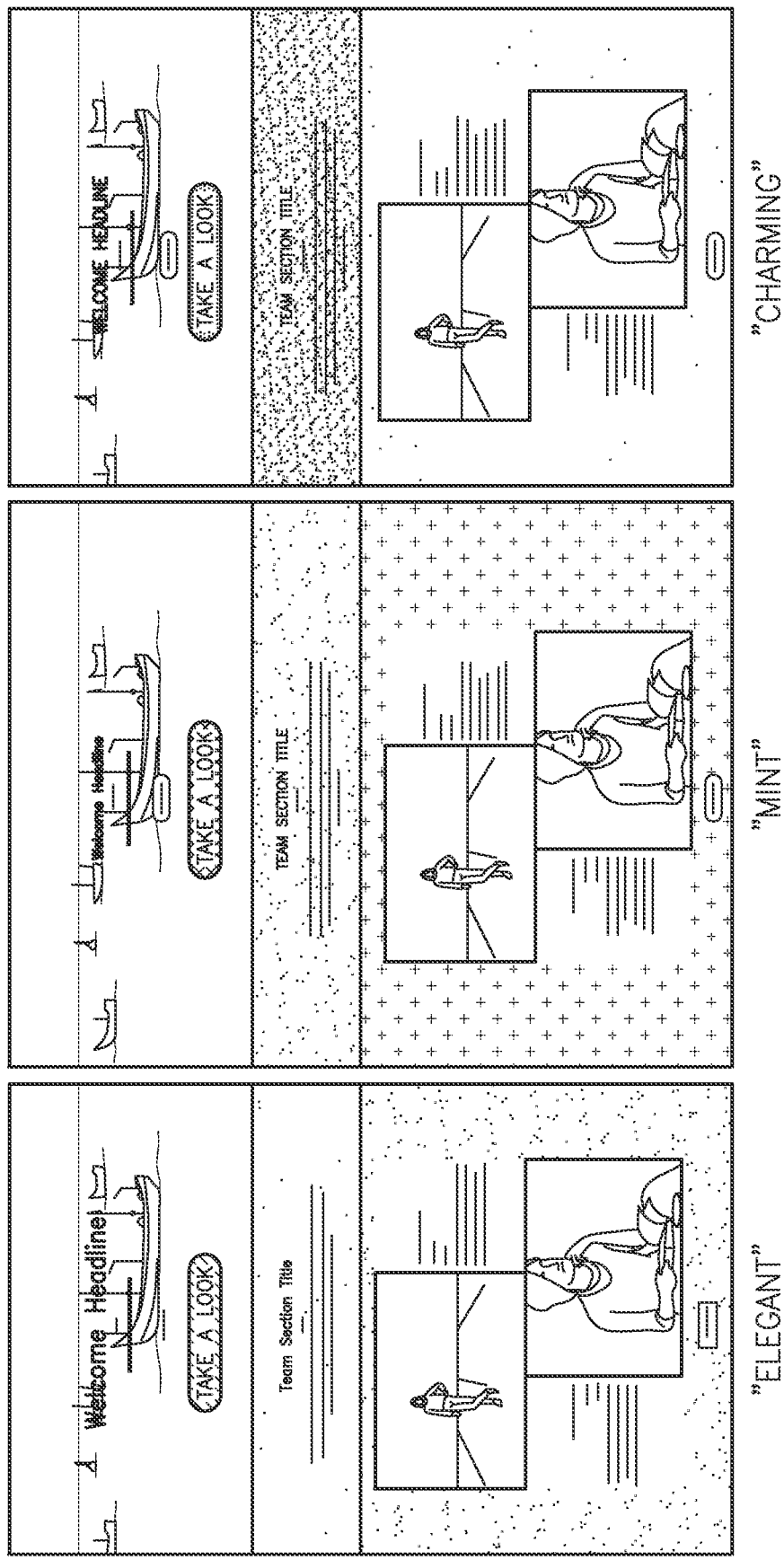
FIG. 6 is a schematic illustration of the effect of different design kits on the same underlying page, constructed and operative in accordance with the present invention.

It will be appreciated that system 100 may also implement design kits. These are sets of definitions of style elements (such as color scheme and font set selection) which are applicable to multiple elements and components in the site. Reference is now made to FIG. 6 which illustrates the effect of different design kits on the same underlying page.

Design kit creator/editor 412 may allow for both the creation and editing of design kits and may be both a manual visual editor and an automatic system. Thus design kits may be manually created (using design kit creator/editor 412) by professional designers typically based on experience with existing sites and their design.

Alternatively (or in combination), design kit creator/editor 412 may create design kits through the application of design rules which describe the best combinations of various design parameters. This is especially useful for the creation and selection of color schemes.

Design kit creator/editor 412 may also create design kits based on collected system information about existing design kits and their use. For example, if designers often select a given design kit X but then make specific repeated changes to the color palette, design kit creator/editor 412 may generate a variant design kit with the modified color palette.

Design kit creator/editor 412 may also combine or mix existing design kits (e.g. system 100 may offer site designer 62 a multiple variation of a given design kit by combining the base design kit with a number of possible relevant color palettes). In this scenario, SGS workflow driver 42 may select such a design kit, and may allow site designer 62 to override its choice and select another design kit (possibly hand-crafted by site designer 62). The choice of design kit may affect the entire site (including all elements at all levels). However, system 100 may also support multiple design kits for different areas of the site, or specification of design kits associated with layout elements at various levels (e.g. having a preset page section with its own specific design kit different from the rest of the site). Such multiple design kit architecture may also support overriding style kit elements in lower level layout elements (which inherit a design kit from a higher level layout element).

As discussed herein above, LER 507 stores layout element types, used to build the actual layout elements included as elements of the generated sites. Furthermore, LER 507 may support inheritance between its members (including multiple, multi-level and diamond inheritance), so that layout element types may be derived from other layout element types or combinations thereof. Such layout elements may be standalone, defined using a specific hierarchy, or defined using layout groups or preset page sections.

Layout type creator/editor 413 may create such layout element types by using a specific UI or other interface to directly define such layout element types. Such an editing environment may be based on WBS visual editor 30 or a separate editing environment.

Layout type creator/editor 413 may create such layout element types by defining them directly through a language which supports the definition of schemas or structures (such as XML, JSON, SQL, etc.). The language should also be able to express the layout information (e.g. as additional attributes of defined fields) as well as additional information associated with the layout elements (such as meta-data and dynamic layout rules).

Layout type creator/editor 413 may also create such layout element types by extracting a definition from an existing site page-set, single page or a subset thereof. Such a site could originate with website building system 5 itself or be external to it. An example would be selecting a given website building system container (with its content), or a given set of website building system components, and saving their composition and layout as a layout element.

Layout type creator/editor 413 may also create such layout element types by importing a schema from an external source such as a database (e.g. a relational database data dictionary), an industry standard definition or a web service interface definition. The schema may be complemented (manually or automatically) with layout and other information to form a complete layout element.

Layout type creator/editor 413 may also create such layout element types automatically from a given set of fields (e.g. using a rule based system) as discussed in more detail herein below. The automatic generation may be followed by automatic or manual filtering (by SGS admin 61) of the multitude of generated layout element types based on filtering rules included in rules repository 513. The set of fields may be that of a given content element, or may be based on a pre-specified set of fields (such as the set of 5 fields used to create a generic preset page section as described in more detail herein above).

It will be appreciated that such a definition may be created by SGS admin 61. Definitions may also be created by site designer 62 (or other graphical designer) offering layout element types through object marketplace 15 (as a separate market or unified with other markets and stored in LE LG/PPS type repository 503) They also may be created by layout type creator/editor 413 based on a relevant content element type or a set of fields as defined in more detail herein below.

It will be appreciated that the layout element type creation workflow consists of the following stages: creating the layout elements manually or automatically (as described herein above), loading the layout elements into LER 507, entering layout element metadata, connecting the layout elements to content elements (for pre-associated layout elements, defining the layout element exception behavior and defining the layout element display rules.)

It will also be appreciated that if system 100 implements a specific layout element hierarchy model, the layout creation architecture may follow this model. For example, an alternative embodiment of system 100, which is based on the creation of preset page sections and of specific layout elements as alternative layouts to regions within each preset page sections, may create multiple alternate preset page sections for each preset page section category (for example, multiple "About us" preset page sections, multiple "Team" preset page sections, multiple "contacts us" preset page sections and so on). It also may create multiple alternate layout elements for element or regions in each preset page section for example, multiple "address" layout elements for the address box inside the "contact us" preset page sections. Such "address" layout elements may belong to a specific "contact us" preset page section, or may be usable inside multiple "contacts us" preset page sections.

It will be appreciated that layout type creator/editor 413 may automatically create layout element types based on a given field set (from content elements or otherwise). Layout type creator/editor 413 may use off-line/pre-processing as a tool to support SGS admin 61 in quickly creating a large number of layout element types for use by system 100.

Layout type creator/editor 413 may also automatically create layout element types online to reflect specific content elements (e.g. if no matching layout element has been found for a given content element). In this scenario, layout type creator/editor 413 is activated as part of the site creation process by site designer 62 and not as part of preliminary type creations by SGS admin 61.

In the pre-processing scenario, layout type creator/editor 413 may run semi-automatically, working automatically to generate multiple possible layout elements, and then going through a manual review and approval stage by a human designer to perform a final filtering of the best generated layout elements. System 100 may include an additional machine learning engine which may be trained to determine the best layouts based on such manual designer selections as described in more detail herein below.

Layout type creator/editor 413 may determine preferred options for placement and layout parameters for a given set of components inside a layout element type definition, or of layout elements inside a higher level layout group/preset page section type definition.

Layout type creator/editor 413 may use a similar method (with the relevant modifications) to generate alternative arrangements of layout elements inside containing entities (higher level layout groups/preset page sections/pages) for the generation of layout solutions as discussed in more detail herein below.

Layout type creator/editor 413 may use a rule engine to determine the layout parameters based on the components' parameters and sets of rules. The process may consist of multiple stages, each with its own set of rules. As discussed herein above, layout type creator/editor 413 may comprise an orderer 4130, a positioner 4131, a sizer 4132, an adjuster 4133 and a semantic link handler 4134.

Orderer 4130 may determine the order of importance of the components, positioner 4131 may determine the spatial position of the components, sizer 4132 may determine the final sizes of the layouts and adjuster 4133 may adjust the layouts according to the previously determined parameters to create the final version. Semantic link handler 4134 may detect semantically related components. This typically includes vertical position/size adjustments, though it may include other adjustment types as well.

It will be appreciated that layout type creator/editor 413 may implement a different set of stages (e.g. by merging or splitting stages), and may also implement the stages above in a different order.

It will be appreciated that for each stage, the elements may use a set of rules specific to that stage. There are multiple rule types and categories, and rules may be independent (i.e. the elements of layout type creator/editor 413 may apply to any of them and in any order) or dependent (i.e. some rules should be applied in a certain way together with other rules).

It will be appreciated that these rules may be created by SGS admin 61 using rules editor/creator 414.

It will be further appreciated that the rules refer to components, e.g. "never place X above Y" or "X is more important than Y". However, component references in the rules may take a number of forms, which may include references according to a specific website building system component type (e.g. an image field, a text paragraph field) and references according to a semantic tree website building system type.

Under the scheme of references according to a semantic tree website building system type (as described in U.S. Pat. No. 9,747,258 entitled "System and Method for the Creation and Use of Visually-Diverse High-Quality Dynamic Layouts" issued 29 Aug. 2017 and assigned to the common assignee of the present invention), website building system component types may be arranged in a semantic type hierarchy as is illustrated (for a specific set of components) in FIG. 7 to which reference is now made.

Figure 7:
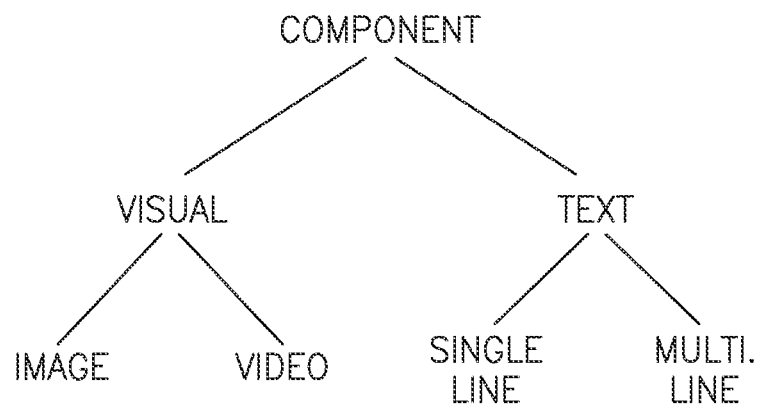
FIG. 7 is a schematic illustration of a classification of website building system components according to semantic hierarchy, constructed and operative in accordance with the present invention.

Under this scheme, a rule may also reference a component using an actual website building system component type (e.g. "single line" in FIG. 7), or reference a component using a parent node in the semantic tree (e.g. "text" in FIG. 7). Under this scheme, a parent node will also match all components below it in the semantic tree.

The rules may also refer to business roles. This may be relevant when the content element association is already known (e.g. in the online use scenario). In this scenario, the associated content element includes a per-field business role definition, e.g. a text field is known to be a "business-address" or "team-member-name" and not merely a text field. A sample rule would be "team-member-name should be next to team-member-description with no intervening objects".

It will be appreciated that the rule engines associated with the creation of layout elements may support a variety of rule types and categories such as positive ("always place X above Y") as well as negative rules, strict (must always apply) as well as optional rules, relative ("X should be at least n pixels from Y") as well as absolute ("X shouldn't be in larger than m pixels") rules and rule weights/priorities (i.e. which rule is more important, better or overriding in case of rule contradiction).

Other rules may include parameterized rules, i.e. rules which provide a determination based on a parameterized formula involving the evaluated components' attributes (e.g. "The importance of the value of a picture is determined by its area multiplied by 0.05") and conditional rules ("e.g. "A above B but only if there are 3 Cs below the B").

It will also be appreciated that when used to create layout elements based on content element instances (i.e. which have been filled with content), SGS workflow driver 42 may implement rules which refer to the layout element content as well (as derived from the content elements) as described in more detail herein below. This does not apply in cases where "empty" layout elements (i.e. layout element types) are being positioned, e.g. when using layout type creator/editor 413 to create template pages (which are essentially layout groups). It will be appreciated that "empty" layout elements may still contain sample content (e.g. sample text and images or decorative/ornamental elements).

Layout type creator/editor 413 may support a limited subset of the rule types as described herein above. For example, an implementation may include only strict negative rules (e.g. "never allow X above Y") and use only such rules to disqualify component positioning alternative. Rules may also reflect general design and aesthetics principles, e.g. "density of covered areas should be uniform with X %-Y % of covered area".

Some of the rules may define a constraint. For example, a set of rules such as "if title X is above picture Y, (width of Y>width X)" is essentially a constraint rather than a regular rule. Rules may be used to prune or limit the generation of layout alternatives. Constraints are accumulated and are resolved by a resolver module once all components and contained layout elements have been placed. Such resolving may combine a linear solver (for linear constraints) with other types of solvers.

As discussed herein above, orderer 4130 may determine the order of importance for the components to be arranged in the layout elements. This order is later used in the positioning process. It will be appreciated that this stage may also be performed manually, with SGS admin 61 creating the layout element types and assigning their order.

Alternatively, orderer 4130 may use rules which specify importance values (e.g. "a picture above 200×200 pixels has an importance of value of X"). These importance values are later sorted to generate the importance order. The rules may also specify relative importance, with such information used in topological sorting to determine the order (e.g. "business description is more important than business address").

It will be appreciated that orderer 4130 may also use order hints associated with the various components or underlying content element types. These hints may include static priority and user intent i.e. what site designer 62 intends to do. It will be appreciated that different layouts may be promoted for different purposes. For example, Japanese sites prefer dense layouts. Legal websites typically use a specific formal look and feel (as well as color choice). Other hints include length, relevancy and collected crowd-information regarding priority and user choices. The output of this stage is a set of components (or sub-layout elements) in the generated layout element, ordered by importance.

Positioner 4131 may create a tree of possible layout element configurations and may disqualify some of the branches based on a set of positioning rules. This placing is performed according to the order previously established by orderer 4130. Positioner 4131 may place the first component in the center of the screen and place additional components based on existing component configurations in the tree.

Figure 8:
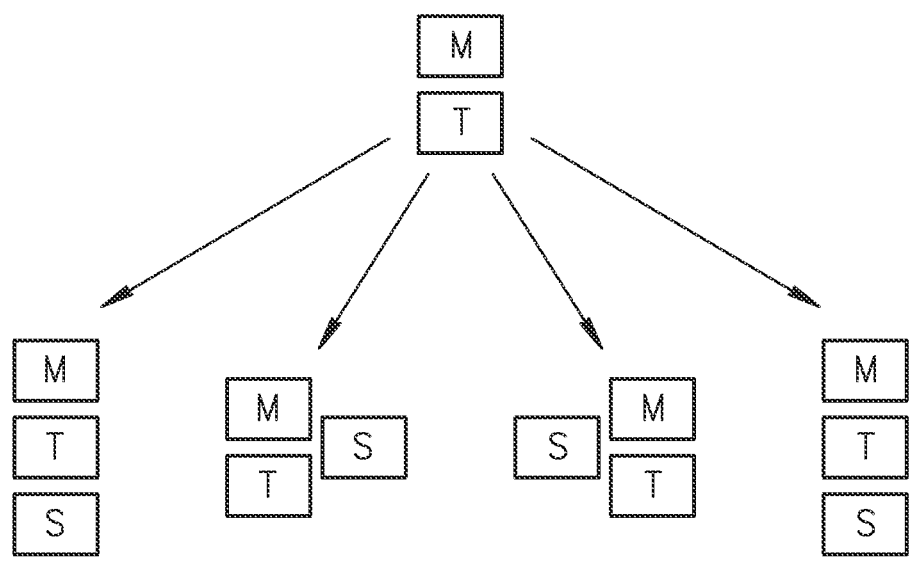
FIG. 8 is a schematic illustration of a tree of placement possibilities for the positioning stage; constructed and operative in accordance with the present invention.

Reference is now made to FIG. 8 which illustrates a tree of placement possibilities for positioner 4131. Positioner 4131 has located M (Media) as being above T (Text) and now needs to find a position for S (Sub-title). Positioner 4131 may create a tree of possible placements for S (e.g. by analyzing the existing arrangement topologically and determining the list of possible regions into which S could be inserted) and may prune some of the branches based on the positioning rules.

It will be appreciated that positioning rules may be global ones such as a "Never (Text above sub-title)". Positioner 4131 may use positioning rules which are typically strict negative rules aimed at disqualifying branches. Positioner 4131 may also use rules associated with specific layout elements and components (e.g. rules pre-associated with every website building system component).

Rules can be X/Y-based (A above/below/right/left of B) or Z-based (A on B—meaning A appearing in front of B). Rules are typically phrased at the component type level, semantic component type level (e.g. "subtitle can't be left of title") or the layout element level ("Team description layout element cannot be below team member layout elements").

Layout type creator/editor 413 may support any combination of rule types, including rules which are topological in nature ("never A above B"), rules which are defined using screen-relative terminology ("use 50%/75% of screen width") and rules which include specific distances ("A always within 75 pixels horizontally of B") possibly defined relative to the screen resolution.

It will be appreciated that in a hierarchical layout element arrangement, positioner 4131 may perform such solution tree construction at each level of the hierarchy. Thus, positioner 4131 may produce a tree of the top level layout elements, and for each layout in each combination, positioner 4131 may generate the layout element tree for its content. At some levels, there may be a set of one or more predefined layout element types, so the tree would consist of a selection from this predefined layout element set. It will be appreciated that the output of positioner 4131 is a set of valid alternatives for topological layout of components (or sub-layout elements) in the generated layout element.

Sizer 4132 may apply size rules which govern sizes and combinations of sizes of the various elements. Such rules may prune some branches and create additional branches. For example, sizer 4132 may generate multiple alternatives to specific text boxes based on a set of relevant heights and widths.

It will be appreciated that sizer 4132 may also control the ways in which dynamic layout (as described US Patent Publication No. 2013/0219263) operates on the various components, e.g. how the components are resized based on changes in their content or changes to other components on the page. Example of such rules may include "buttons never grow in size". Another example is, if when enlarging (downwards) a layout with an image on the button, then the elements (below the layout) are pushed downwards as much as possible. It is only after they have been pushed downwards that the image may grow, until the image aspect ratio breaks. It will also be appreciated that the rules may also include guidance on how the positions of the components (and not just sizes) are affected, e.g. "title always pushes a sub-title below it". Furthermore, such rules may also be used by adjuster 4133 as described in more detail herein below.

Sizing rules may also be applicable to subsets of the generated layout elements. For example, sizer 4132 may implement special rules for header and footer layout elements only, e.g. "If we have [phone+e-mail+menu] in the single header/footer line, the menu will dynamically take the area left after the e-mail & phone".

The output from sizer 4132 is a set of layout element layout alternatives which may include the components and their basic (default) sizes, but still requires adjustment based on actual component content.

Adjuster 4133 may adjust the positions and sizes of the various elements in a specific layout element. Such adjustments are typically made by pushing or extending elements "down" (to the bottom of the page), but adjuster 4133 may support additional types of size and position adjustment. For example, adjuster 4133 may resize images in both directions so as to preserve their aspect ratio.

It will be appreciated that the rules applied at this stage are similar to the dynamic layout rules described in US Patent Publication No. 2013/0219263 (including in particular the automatic generation of dynamic layout anchors between components). However, layout type creator/editor 413 may provide additional capabilities as discussed in more detail herein below.

Figure 9:
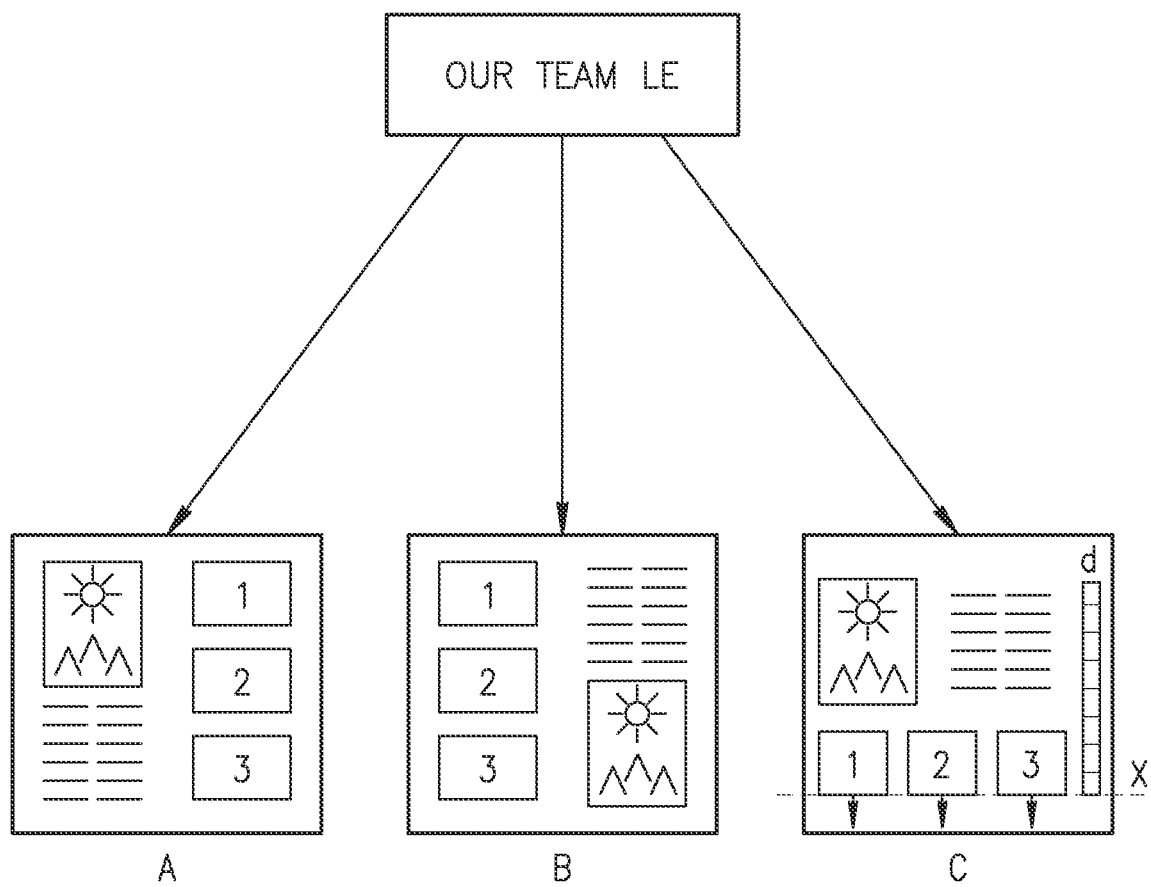
FIG. 9 is a schematic illustration of the generation of multiple suggested layout alternatives and the use of automatically generated anchors, constructed and operative in accordance with the present invention.

Reference is now made to FIG. 9 which illustrates an example of how adjuster 4133 automatically creates bottom-to-bottom anchors. As is illustrated, adjuster 4133 creates multiple visual alternatives ([A], [B] and [C]) for an "our team" layout element which contains a description of 3 team members ([1], [2] and [3]). In an alternative [C], the bottom edges of the 3 contained team member layout elements ([1,2,3]) are aligned along the horizontal line [x]. In this case, adjuster 4133 may automatically create bottom-to-bottom anchors between the bottom edges of [1], [2] and [3]. Thus, if alternative [C] is selected, and the description for (for example) team member [3] overflows the allocated area, then team member layout element [3] may be extended down, and may cause team member layout elements [1] and [2] to extend as well.

It will be appreciated that suggested layout [C] contains an additional text element [d] whose bottom is aligned with the layout elements [1], [2] and [3]. However, as [d] is not a team member layout element, adjuster 4133 may determine not to create an automatic anchor between the bottom edge of elements [1,2,3] bottom edge and the bottom edge of element [d].

Thus adjuster 4133 may support rules which are considerably more capable than those described in US Patent Publication No. 2013/0219263. In particular adjuster 4133 may consider not just component type, position, size and content but other attributes as well, such as component semantic and business roles (such as a team member description vs. a regular text box as described herein above), component history (e.g. editing history), user parameters etc.

Adjuster 4133 may provide procedurally-defined rule outcomes, e.g. "stretch a given picture until X % size change, and after that stretch the entire layout". Such procedural-outcome rules may include multiple stages and conditional flow (e.g. using an existing or a specialized scripting language).

It will be appreciated that the adjustment process by adjuster 4133 is relevant to all cases in which layout elements are created, including cases when site designers 62 create layout elements manually (e.g. for a layout element market) and when site generation system 40 creates layouts (as described in more detail herein below). However, the actual adjustment is only performed when actual content is defined for the layout element (e.g. when creating a layout element based on a filled content element, or when using the illustrative content added to layout elements). Such content is required so that layout element creator/editor 413 may know the actual amount of content in each component.

The output from adjuster 4133 is a set of layout element alternatives which include the components and their adjusted sizes according to the content, position, size and other attributes of the layout element.

It will be appreciated that the adjustment process above is relevant to all scenarios in which layout elements or layout groups are created. However, the actual adjustment is only performed by adjuster 4133 when actual content is defined for the layout element (e.g. when creating a layout element based on a filled content element, or when using the illustrative content added to layout elements). Such content is required so that adjuster 4133 knows the actual amount of content in each component. It will be appreciated that the adjustment is performed internally and not by the browser doing the actual rendering.

Adjuster 4133 may also re-adjust on other occasions, e.g. if site designer 62 switches to a new design kit with a larger font (which makes the text larger).

Rules creator/editor 414 may be used by SGS admin 61 to create the layout and aesthetical rules as used by the different elements of element creator 41 as described herein above. It will be appreciated that these rules may be stored in rules repository 513.

Rules may also refer to components according to semantic links. Semantic link handler 4134 (as described in US Patent Publication No. US 2015/0310124) may detect semantically related components, such as a picture and its caption. In this scenario, the rule may also refer to such a semantically related set (e.g. "caption text should always be below its related picture").

SGS workflow driver 42 may execute the basic site generation process and may coordinate the flow of activity from the running of questionnaires, the analysis of the resulting data, searching for related external information to the presentation of the layout solutions to site designer 62 together with the handling of edits by site designer 62.

Figure 10:
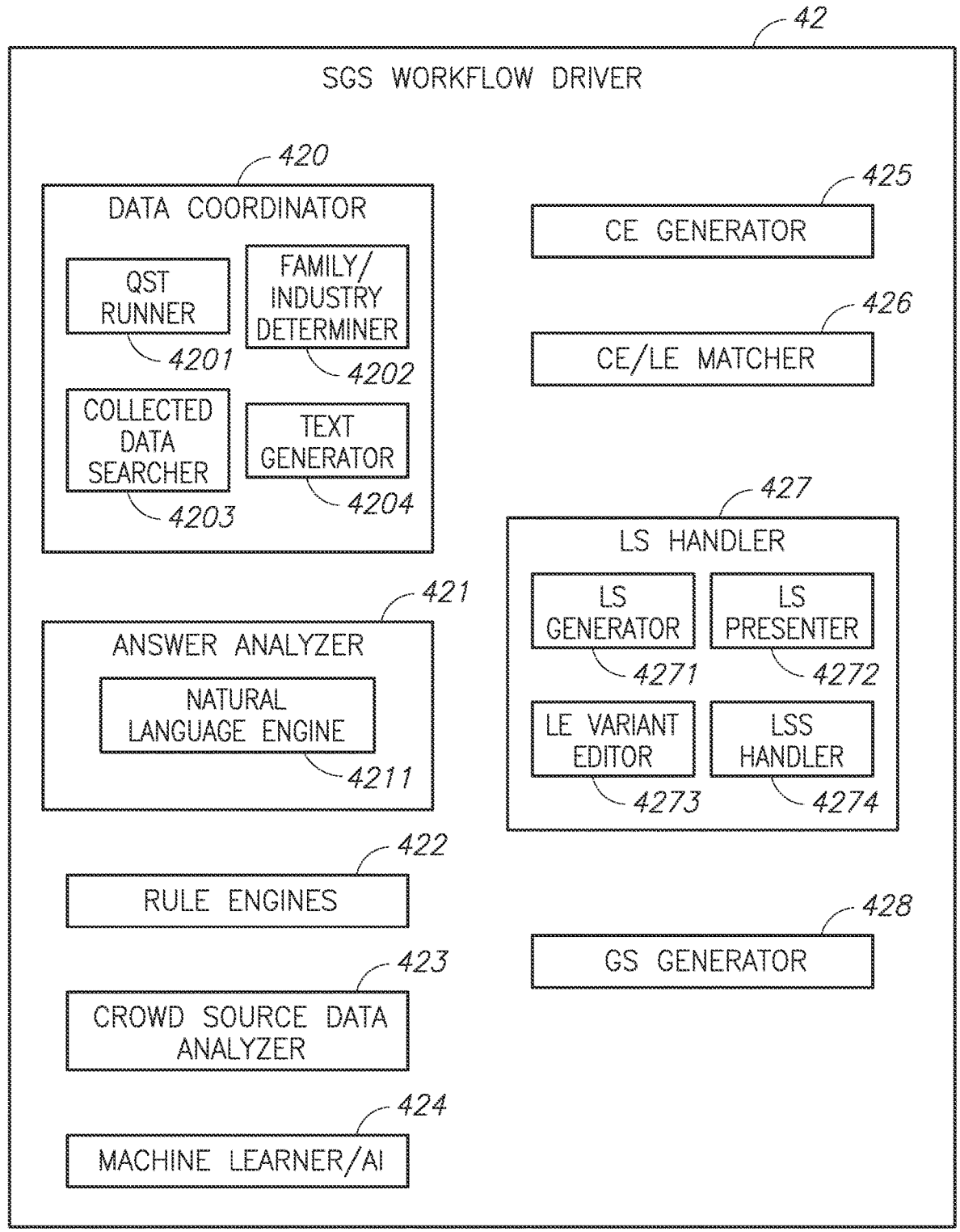
FIG. 10 is a schematic illustration of the elements of the site generation system (SGS) workflow driver of FIG. 2, constructed and operative in accordance with the present invention.

Reference is now made to FIG. 10 which illustrates the elements of SGS workflow driver 42. SGS workflow driver 42 may comprise data coordinator 420, an answer analyzer 421, rule engines 422, a crowd source data analyzer 423, a machine learner/AI 424, a CE (content element) generator 425, a CE/LE matcher 426, a LS (layout solution) handler 427 and a GS (generated site) generator 428.

Data coordinator 420 may further comprise a questionnaire runner 4201, an industry/family determiner 4202, a collected data searcher 4203 and a text generator 4204. Answer analyzer 421 may further comprise a natural language engine 4211.

Layout solution handler 427 may further comprise a LS generator 4271, a LS presenter 4272, a LE variant editor 4273 and a layout selection store handler 4274.

Data coordinator 420 may run the process to acquire the content required by CE generator 425 in order to create content elements for the generated sites.

Questionnaire runner 4201 may run the questionnaires created by questionnaire type creator/editor 411 as described herein above and gather the data accordingly, family/industry determiner 4202 may determine the type of industry and family the intended website is for and collected data searcher 4203 may instruct external data gatherer 43 and internal data gatherer 44 to gather relevant information accordingly. Text generator 4204 may generate appropriate text content (for use in the generated site) which may be adapted to a specific family and industry as determined by family/industry determiner 4202.

It will be appreciated that questionnaire runner 4201 may fill and update CER 506 with any of the following: information provided by site designer 62 through the use of questionnaires (as described in more detail herein below), information extracted from the responses of similar users (while preserving their privacy), information extracted from external sources (such as industry standard databases or various web services), information extracted from other data sources related to the user himself (such as other websites belonging to the user, inside or outside the website building system and social media presences etc.) and updates and editing made to the generated website (which update CER 506 as well as described in more details herein below).

Questionnaire runner 4201 may allow site designer 62 to review extracted information and correct it if needed through a suitable interface.

It will also be appreciated that questionnaire runner 4201 may combine these techniques, e.g. fill CER 506 based on questionnaires and merge information extracted from the user's Facebook page (as an example) as described in more detail herein below.

It will be appreciated that questionnaires can be used manually (i.e. filled in by site designer 62) or in a system-guided manner.

When used manually, an advanced site designer 62 may select the content elements to create (thereby selecting their associated questionnaires). This alternative is most suitable to professional developers, expert website building system users or content matter experts.

Thus site designer 62 may browse the set of available content element types, possibly filtering them according to any combination of manual selection, metadata associated with the content element types (e.g. "select all content element types related to 'distributor network' in the 'car spare parts' business category) and actual parameters of the content element types (for example "select all content element types marked as 'how to find us' and containing a 'store address' field").

Site designer 62 may select a subset A of content element types to fill. This may be at the absolute discretion of site designer 62, or alternatively questionnaire runner 4201 may enforce content element order rules (content element M must come before content element N) or inclusion rules (if you fill content element X, you must also fill content element Y and content element Z).

For example, questionnaire runner 4201 may instruct questionnaire type creator/editor 411 to locate or create the questionnaires associated with each of the content element types in subset A and may then create the matching questionnaire set B. Site designer 62 then fills out the questionnaires in questionnaire set B.

It will be appreciated that the process described herein above is for a 2-step method in which the relevant content elements are selected (and ordered), and only then the questionnaires are selected and displayed in order. Site generation system 40 may also implement an interactive method in which content element selection (by site designer 62) and matching questionnaire selection (by questionnaire runner 4201) and answering are done interactively, so that each of the content element/questionnaire selections is performed after the previous questionnaire has been selected and filled.

It will also be appreciated that in the manual use method, site designer 62 may select a set of content elements to fill which only provides a partial profile, e.g. some fields (required for layout element/solution generation) have not been specified. In such a case questionnaire runner 4201 may require site designer 62 to provide the missing content (e.g. by popping up a "completion" questionnaire with the missing fields only).

For the system-guided use method of filling a questionnaire, site designer 62 may initially answer a number of guiding questions such as selection of a business type (vertical application) and sub-type. Such guiding questions may include asking for business key details used to retrieve business information (as described herein above).

The guiding questions can also be more detailed, e.g. questionnaire runner 4201 may require site designer 62 to supply a list of business services as part of the guiding questions.

The guiding questions may be arranged as a form, a wizard or other arrangement. The answer to each question may affect the next one. Questionnaire type creator/editor 411 may provide an editing environment to edit the list of questions and possible answers. Such an editing environment may be based on WBS editor 30 or a separate editing environment. The questions may also be generated by an expert system, incorporating knowledge from the current and other designers (as described in relation to content elements herein above).

Based on the answers to the guiding questions, questionnaire runner 4201 may select a sequence of questionnaires to display to site designer 62. It will be appreciated that the answers to the guiding questions may be stored in filled questionnaire repository 505, and may also be inserted into content elements as described herein above.

The guiding questions may contain a family/industry specification (as described in more detail herein below). In such a case they may be used to search family/industry repository 514 and retrieve preset page sections, layout elements and other site elements. In this scenario, CE generator 425 may construct the set of content elements directly and layout solution handler 427 and CE/LE matcher 426 may select matching preset page section/layout element options for display as described in more detail herein below.

It will be appreciated that for both methods, questionnaire runner 4201 may adjust the sequence of questionnaires based on previous answers. Such adjustment may affect (for example) the order of questionnaires, the order of questions inside each questionnaire, the specific questions asked (e.g. some may be removed) and the default answers to some questions.

Questionnaire runner 4201 may control these adjustments via a set of rules executed using a rule engine 422 or an expert system. Such a rule engine may rely on pre-defined rules as well as analysis of previous responses by answer analyzer 421 (of the current user and crowd-sources from other users) in order to determine which content elements to fill and which questionnaires to display. For example, questionnaire runner 4201 may detect that lawyer offices that provide service X typically also provide service Y, and may display the relevant questionnaire for service Y once the user has filled in a service X questionnaire.

Rule engine 422 may also implement techniques from the realm of training and courseware systems. For example, questionnaire runner 4201 may measure the user response time, rate of errors and user loss (i.e. rate of users which begin the process but don't finish it). Based on such information, questionnaire runner 4201 may determine which further questionnaires to display, and possibly use a simplified version of the questionnaires or display relevant training material to help the user in filling the questionnaires.

Questionnaire runner 4201 may also store in filled questionnaire repository 505 a copy of the actual questionnaire answers which may be distinct from the filled content elements. For example, a form may contain a free text response field (e.g. "please describe your business") from which structured data elements are extracted using natural language processing (e.g. provided services list).

It will be appreciated that the questionnaire answers do not just provide information to be inserted into content elements. Answer analyzer 421 may analyze the answers using natural language engine 4211 to infer further information for content elements.

The retained questionnaire answers could be used for a number of purposes, including further use as part of collected BI analysis, as test data to perform off-line testing of new data extraction or conversion algorithms and to allow site designer 62 to re-trace or re-run the questionnaires sequence. This could happen after an aborted sequence run, if site designer 62 would like to back-track and restart from a given point in the sequence, to update a given existing site or for other purposes. The stored answers may then be used to present pre-filled questionnaires to site designer 62, so it would be easier for him to re-fill questionnaires by editing the previous answers.

It will be appreciated that A/B tester 46 may implement A/B-testing at the questionnaire level, so as to help the system's developers determine which questionnaires to use as described in more detail herein below.

It will also be appreciated that system 100 uses a novel family/industry content architecture. Applicants have realized that business types (and their associated websites) may be classified according to their family and industry.

The family defines the general type or category of the enterprise such as a school, clinic, law office etc. This general type often determines the general structure of the website. For example, most school websites include a common set of elements (such as teachers, location, courses etc.) which differ from the common set of elements found in most law office websites (such as firm history, areas of expertise, services provided, lawyer biographies etc.). System 100 may however provide multiple possible website structures for a given business family.

It will be appreciated that the division of businesses into family categories is not identical to the division into business types or classifications. Family/industry determiner 4202 may assign businesses of different general types to the same family if these multiple businesses share a similar website structure. For example, restaurants and bars are distinct business types, but family/industry determiner 4202 may unite them under a single "restaurant/bar" business family, since they typically use the same website structure.

It will be further appreciated that the industry may be a specific industry or knowledge domain type. For example, for the school family, system 100 may support multiple industries (i.e. school types) such as art, engineering, and music schools.

An industry category may be applicable to just one business family, e.g. the "commercial litigation" industry category is only applicable to the "law office" family. On the other hand, some industry categories may be applicable to multiple families. For example, the "real estate" industry may apply to law offices, appraisers, consultants and even schools.

Applicants have realized that for most business types the site structure and displayed text information characterize (and are correlated with) the business family category and that the site media (images and video) elements characterize (and are correlated with) the business industry category.

For example, real-estate lawyer and litigation lawyer websites may have a similar site structure (e.g. lawyer biographies and services provided) and displayed fixed text (e.g. site section headings). On the other hand, a real-estate lawyer and general building constructor would both use images (and backgrounds) of buildings and construction projects.

As another example, an art school would typically have texts related to the family (school) and images related to the industry (here "art"). The text would be family (here "school") related—"the school was founded in [x]". The images would be art-related (e.g. taken from classical or modern art).

System 100 may also support businesses which combine multiple business types (e.g. multiple structures, multiple industries or both). For example, a software company may be both a software product provider (requiring e-shop type site elements) and a service provider for installation and support (requiring services-type site elements). In such a case, SGS workflow driver 40 may generate (for example)

a structure which unites elements found in multiple structures (for multiple business families). As another example, SGS workflow driver 42 may ask site designer 62 questions about his business activities ("does the museum also sell goods?"), and accordingly "open" additional sections of the site structure.

Thus, based on a single piece of data, the specific business type of site designer 62, family/industry determiner 4202 may determine the user's business family and industry, and from these retrieve a set of relevant site structures, text field values and image/video/media/background field values. These site structures may be expressed as complete website templates, selection of preset page sections (as described above), separate site elements etc. Family/industry determiner 4202 may then unite material from both directions (family and industry) to generate possible alternatives for the complete site.

It will be appreciated that site designer 62 may provide the specific business type in a number of ways, such as choosing from single or multi-level lists, providing natural language descriptions which would be analyzed by answer analyzer 421 (using a natural language processing engine 4211) to identify a business type and providing other details which may allow family/industry determiner 4202 to determine the business type (such as a link to an existing website, a business social media presence or a scanned advertisement, document or other media produced by the business).

It will be appreciated that family/industry determiner 4202 may store the various elements discussed above (i.e. possible preset page sections, sample text segment, sample pictures etc.) in family/industry repository 514. The elements may include placeholders which allow for business-specific information to be inserted. For example, the text element for an "About" box may consist of sentences such as "{BusinessName} was founded in {FoundingDate}".

Collected data searcher 4203 may instruct external data gatherer 43 and internal data gatherer 44 to gather relevant data to the family or industry as determined by family/industry determiner 4202. It will be appreciated that data coordinator 420 may also use information gathered from the choices made by site designer 62 (in previous generation or editing sessions of the generated websites or other website and as stored in layout selection store 508 and editing history repository 511), as well as other designers.

Such information may typically be used for the ranking of suggested alternatives at various levels. This is relevant during both layout element creation (e.g. "other law offices typically place lawyer biographies next to each other, with partners at the top") and the selection of layout solutions or solution elements as discussed in more detail herein below (e.g. "other schools that selected [Curriculum LE] version LE17 preferred [School history LE] versions LE45 and LE72"). It will be appreciated that the analysis may be statistical in nature or based on the use of an AI engine to study user responses in similar situations as described in more detail herein below. The analysis may also provide ranking or recommendation of complete layout elements (other hierarchy elements such as preset page sections), sections of layout elements or specific layout element/component attributes (such as color and style).

Text generator 4204 may support (for example) the use of text templates which could be generic or adapted to the specific text object type (e.g., "about us", "our team") for each business family/industry as determined by family industry determiner 4202.

Such templates may include placeholders into which relevant values from the content elements may be inserted (including values from the "general" content element as described herein below, such as the business name and address).

Text generator 4204 may provide multiple text templates for each such role, e.g. multiple possible suggested text sections for an "our team" section (the object type) of a real estate law office (the business industry/family combination). Text generator 4024 may suggest specific text templates (based on a set of decision rules or crowd-sourced knowledge as described in more detail herein below) or use a randomized selection of possible templates.

It will be appreciated that the elements in CMS 50 are tagged with multiple metadata attributes, such as industry (for media files), family (for text files), website section (welcome, about, . . . ) possibly corresponding to a preset page section category and field category (title, subtitle, image, . . . ).

Text generator 4204 may select elements from CMS 50 by checking these attributes. The attribute values may be arranged in a hierarchical structure. For example, a golf site may check for "golf" and (if not found) check for the more generic "sport" (by going up the value hierarchy).

Figure 11:
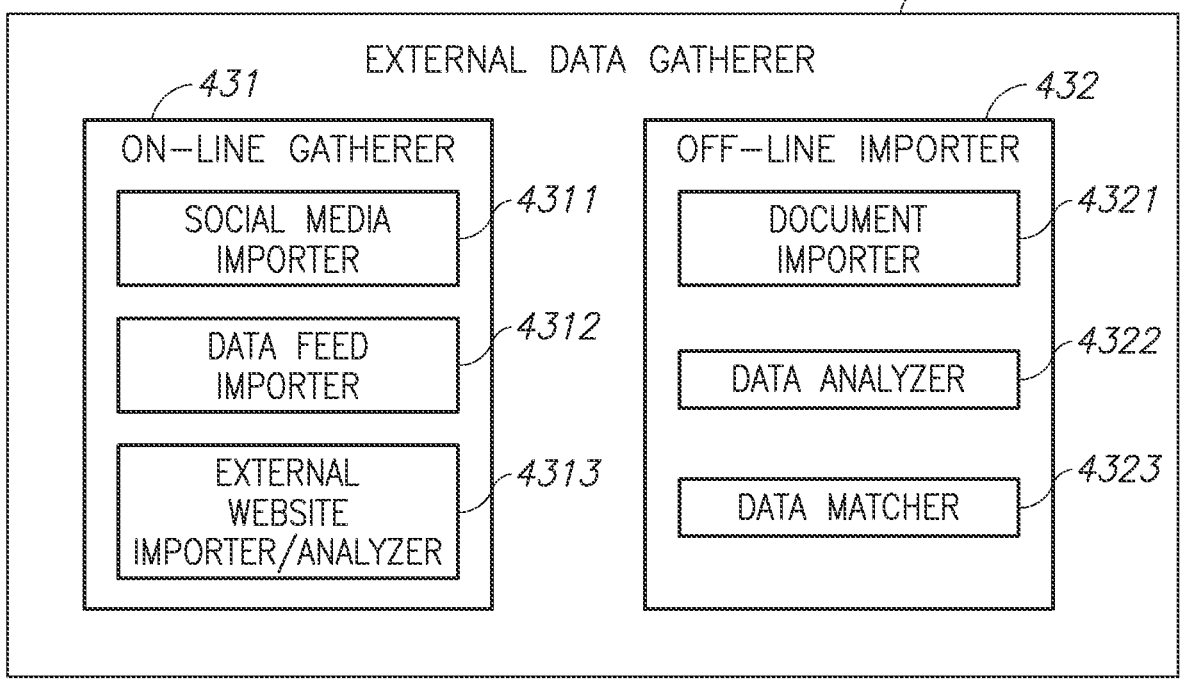
FIG. 11 is a schematic illustration of the elements of the external data gatherer of FIG. 2, constructed and operative in accordance with the present invention.
Figure 12:
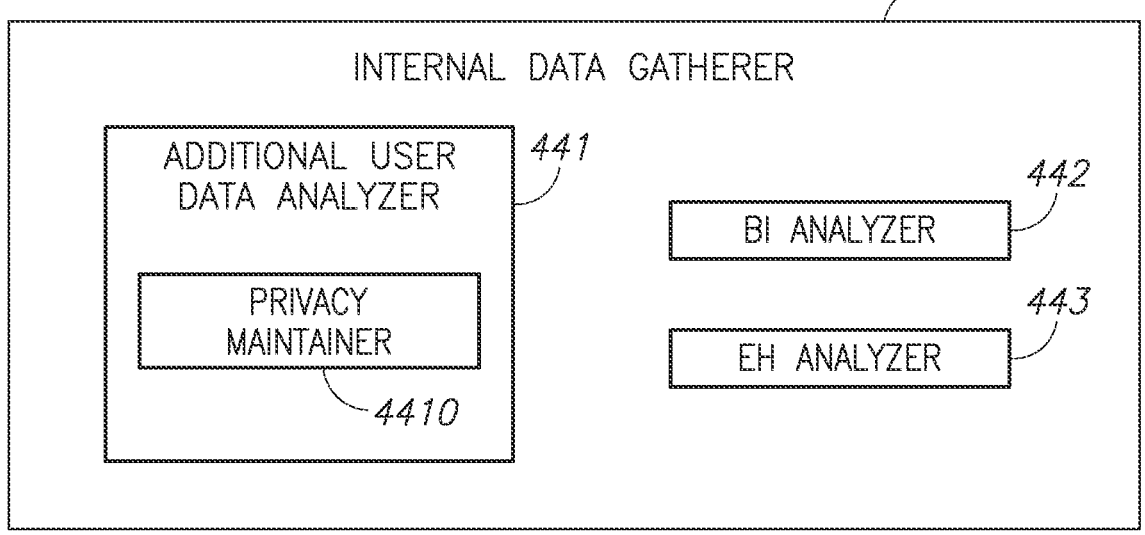
FIG. 12 is a schematic illustration of the elements of the internal data gatherer of FIG. 2, constructed and operative in accordance with the present invention.

Reference is now made to FIGS. 11 and 12 which illustrate the elements of external data gatherer 43 and internal data gatherer 44.

External data gatherer 43 may further comprise an online gatherer 431 and an offline importer 432. Online gatherer 431 may further comprise a social media importer 4311 a data feed importer 4312 and an external website importer/analyzer 4313. Offline importer 432 may further comprise a document importer 4321, a data analyzer 4322 and a data matcher 4323.

Internal data gatherer 44 may comprise an additional user data analyzer 441, a BI analyzer 442 and an EH (editing history) analyzer 443. Additional user data analyzer 441 may further comprise a privacy maintainer 4410.

As discussed herein above external data gatherer 43 and internal data gatherer 44 may extract information from user-related sources (and resources) and use it to create content elements and content element collections. This may be based on information determined by family/industry determiner 4202 and instructions from collected data searcher 4203.

Such sources of information may include, for example the social media accounts belonging to site designer 62 (e.g. from Facebook, LinkedIn, WordPress blog etc.), other websites or web presences associated with site designer 62 as well as existing sites belonging to site designer 62 created using website building system 5 (or other website building systems and platforms) which may be extracted and concerted into the structured format as described herein above.

It will also be appreciated that system 100 may also support various industry-specific sources. For example, a restaurant business may import menu information stored in a public menu repository such as the OpenMenu platform (from openmenu.com).

External data gatherer 43 may access these sources, extract content from them, analyze the extracted content, and locate relevant elements of information and save them in content element repository 506.

Online-gatherer 431 may gather any relevant information available from an online presence. Social media importer 4311 may import information from relevant social media sites as discussed herein above, data feed importer 4312 may extract information from data feeds (such as feeds built using the RSS standard) and external website importer/ analyzer 4313 may import relevant information from other websites after a basic analysis of its relevance.

Off-line importer 432 may retrieve information extracted from offline sources related to site designer 62 such as those manually provided by site designer 62 or extracted from offline documentation. Document importer 4321 may import the pertinent document, data analyzer 4322 may analyze its relevance and data matcher 4323 may match between extracted and analyzed data and the applicable content element fields (for example, so as to match an extracted list of employees to the relevant "our team" content elements and its fields).

For example, if given access to the "About" page of an existing site designer 62 website, external website importer/analyzer 4313 may take the page and try to find a repeating pattern which includes names of job titles (CEO, CFO, . . . ). If such a pattern were found, external website importer/analyzer 4313 may extract the data from each of the elements to create an "our team" content element.

As another example, external website importer/analyzer 4313 may analyze the user's offerings on an e-Commerce oriented website (such as Amazon.com or ebay.com) to extract product related information and create the appropriate content elements.

External website importer/analyzer 4313 may also interface to other systems operated by site designer 62 web-connected or not. Such systems may include accounting, point-of-sale, inventory, CRM, BI etc. This may require creating a per-user interface, or be based on interfaces to major providers of such systems—for example, a small number of POS system vendors serve most of the restaurant businesses.

Internal data gatherer 44 may gather information that is already stored within website building system 5, held within different content management systems for different users. Additional user data analyzer 441 may analyze user information held in user information repository 512 (other user parameters) and WBS site repository 509, BI analyzer 442 may analyze data held in BI repository 510 and EH analyzer may analyze data held in EH repository 513. Privacy maintainer 4410 may ensure that the privacy of the data belonging to other users is not compromised.

It will be appreciated, that unlike crowd source data analyzer 423 (discussed in more detail herein below), additional user data analyzer 441 may specifically deal with the extraction and analysis of data regarding other users, their profiles, their sites, their editing histories and their business analysis within website building system 5.

It will also be appreciated as discussed herein above, site generation system 40 may provide content elements based on a smart analysis of the collected data across different users as well as crowd sourcing in order to provide site designer 62 with an appropriate generated site.

Crowd source data analyzer 423 may handle the total collected information from external data gatherer 43 and internal data gatherer 44. Crowd source data analyzer 423 may use elements of crowd sourcing to provide guidelines for both content element and layout elements creation and processing while preserving privacy, anonymity and intellectual property laws. For example, if users typically enter 150-200 characters when describing a team member (i.e. filling a "team member" content element), system 100 may pre-select appropriate designs for the matching layout elements which are adapted to team member descriptions of that size. In another example, if many of the users who selected layout elements A and B (for a given purpose) had later selected layout elements X and Y, system 100 may automatically offer layouts X and Y to site designer 62 when he has previously selected layout elements A and B.

Such crowd-sourced information may be used for multiple purposes, such as providing guidelines for the generation of content element types and layout element types, the generation of questionnaires used to fill content elements, the filling in of actual questionnaires, the selection of layout elements and layout groups and the selection of design kits to use.

Crowd source data analyzer 423 may analyze data over the entire user population, or by analyzing segments of the user population (according to user's location, family/industry, type, "age" in the system, experience level, selected premium status etc.). Crowd source data analyzer 423 may perform the analysis via rule engine 422, or machine learner/AI engine 424 which analyzes user behavior to provide recommendations for site designer 62. For example for a law office creating a new site in a given geographical area, system 100 may suggest a given set of services. In this scenario, layout solution handler 427 may create a layout solution variant if numerous users have performed a similar change to a specific layout element as described in more detail herein below.

Such crowd-sourcing may include, for example defining default values for fields based on common use of values, changing field sizes to conform to typical use (in terms of the amount of data entered), changing order of fields or of a set of field possible answers (based on popularity), removing fields which users typically don't fill and adding new entries.

For example, if numerous responses in the "commercial law office" category added (manually) "employment agreement review" as an additional service to the list of possible services for this business type, crowd source data analyzer 423 may add this service type to the general list.

For the "additional service" example above, if the surveyed users only added these services under certain conditions (e.g. geography, user type or attributes, answers give to other questions etc.), crowd source data analyzer 423 may recognize that dependency, and only suggest the additional services under the relevant conditions. For example, a given legal service may be highly popular in a given country and may be related to a law unique to that country. Such an analysis may similarly apply to other examples above.

It will be appreciated that such crowd-sourcing may be based, in particular, on answers provided by a user whose business type and sub-type are similar to that of site designer 62. Such use of answers should be made only if a sufficiently large community (or sub-community) can be analyzed, in order to provide significance to the data on one hand, and sufficient privacy to individual user answers on the other hand.

It will be also appreciated that system 100 is required to keep the privacy, anonymity and copyrights (or other IP rights) of the users whose data is being analyzed. To do this crowd source data analyzer 423 may (for example) only provide suggestions based on statistical summarizing of multiple users, and only in cases where a sufficiently large number of users can be analyzed. Crowd source data analyzer 423 may further use techniques from the area of statistical databases security.

It will be appreciated that this methodology may provide better solutions to this information security problem compared to general-purpose statistical databases since site designer 62 may only receive specific site design recommendations, and cannot access the collected information (used to derive these recommendations) directly or perform arbitrary queries on it.

Machine learner/AI 424 may use artificial intelligence/machine learning) to provide an evolving and continuously improving interaction with site designer 62 based on the above mentioned crowd-sourced information. Such collected information reflects the actual use of system 100, the actual priorities set by site designer 62, and the actual use of preferences (as related to content, presentation, aesthetics or other aspects of the system) by the user community.

In particular, as the usage of system 100 grows, such information becomes statistically significant for additional (and more detailed) segments of the population. Thus, for example, once a sufficient number of construction related businesses use system 100, system 100 will be able to offer better results to such businesses. This process creates a set of positive feedback loops, thereby improving system 100 over time.

Once a sufficiently large number of users are using system 100, machine learner/AI 424 may use proactive learning and it may initiate A/B tests (via A/B tester 46) to actually test the responses to multiple options, and use the collected feedback as another input into the learning process.

CE generator 425 may use the questionnaire answers and information from external data gatherer 43, internal gatherer 44, answer analyzer 421, machine learner/AI 424 and crowd source data analyzer 423 to generate the content elements and fill in their fields. Other system elements may also use this accumulated knowledge for additional uses as discussed herein above.

CE generator 425 may also create questionnaire instances, or may infer required information from site designer 62 questionnaire responses through answer analyzer 421 (e.g. using natural language engine 4211 to handle processing for free format text answers such as "describe your business goals").

It will be appreciated that some elements of the questionnaire may be multiple-occurrence. Instances may be added and deleted (e.g. services, team members). Thus based on the answers to questions, CE generator 425 may create content elements and fill specific fields inside content elements. CE type creator/editor 410 may also define content element types dynamically and automatically, e.g. when importing content elements from an external source (such as a data feed) which includes variable format data, CE type creator/editor 410 may create content element types automatically to support the data provided by the external sources.

CE generator 425 may also create contained content elements inside other content elements (including creating instances of multiple-occurrence elements inside a given content element).

For example, if site designer 62 answers a question regarding the number of employees by specifying that he has 4 employees, CE generator 425 may create a content element of his business in which there are 4 contained content elements, one for each employee.

CE generator 425 may also fill questionnaire fields based on externally extracted data (e.g. from analysis of the user's websites) as described herein above.

CE/LE matcher 426 may support multiple methods to locate layout elements which match a given content. These methods may be used alone or in combination. These are typically relevant in a situation in which there is a repository of pre-defined layout elements, but may also apply when a layout is specifically generated for the filled content element (e.g. using a base layout which is expanded).

CE/LE matcher 426 may also use any of the methods implemented by the dynamic matching and adaptation module as described in US Patent Publication US 2014/0282218. This module performs dynamic matching and adaptation of views to data items which can be paralleled to layout element and content matching.

CE/LE matcher 426 may use pre-association. Under this method content elements and layout elements are pre-associated by SGS admin 61. These pre-associations are saved in CMS 50 together with the content elements and layout elements.

CE/LE matcher 426 may perform matching via common keywords. Under this method, both content elements and layout elements are assigned keywords by SGS admin 61. These keywords are typically selected from a hierarchy of keywords defined by the SGS admin 61, though other arrangements may be possible.

CE/LE matcher 426 may match content elements with layout elements which contain one or more identical keyword(s) (appearing in both the content element and layout element). CE/LE matcher 426 may rate the possible layout element matching according to the number of keywords matched (possibly adding a weight to each keyword).

CE/LE matcher 426 may match content elements and layouts element via a common attribute (specified as metadata of the content element/layout element). This could be a general type definition (e.g. matching "team member" content to a "team member" layout element) or a set of more complex attributes.

The attributes may use a hierarchical value space. In particular, the content element/layout element type attribute described above may use hierarchical values such as "computer_services/about/team_desc/team_member".

CE/LE matcher 426 may also match content elements and layout elements via field matching. Under this method CE/LE matcher 426 searches for layout elements which contain fields which match the fields included in the content element. Such field matching can be done according to general field type, e.g. matching a content element text field (e.g. a person's name) with a layout element text field (e.g. a website building system text component).

The field matching may also be done according to specific field type and based on additional component parameters. For example, a content element person name would be matched with a website building system text title field (adapted to display small amount of text) whereas a content element job description would be matched with a website building system text paragraph (adapted to display larger amount of text).

CE/LE matcher 426 may also perform field matching according to the semantic matching of field types, i.e. matching based on a hierarchy of website building system component types (as illustrated in FIG. 7 back to which reference is now made).

CE/LE matcher 426 may also disqualify a layout element (so it does not become a layout alternative for a given content element) if some of the content element fields are missing in the layout element. Alternatively, CE/LE matcher 426 may extend the layout element with additional fields as further described in more detail herein below.

It will be appreciated that all of these field matching methods may require SGS admin 61 to pre-map content element field types (which are defined in business terms, e.g. product price/person name/ . . . ) to website building system component types.

It will also be appreciated that CE/LE matcher 426 may have to perform matching between content element fields and the layout element fields in all cases, even if the initial matching was already done through pre-association, keywords or attribute matching. This is required so that layout solution handler 427 may present the content element fields in the proper places inside the layout elements. Such a matching may, however, be pre-defined by SGS admin 61 and layout elements may include predefined field associations to specific content elements.

CE/LE matcher 426 may also apply some initial visual and aesthetic criteria to the matched layout elements, depending in particular on the specific data in the specific content element instance.

For example, a specific layout element [L1] may be an acceptable match to a given content element[C], but when L1 is filled with the actual data from [C], a very dense or otherwise non-aesthetic version of L1 is created. In such a case, CE/LE matcher 426 may adjust the layout of [L1] (based on rules provided with L1) or disqualify it altogether and try to find a better matching layout element.

In particular and as discussed herein above preset page sections may implement multiple possible layouts and select which one according to the actual data filled in.

It will be appreciated that all of the methods above may result in multiple layout elements (i.e. layout variants) which can represent the same content element. These layout elements may be presented by layout solution handler 427 to site designer 62 separately (e.g. "please select the desired "about" layout/please select the desired "products & services" layout/ . . . ) or they can be combined to create multiple layout alternatives (as described in more detail herein below).

Figure 13:
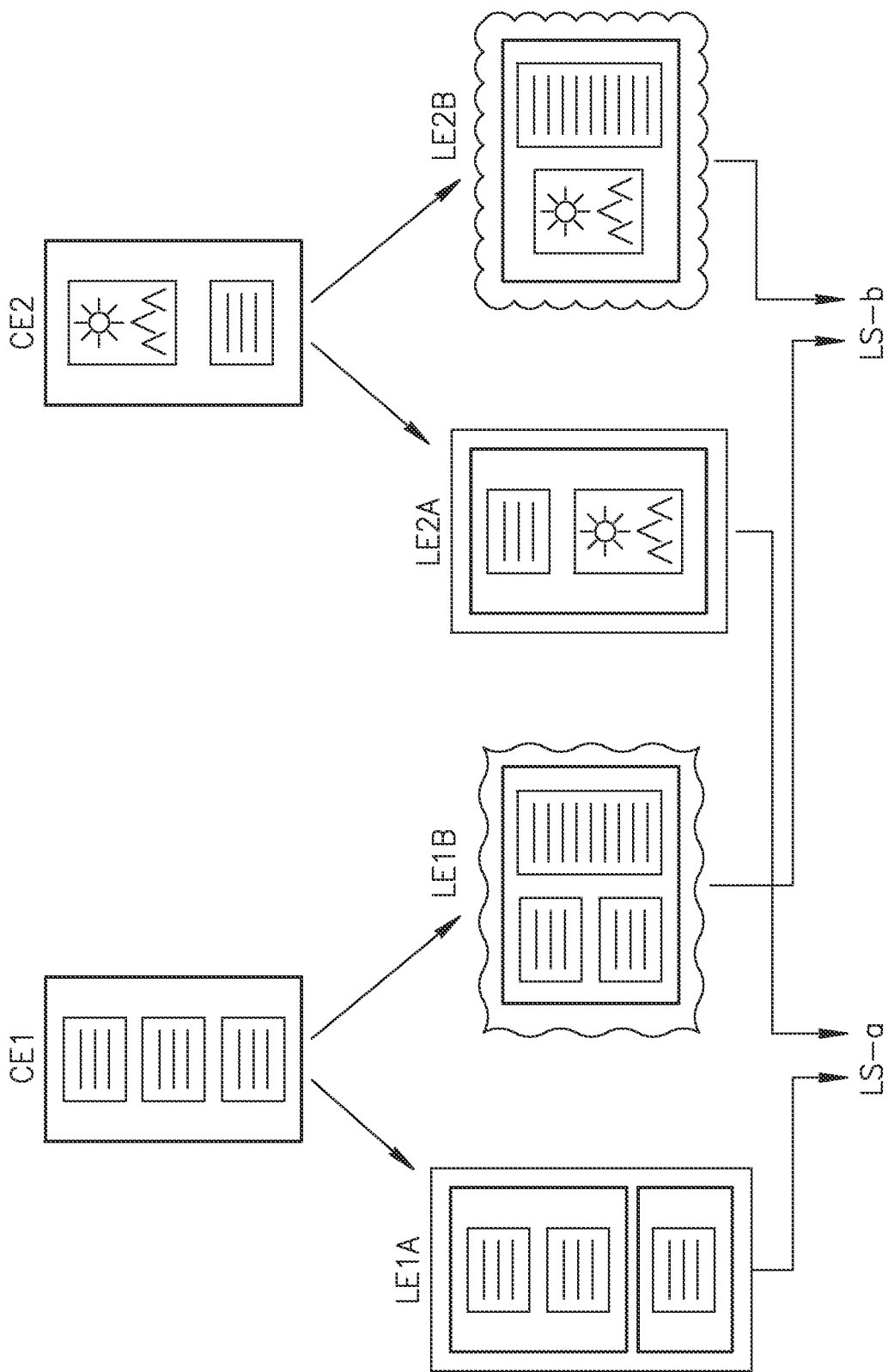
FIG. 13 is a schematic illustration of the matching of content elements and layout elements having multiple design styles, constructed and operative in accordance with the present invention.

In the latter case, layout solution handler 427 may create multiple layout alternatives while matching the style (or other attributes) between the different layout elements selected for multiple content elements, a process known as horizontal matching. Reference is now made to FIG. 13 which illustrates the matching of content elements to layout elements having multiple design styles. As can be seen content element [CE1] has two matching layout elements: [LE1*a*] based on the design style 'a' (e.g. a formal style) and [LE1*b*] based on the design style 'b' (e.g. a flowing artistic style). Content element [CE2] also has two matching layout elements: [LE2*a*] based on the design style 'a' and [LE2*b*] based on the design style 'b'.

Layout solution handler 427 may present site designer 62 with a unified selection integrating [CE1] and [CE2] and may ask site designer 62 to choose between layout solution LS-a (containing LE1*a*+LE2*a*) and layout solution LS-b (LE1*b* and LE2*b*).

Thus layout solution handler 427 may ensure that the suggested layout solution (as described in more detail herein below) has a consistent style (and other properties) throughout the solution.

CE/LE matcher 426 may perform such horizontal matching based on a set of pre-defined rules, as well as information gathered from the current designers and other designers (e.g. which layout elements are best used together). CE/LE matcher 426 may use rule engine 422 to process these rules and information.

It will be appreciated that the use of horizontal matching differs from the use of design kits. Horizontal matching controls which layout elements and layout element combinations are created and offered to site designer 62 as part of a possible layout solution. Based on horizontal matching, some combinations would be used, and others would be rejected. Design kits operate on a complete layout solution, and determine the basic parameters used for the layout solution style or design.

It will also be appreciated that if there are no precise matching layout elements for a given content element, CE/LE matcher 426 may find the most relevant non-matching layout element and extend it (e.g. by adding the required fields in an "overflow area" pre-defined in the relevant layout element). LE matcher 426 may also combine multiple non-matching layout elements which jointly provide the set of the required fields or may generate a relevant layout element automatically based on the content element content.

It will be further appreciated that layout elements may include additional layout-related information, including (for example) exception handling guidelines, e.g. what to do in case of field content overflow, display combination rules, what combinations of layout elements are allowed and overflow area definition (as described herein above). Such information may be available to CE/LE matcher 426 when performing horizontal matching and layout solution creation.

It will also be appreciated that discussion above has focused on matching a single layout element to a single content element (1:1 matching) and possibly matching multiple (combined) layout elements or a single (modified) layout element to a given content element (1:n matching). However, CE/LE matcher 426 may also support multiple content elements to a single layout element matching (n:1) and multiple content elements to multiple layout elements matching (n:m). In such a scenario, CE/LE matcher 426 is more likely to generate multiple matching solutions which will be displayed to site designer 62 for selection by layout solution handler 427.

Once a set of matched elements has been generated layout solution handler 427 may generate and present layout solutions.

Figure 14:
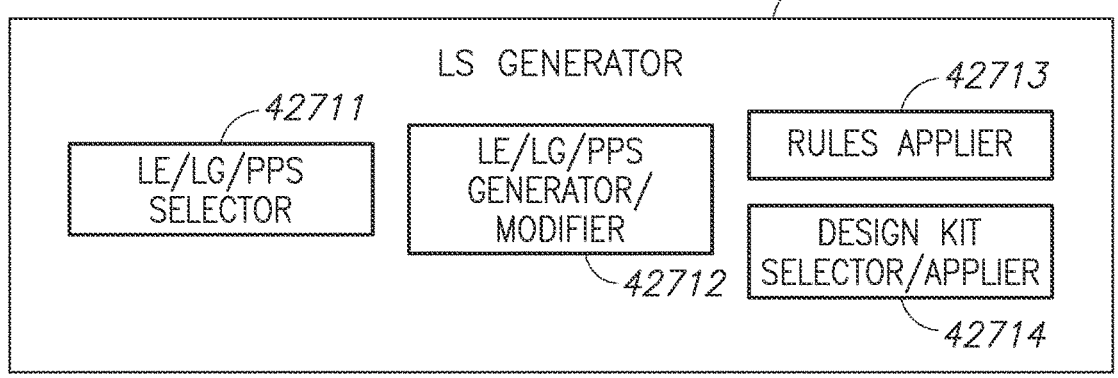
FIG. 14 is a schematic illustration of the element of the layout solution generator of FIG. 10; constructed and operative in accordance with the present invention.

As discussed herein above, layout solution handler 427 comprises a LS (layout solution) generator 4271, a LS (layout solution) presenter 4272, a LE (layout element) variant editor 4273 and a LSS (layout selection store) handler 4274. Reference is now made to FIG. 14 which illustrates the elements of LS generator 4271. LS generator 4271 further comprises a LE/LG/PPS selector 42711, a LE/LG/PPS generator/modifier 42712 and a rules applier 42713.

As discussed herein above, layout solution handler 427 generates multiple layout solutions which represent the relevant subset of information from CER 506. The process is based on the CER 506 information, rules repository 513 and possible user preferences. The process may also use external information, such as information on other sites of the same user and sites created by other (possibly similar) users as extracted by external data gatherer 43 and internal gatherer 44 together with any crowd sourced or machine learnt information as described herein above.

It will be appreciated that each layout solution may include (for example) a complete website (including multiple pages and other elements), a single page or a page section. LS generator 4271 may generate a great number of possible layout solutions, rank them and select a subset for display (as discussed in more detail herein below).

LE/LG/PPS selector 42711 may analyze the defined/collected content in content element repository 506, and determine how to divide the content between the website pages and allocate it to individual pages. Such a division may be based on a pre-defined site structure (determined earlier) which dictates the set of pages included in the site. The division and structure may also be automatically generated, in particular according to extracted user information (e.g. generating a site page for each product the user has listed on e-Bay). The layout solutions may reflect different content division alternatives.

Alternatively, LE/LG/PPS generator/modifier 42712 may generate a set of generic hierarchical layout element arrangements, which are not related to a specific business family or industry. Such an arrangement may be suitable (for example) for single page website layouts which can be used for multiple businesses and industries. Such arrangements may be based on predefined preset page sections or may include an arbitrary arrangement of layout elements on the page.

For example, CER 506 may contain multiple "services" content elements (which describe the different services provided by the business). LE/LG/PPS generator/modifier 42712 may typically map each such content element onto a service description layout element. LE/LG/PPS generator/modifier 42712 may then select from a "services page" template, either a full-page or a predefined preset page section style. The template may contain a placeholder for individual service layout elements (possibly arranged as a list). For example, some of these templates may show the services next to each other, and some may show them one above the other.

LE/LG/PPS generator/modifier 42712 may also combine the layout elements using various layout element combination rules which may then create higher level layout groups.

It will be appreciated that different layout elements and layout element combinations may display different fields or partial information. For example, a smart-phone oriented version of the layout element may show less information than the desktop version of the same layout element.

As discussed herein above, system 100 may use lists of elements in both content elements and list elements. The element list may typically reflect a matching content element lists. These lists may be implemented using a repeater element, which combines different sub-elements: a multi-element layout representing how the repeated elements are arranged (e.g. column, matrix, accordion, etc.) and an internal layout representing what the layout (and the displayed components) are inside each repeated element. This may include a generic internal layout (applicable to all elements) as well as local changes for the specific elements (e.g. in unstructured repeaters). The third possible sub-element of the lists is the data for each repeated element.

It will be appreciated that repeaters may be structured or unstructured. For structured repeaters, the layout for each element is set by the repeater, and all elements use an identical layout (typically through the use of an internal template included by all repeated elements). For unstructured repeaters, each element can be edited separately. Such editing may include the repeating list elements (e.g. moving or rotating it) as well as internal layouts (e.g. adding, removing or modifying contained components).

Typical implementations use structured repeaters, so modifying the layout of a single list element would apply the same change to other elements (as further described below). However, the system may also support zig-zag repeaters (i.e. consisting of two alternating layouts) or unstructured repeaters.

It will also be appreciated that layout solution presenter 4272 may offer alternatives (and thus include a "try another" button) at a number of levels, such as at the single layout element level, i.e. allowing selection of alternative layout elements for the same purpose and data (e.g. different "about" boxes).

Layout solution presenter 4272 may also offer solutions at the layout group or preset page sections level. It may allow the selection of different (higher level) layout group/preset page sections for the same purpose as well as at the solution level and allow a review of multiple solutions at the layout level. Layout solution presenter 4272 may also allow the use of the same layout element with a different internal layout. This may apply to a layout group as well as atomic layout elements.

Other levels may include height/width adjustment per layout element and the application of different styles.

Layout solution presenter 4272 may also offer a "try another" button which may switch to the next suggested option (according to ranking and diversification described herein below).

The "try another" button may also open a menu/list of suggested options, typically including a preview of the additional options, or applying the currently browsed alternative to the main screen (temporarily). It may also randomly change to a different option (a "kaleidoscope" option).

It will be appreciated that LE/LG/PPS selector 42711 may select which entities (layout element, layout group, preset page section, layout solution) or layouts (of entities) to include in the display based on a ranking process applied to the retrieved entities and arrangements. Such a ranking process may be based, for example, on a combination of entity quality and diversity (as described US Patent Publication No. 2015/0310124). Such a combined process includes a layout quality ranking function which provides a score for each possible variant of the entities or layouts according to aesthetic (or other) quality metric, a similarity function which provides a score for each pair of entities/layouts (where applicable), determining how visually similar they are and a combining algorithm, which provides an ordered set of alternatives for a given entity/layout so they have the highest quality but are also the most diverse (i.e. different from each other).

LE/LG/PPS selector 42711 may apply this process at multiple levels, so that layout solution presenter 4272 may offer alternatives for a single layout element as well as for combined layout element entities (such as the preset page sections as described herein above) and complete layout solutions.

Once site designer 62 has selected the proper entities to use at all levels (i.e. which layout solution, which preset page sections, which layout elements in each preset page section etc.), LE/LG/PPS generator/modifier 42712 may define a complete layout solution. The solution definition includes the selected solution and layout element hierarchy used, the mapping of content data to layout element fields (i.e. content element—layout element association and field mapping), and the visual arrangement of layout elements and components in each higher level layout element/layout group/preset page section.

The solution definition also may include how styles are applied to each layout element as well as design kit information. Design kit selector/applier 42714 may start with a default kit (fonts etc.) and change it along the way. Changes may affect the site structure (e.g. as font changes may cause fields to grow or shrink).

It will be appreciated that the choice of a design kit by design kit selector/applier 42714 may be made automatically based on the selection of a business family or industry as determined by family/industry determiner 4202 (i.e. the design kits are stored in the design kit repository 504 and design kit creator/editor 412 may mark them with a metadata tag which associates each design kit with various families and/or industries), though it typically corresponds better with the selection of a business industry (which affects the selection of images and background media).

It will be further appreciated that design kit selector/applier 42714 may allow design kits to be applied at all stages of the site creation process potentially even before site designer 62 has provided the website family and industry.

The family and industry information (if available) will often help design kit selector/applier 42714 to decide which design kits to offer to the site designer 62. For example, a law office website may often use more "formal" colors (e.g. brown, black or gray) whereas an ice-cream shop website may use bright and varied colors (like bright red, blue, and yellow). Thus, the selected design kits may be matched with the specific content world contained in the website.

It will also be appreciated that design kits may specify fonts and font sizes which may typically affect the size of all text elements. Thus, changing the design kit at any stage may require design kit selector/applier 42714 to adjust the current layout solution (or even all possible layout solutions).

It will be appreciated that all of the above elements form a complete solution definition for the current site, which is saved in layout solution store 508. Layout solution handler 427 may also store the alternative suggested layout solutions and (lower level) layout elements in order to quickly suggest these alternatives to the users (e.g. as design alternatives when editing the site).

As discussed herein above, site generation system 40 may allow site designer 62 to edit layout elements through LE variant editor 4273 (which may make use of WBS editor 30). LE variant editor 4273 may then create a local/private layout element variant which could be saved by site designer 62 (in a private section of the LER 507), to be reused in future sites and possibly be marketed to other users through a layout elements marketplace.

Layout solution handler 427 may also provide a complementary "favorites" option, which allows site designer 62 to bookmark his favorite layout elements (even if he did not create or edit them). Such an option may be available to all site designers 62, or may be limited to SGS admin 61 (i.e. the staff responsible for the creation and review of manually designed and selected layout elements).

In either scenario, the layout element may fail in its actual use. Site designer 62 may like it, but LS generator 4271 may determine that it is not suitable for actual use in some situations (based on the data to be placed into them, and the given set of design rules governing the generation of layout elements and generated sites).

LS generator 4271 may inform site designer 62 of the nature of the problem, allowing him to further modify the private/bookmarked layout (through LE variant editor 4273) so as to create a better solution. It may also suggest alternative or modified layout elements to site designer 62 in such a case.

As discussed herein above CE/LE matcher 426 may implement inter-layout element "horizontal" rules such as [use layout element X for "about" only if you use layout element Y or layout element Z for "our team"], or [use layout element X1 together with layout element Y1 as they have matching styles].

Rules applier 42713 may also implement inter-layout "vertical" override rules in which a layout element X may affect layout elements (and components) that are included in layout element X or containing layout element X.

Such rules may include, for example, a container layout element which implements a unique style or design, and which requires layout elements contained inside it to adopt that style or design as well when relevant (e.g. a style may be font related, and would thus apply to contained text-related elements but not to contained image-related elements).

In another example, a container layout element may require all contained layout elements or components which are of a specific type to include specific features and properties (e.g. requiring a contained video playback component to include a specific "video bookmark" feature UI).

In another example, a container layout element may require some contained layout element to insert additional ("grand-child") layout elements or components, or to implement a certain rule inside them.

Rules applier 42713 may implement open or closed override architecture rules.

Under an open override architecture, a container layout element can override any contained layout element B attribute or setting (e.g. force a value for any given contained layout element B attribute) when applicable.

Under closed override architecture, a container layout element A can only override contained layout element B attributes or settings if layout element B is pre-specified that the specific attribute or setting is override-able. Thus, layout elements may control the changes made to them by parent layout elements.

Rules applier 42713 may further limit such changes to specific attributes or settings. All of the above may be applied in the other direction, with a layout element similarly affecting a parent container layout element (or sibling layout elements contained in the same parent).

As discussed herein above, LSS handler 4274 may retain the design selection made by site designer 62. Such decisions are made at multiple levels, including the selection of layout solutions (at the site/page levels) and selection of specific layout elements to use. Site designer 62 may further select specific parameters for each layout group or layout element (such as configurations parameters).

These selections may be stored in layout selection store 508. Layout selection store 508 may be arranged as a value store according (for example) to the following keys: Page ID, content element instance ID, field (in content element) ID and design element.

LSS handler 4274 may ensure that layout selection store 508 is synchronized with the editing changes occurring in the web site (as discussed in more detail herein below) which is hierarchical in nature, e.g. site/page/section/component. LSS handler 4274 may allow changes in one site to be reflected in the other, so for example if site designer 62 duplicates a given site pages, the relevant layout selection store entries (matching the page to be duplicated) would be duplicated as well.

As discussed herein above, LS generator 4271 may generate layout alternatives at multiple levels (e.g. the site, page, preset page sections and layout elements levels). However, the layout solution generation process is typically adapted to the requirements of each such level.

It will be appreciated that in a typical embodiment, layout elements are created off-line, before performing the site generation process (although site generation system 40 may create layout elements dynamically or extend or otherwise modify existing layout elements). LS generator 4271 may create all permutations for the arrangements of a given set of elements and disqualify some of them based on a set of disqualification rules.

It will be appreciated that LS generator 4271 may perform all of the above before adding the content and verifying that the layout element is actually suitable in any given case. For example, a well-designed layout element may include a text field containing a single line. However, when used with actual content (from a content element) which contains a larger amount of text, the specific text fields have to grow to 2 or more lines, and the layout element design "breaks". In such a case, GS generator 428 may disqualify the layout element, but only during the actual site generation process.

It will also be appreciated that layout elements may be assigned a semantic meaning when created using layout element type creator/editor 414 before being paired with a content element by CE/LE matcher 426. This is done using rules which reference possible semantic roles at the layout element generation stage. For example, a layout element combining a single-line title field and a text field designed to be a product entry (containing a product name and a product description) would have the title at the top. For example:

Widget X12345
An advanced widget providing numerous functions while still being easy to maintain. A layout element combining the same fields for use in a testimonial would have a title at the bottom. For example:

"In my 30 years career in software development, this is the best software I've seen".
John Smith, CEO, Great Software Inc.

Figure 15:
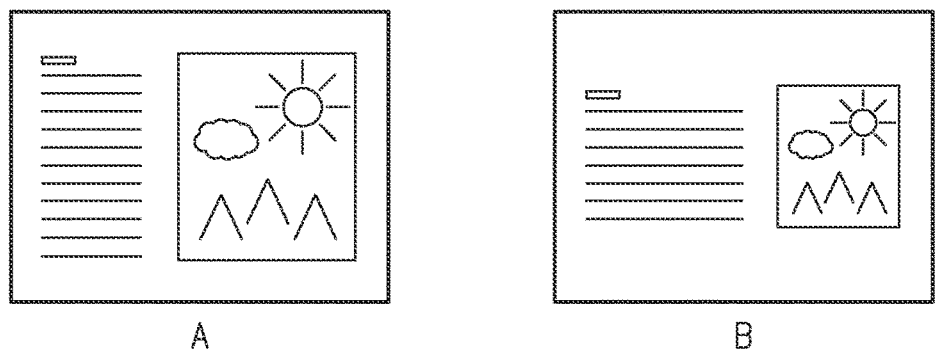
FIG. 15 is a schematic illustration of different layout element designs, constructed and operative in accordance with the present invention.

It will be appreciated that the layout element selection rules may also depend on general aesthetic concepts. Reference is now made to FIG. 15 which illustrates different layout element designs. As can be seen, both layout element designs (A and B) include a text field to the left of an image field. However, when filling in the actual text, in design A the text is not balanced with the image field whereas in B the two are much more balanced (i.e. have a similar size). Thus LS generator 4261 may generate layouts A and B (using the actual content) but may disqualify A and only use B for the rest of the process.

It will be appreciated that a page solution (inside a complete site layout solution) may consist of an arrangement of multiple layout elements. The arrangement may be dense (i.e. layout elements should cover the entire area) or sparse (allowing leaving uncovered area between layout elements as required).

One version of the page solution creation process by LS generator 4271 may include an initial process which divides the page into areas. LS generator 4271 may assign possible layout elements into each area (with a set of rules governing this assignment). The combination of the specific page division and layout element assignment (together with all relevant configuration parameters) creates a page solution.

LS generator 4271 may create all possible page solutions filling in the actual data and performing the resulting dynamic layout processing and other adjustments. LS generator 4271 may then disqualify the solutions which fail according to the provided criteria. The remaining solutions are then graded (e.g. according to quality metrics and inter-solution diversity) so as to provide the set of layout solutions presented to site designer 62 by layout presenter 4272.

It will also be appreciated that LS generator 4271 may also filter the design kits offered to site designer 62 based on their interaction with the actual site layout and content. For example, if site designer 62 included a substantial amount of text information in some areas in the site, LS generator 4271 may refrain from offering design kits with large font sizes which would cause the text to overflow the allocated space and require changes to the underlying layout.

Design kit selector/applier 42714 may also use extracted possible or recommended colors from various business-related sources, such as the business logo (which may be available, even off-line from a business card), other printed business materials or an existing website.

Design kit selector/applier 42714 may further check that a specific design kit (possibly modified by site designer 62) works with the suggested layout solution (as discussed in more detail herein below). In particular, design kit selector/applier 42714 may check that intersecting or otherwise adjacent color surfaces in the website work together (e.g. don't have identical colors or clashing colors) according to pre-defined rules.

It will be appreciated that some of the layout element assignment rules as assigned by rules applier 42713 (as discussed in more detail herein below and which govern in what areas a given layout element can be placed) may depend on the specific configuration of the areas to which the layout element may be assigned. For example, in strip-based page construction (as described herein below), a rule may specify that a "full width strip can only host a welcome layout element E".

Figure 16:
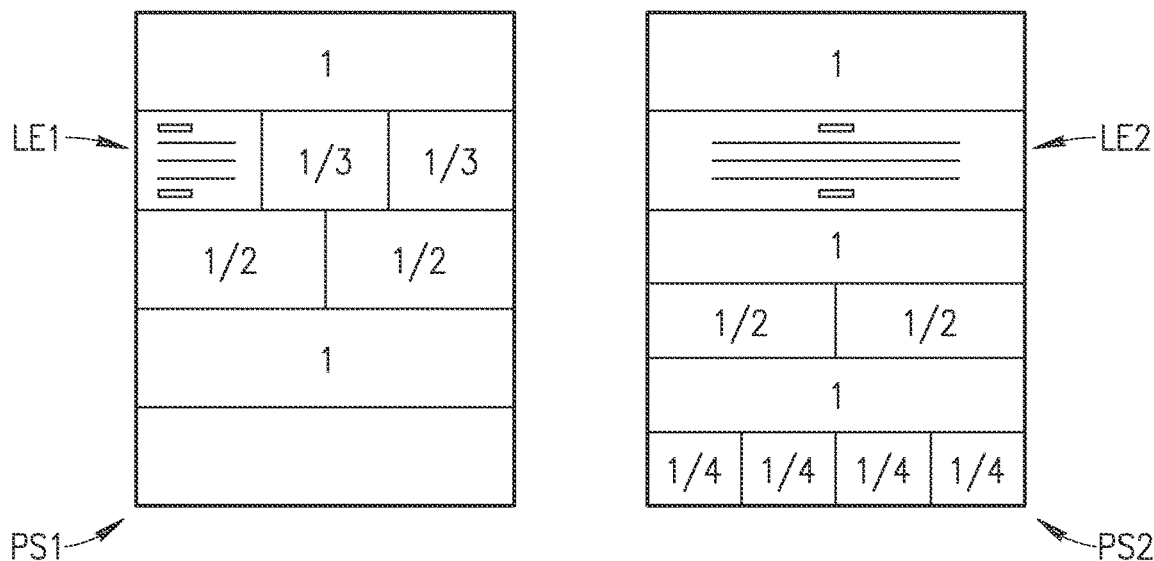
FIG. 16 is a schematic illustration of use of different divisions of a layout into areas and page solutions to show content; constructed and operative in accordance with the present invention.

It will be appreciated that LE/LG/PPS generator/modifier 42712 may perform the initial division of the page into areas (as part of the page solution creation process) using strip-based page construction. In such a division, LE/LG/PPS generator/modifier 42712 may divide the page vertically into strips (which may have different heights). Each strip is in turn divided (horizontally) into 1 or more columns (possibly having different widths), and each such column is an area into which a layout element may be placed. FIG. 16 to which reference is now made illustrates a number of such arrangements. It will be appreciated that the columns may actually have different widths, and are not required to be symmetrical.

Rules applier 42713 may implement specific rules on allowed strip sequences. For example, such a rule may define that a series of strips having 3/4/3/4/ . . . columns is allowed, but a series of 1/3/1/3/ . . . columns is not allowed (since it is not as aesthetically pleasing).

Rules applier 42713 may also implement rules regarding which areas may hold which layout elements. For example, a rule may specify that "full width strip can only host a welcome layout element" or "a strip may have at most 3 columns containing testimonials".

The same content (or content element) may be presented using different layout elements in different areas in different page solutions. For example, in FIG. 16 to which reference is now made, the same content may be represented left adjusted in LE1 (left column) inside PS1; and centered in LE2 (full width column) inside PS2.

The description above refers to vertical division into strips, but LE/LG/PPS generator/modifier 42712 may also implement initial horizontal division into strips (or actually columns) which are then sub-divided. Such a division may be more useful, for example, for far-east vertically written text, or sites whose layout mimics the paper-based columnar division of some newspapers.

LS generator 4271 may use multiple factors when determining the ordering of elements (as described for orderer 4130 herein above, or as applied when determining how to rank generated layout elements or layout solutions to present to site designer 62).

It will be appreciated that existing systems typically do not attempt to determine the exact (and optimal) layout to be used for the displayed data fields. They provide the information to the browser which in turn performs the final rendering, including final adjustment of fields and layout according to the amount of information (text and images) used in the layout.

Thus, when inserting data fields into placeholders in a template layout, the final arrangement of the layout may change (e.g. a large amount of text was inserted into a given text field in the layout), and the layout change may turn a visual pleasing and desirable layout into a less desirable one.

It will be appreciated that the problem of pre-calculating the expected size of displayed text is difficult in particular, as each glyph size is affected by multiple factors including the specific CSS used, use of special text effects (text shadow, 3D glyphs) etc.

It will also be appreciated that there are numerous additional factors in the browser rendering process which make calculating the final layout difficult, such as the use of CSS-directed image resizing operation.

Desktop publishing systems (and similar off-line graphical design software such as Adobe's Photoshop) do perform exact layout calculation, and are able to precisely position the text elements. However, such desktop publishing systems work in a static environment (in which the fonts in use and other sources of layout information are predetermined) and not in a dynamic website creation environment. Furthermore, such desktop publishing systems do not go through a browser rendering stage, but manage their own rendering.

Existing prior art systems for website creation do not have this information when designing the site or creating the layout, and thus cannot optimize the generated layouts.

It will also be appreciated that LE/LG/PPS selector 42711 may perform full decoding of the relevant CSS code, to determine what elements of the CSS apply to each part of the layout.

LE/LG/PPS selector 42711 may also perform the required multiple measurements of the glyph and text sizes, in order to determine the extract text size which applies to every part of the layout (including the various text effects which may modify the text size).

LE/LG/PPS selector 42711 may also apply the collected information to determine the exact (pixel level) visual representation for all relevant layout elements possibly emulating the layout algorithm used by different browser display engines.

Furthermore, LE/LG/PPS selector 42711 may perform such steps before filtering the possible layout elements in order to evaluate alternative layout elements and layout element/layout groups/page arrangements based on how the layout element is actually going to look on the screen when using the current content and calculating exact layout for each possible page/layout element solution.

As discussed herein above, layout presenter 4272 may present one or more layout solutions for selection by site designer 62. The selection may include which top level layout solution to use, as well as the choice of layout element configurations and options at multiple levels of the layout element hierarchy and the design kit(s) to use.

Once site designer 62 is satisfied with the division of elements between pages and the look assigned to each page, site designer 62 may press "generate" and GS generator 428 may convert the definitions into a regular (editable) site (the generated site).

GS generator 428 may build the generated site automatically based on the arrangement of the layout elements which include the content from content element repository 506.

It will be appreciated that the underlying structure of the website (as represented in website building system 5) is different from the layout element hierarchy generated by the system earlier. In particular, the website is typically represented as a hierarchy of components and containers (which are purely visual entities), whereas the layout element hierarchy consists of layout elements which represent real-world entities (such as a team member, a product or a business location). GS generator 428 converts from the layout element-based representation to the component-based one.

It will also be appreciated that GS generator 428 can later re-generate the website from CER 506 (e.g. if CER 506 was modified). Thus, site designer 62 may be able to re-generate the desired solution if some of the underlying (CER 506) data has changed, and use the same set of choices he has made in the previous version (subject to later modification).

As discussed herein above, CER 506 includes information from multiple sources, including CMS 50, user-generated content (e.g. questionnaire answers), retrieved information (from the user's sources and other sources) and possibly off-line information. GS generator 428 may be able to generate new versions of the generated site automatically when the information from these sources change. This may also include dynamic on-line re-generation for sources which provide rapidly-changing data.

It will be appreciated that GS generator 428 generates the generated site which is a regular website building system site, and thus site designer 62 may edit it using regular WBS editor 30. It will be further appreciated that WBS editor 30 may limit editing so (for example) the area of the generated site corresponding to a given preset page section may only allow existing components to be modified (e.g. moved or having attributes modified), but may not allow component insertion or deletion. As another example, WBS editor 30 may only allow changes which are within the scope of a single layout element (e.g. moving, inserting or deleting sub-elements), but not allow changes which may cross a layout element boundary (e.g. moving a component from one layout element to another).

WBS editor 30 may activate such editing limitations automatically, based on an analysis of the layout element structure. WBS editor 30 may also apply editing limitation hints provided by the specific layout elements or layout groups.

Layout elements and layout groups may also define which additional editing operations are to be provided by WBS editor 30 (when editing the components related to the given layout element/content element), and which operations should be limited or modified. In particular, a layout group representing a content element which includes a list of sub-content elements (e.g. the list of services provided by the business) may define list editing operations to be provided in the website building system environment including (for example) add list member; delete list member, re-order list members and define list sorting order. Such list editing operations may directly modify CER 506, LER 507 and the generated site in parallel. In another example, a given layout element may describe a complex (multi-component) video player element, including a main video playback window component and multiple playback control buttons. The layout element definition may provide hints to website building system 5 that the main playback window component may not be deleted and must have a certain minimal size, whereas some playback control buttons may be freely edited, or even deleted altogether. WBS editor 30 may receive these hints (included in the generated site structure) and extend, modify or limit the visual editing activity based on it. Alternatively, WBS editor 30 may analyze the generated site and infer some visual editing limitations or variations though its own analysis.

Thus, the existence of an underlying layout element/content element structure may transform WBS editor 30 into a dual-purpose editor, supporting visual (website building system) editing as well as structured (layout element/content element) editing.

Figure 17:
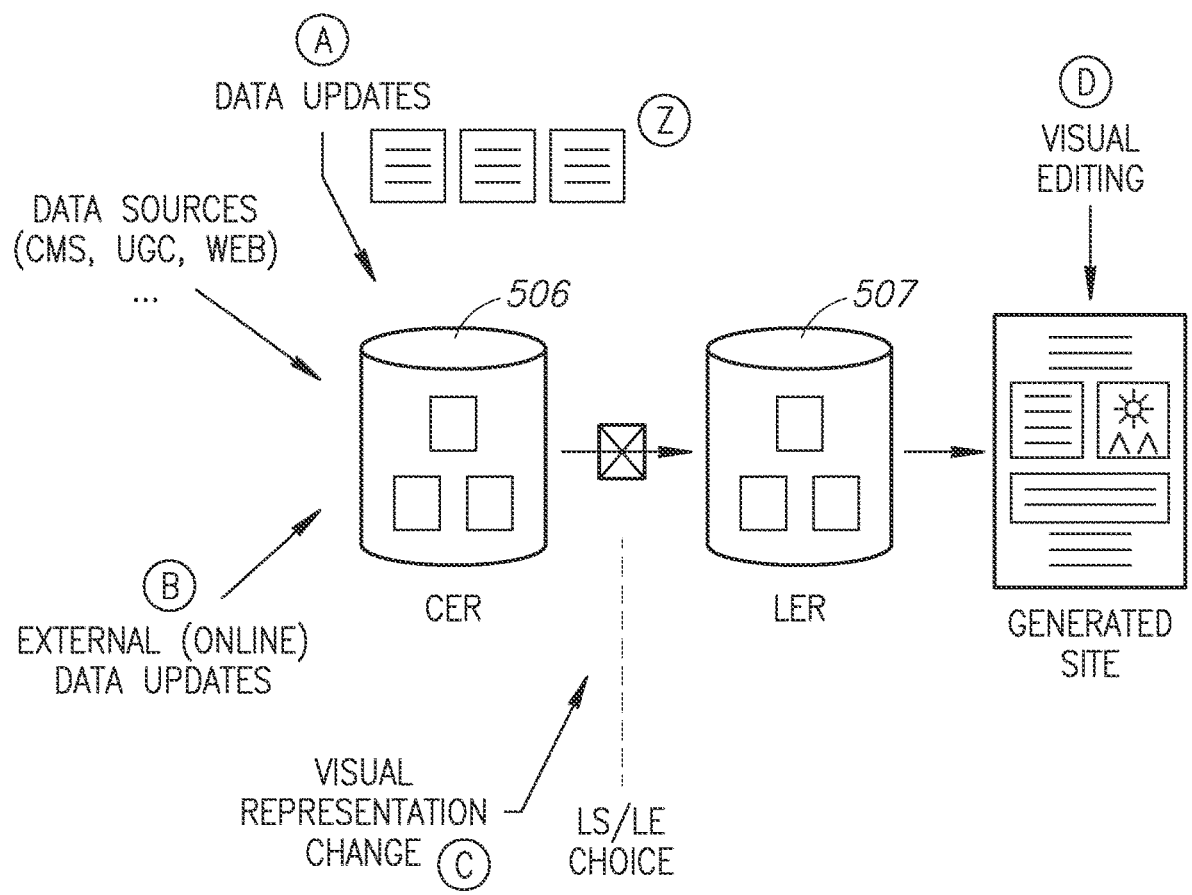
FIG. 17 is a schematic illustration of the merging of different sources for changes in the generated website, constructed and operative in accordance with the present invention.

Reference is now made to FIG. 17 which illustrates how a generated site may be modified via multiple update paths. One path [A] is the user-initiated re-generation of the generated site from CER 506 and LER 507 due to underlying data changes (e.g. changes to the business location). In another path, site designer 62 may re-execute some of the questionnaires [Z] and change the previous responses.

In another path [B], the automatic re-generation of the generated site from CER 506 and LER 507 due to underlying data change independent of the actions of site designer 62 (e.g. due to changes in data extracted from external sources which changes over time).

Another path [C] is the re-generation of the generated site from CER 506 and LER 507 after site designer 62 has selected different visual layout element representations of the same CER 506 content (e.g. switching to a different layout solution, or selecting alternative layout group/preset page section/layout element at some level).

Another path [D] is the modification of the generated site is changes made by site designer 62 to the generated site via the WBS editor 30.

Visual editor change incorporator 45 may support the merging of changes occurring through the different update paths, though in some cases this may be impossible. For example, if site designer 62 modifies the about box of the generated site (via WBS editor 30), and then selects a new layout solution which does not include an about box at all, it may be impossible for visual editor change incorporator 45 to reconcile changes with the new design.

Figure 18:
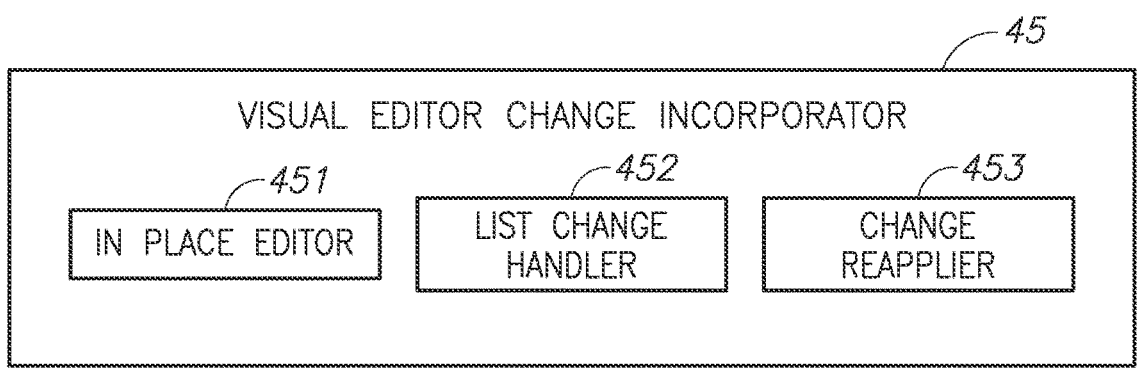
FIG. 18 is a schematic illustration of the elements of the visual editor change incorporator of FIG. 2, constructed and operative in accordance with the present invention.

Reference is now made to FIG. 18 which illustrates the elements of visual editor change incorporator 45. Visual editor change incorporator 45 may comprise an in place editor 451, a list change handler 452 and a change reapplier 453.

It will be appreciated that visual editor change incorporator 45 may implement a number of methods (described in more detail herein below) which may be used separately or in combination as relevant. In some of these methods generated site changes may directly affect (and modify) CER 506 and LER 507. In some of the methods generated site changes are saved and re-applied when the website is re-generated from CER 506.

Visual editor change incorporator 45 may handle direct generated site editing by propagating the changes (immediately) back to the CER 506 and LER 507. As discussed herein above, visual editor change incorporator 45 may provide a set of mechanisms linking the website building system components back to CER 506 and LER 507 used to generate them.

Visual editor change incorporator 45 may use a set of back-pointers from the component to the layout elements and from the layout elements to the content elements.

Visual editor change incorporator 45 may keep a set of records detailing the matching (both structure to structure matching and specific field to field matching). It may also keep the layout elements as transparent containers in the generated site pages.

Figure 19:
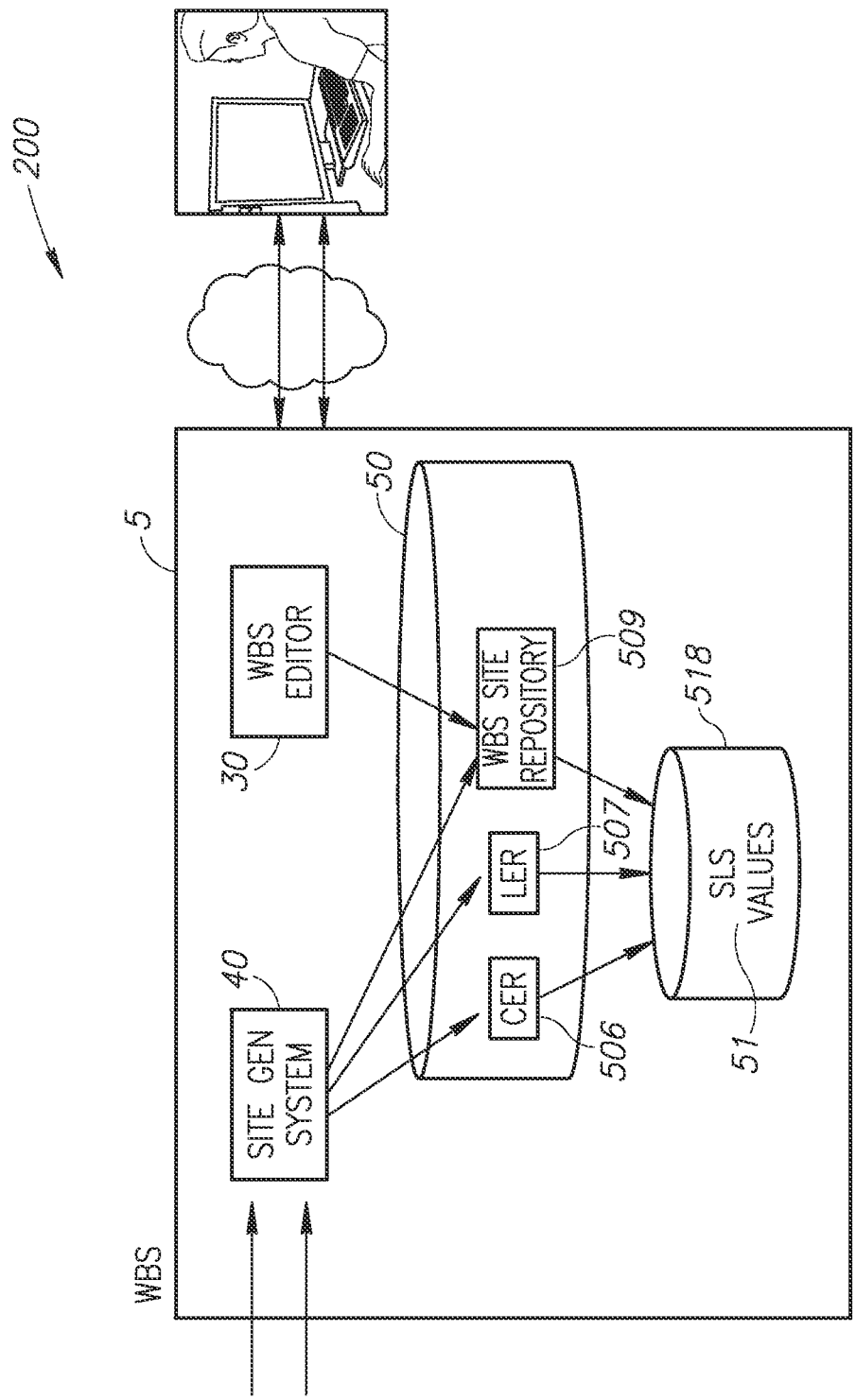
FIG. 19 is a schematic illustration of an alternative version to the system of FIG. 1 implementing a single location storage architecture, constructed and operative in accordance with the present invention.

Such change propagation may also be implemented through the use of single location storage (SLS) system 200 (as illustrated in FIG. 19 to which reference is now made). Under system 200, the main repositories used by system 100 (e.g. CER 506, LER 507 and WBS site repository 509) may be stored in CMS 50 so that values included in multiple repositories are stored just once in SLS values repository 518. This may be achieved (for example) by storing pointers to value records instead of actual values in the main repositories, or by using a data storage schema which unites multiple occurrences of the relevant values into a single location.

System 200 may apply not just to "field values" per-se (e.g. a business name or address), but also to layout/style information (such as size, position, color, etc.) as such layout/style information may be shared between LER 507 and the generated site. It will be appreciated that filled questionnaire repository 505 may also be stored this way.

It will also be appreciated that some changes may break these above mentioned mechanisms. For example, moving a component "outside" of its layout element may break the correspondence between the relevant generated site area and the underlying layout element.

List change handler 452 may support many change types by using list editing operations (add member, delete member, etc.) implemented by performing the list operations in parallel on the generated site, LER 507 and CER 506. List change handler 452 may detect list-oriented changes (such as list member addition and deletion) performed on list elements through WBS editor 30, and may implement the appropriate changes to LER 507 and CER 506. List change handler 452 may also directly interface with WBS editor 30 to perform such operations.

Visual editor change incorporator 45 may support changes to fields which are mapped to layout element fields, and through the stored content element-layout element matching information back to the original content element field.

Visual editor change incorporator 45 may also support changes to layouts (e.g. field moving/resizing) by duplicating the change in the stored layout element layout information. Visual editor change incorporator 45 may handle a repeating layout element change by creating a user-specific local/private layout element variant.

Website building system 5 may provide a UI (useable during visual website building system editing) which allows site designer 62 to select an alternate layout variant from the original set of layout elements offered to site designer 62 and saved in CMS 50.

Visual editor change incorporator 45 may also handle direct generated site editing by re-invoking the site generation system UI as required. Thus, whenever site designer 62 attempts to modify a part of the page generated from a given questionnaire, in place editor 451 may instruct questionnaire runner 4201 to offer the relevant questionnaire(s) (filed with the original answers used when generating this page area and direct site designer 62 to make the changes through that questionnaire, instead of editing the value through the site's components. Once finished, GS generator 428 may re-generate the site (or the relevant page or page section only) based on the value changes made though the questionnaire.

It will be appreciated that such regeneration of page sections is effective as in many cases a single content element maps to a single layout element which in turn maps into a single container in the generated site (e.g. a product content element mapped into a product layout element and product description in the site's products page). Thus, in place editor 451 may instruct questionnaire runner 4201 to pop up a questionnaire for the content element, and GS generator 428 may only need to regenerate the content of the specific container. Even if the re-generated container has different dimensions compared to the previous version of the container, GS generator 428 may handle this through the use of dynamic layout (as described in US Patent Publication 2013/0219263).

Similarly, in place editor 451 may invoke the layout element/layout solution selection UI whenever site designer 62 attempts to change the component layout in the relevant parts of the site, in order to obtain a new layout among these previously offered to site designer 62.

It will also be appreciated that some parts of the site may be manually created (through WBS editor 30 or externally created outside of system 100). In such parts, WBS editor 30 may support local editing of these site parts without invoking the site generation system UI, as these parts of the site do not have a background or underlying CER 506/LER 507. Furthermore, visual editor change incorporator 45 may not handle such site areas.

Visual editor change incorporator 45 may also combine the two methods above, i.e. allow site designer 62 to edit the generated site via WBS editor 30 (and propagate the values as required), or to pop up the specific questionnaire and re-generate the relevant site section.

Visual editor change incorporator 45 may also merge changes by re-applying the generated site editing changes when the website is re-generated from CER 506.

It will be appreciated that visual editor change incorporator 45 may use the methods described in US Patent Publication No. 2015/0074516 entitled "Mobile Application Conversion" published Mar. 12, 2015 and assigned to the common assignee of the present invention by re-applying changes made to a mobile version of a website after the mobile site is re-generated from an updated desktop site. Visual editor change incorporator 45 may further use editing history information collected by WBS editor 30 and change reapplier 453 may reapply the editing actions to the re-generated site or site area.

It will be appreciated that site designer 62 may have changed the layout or layout solution (for some or all of the generated sites) before re-generating and CE/LE matcher 426 may then perform horizontal matching between the old and new layout in order to resolve the merging.

Figure 20:
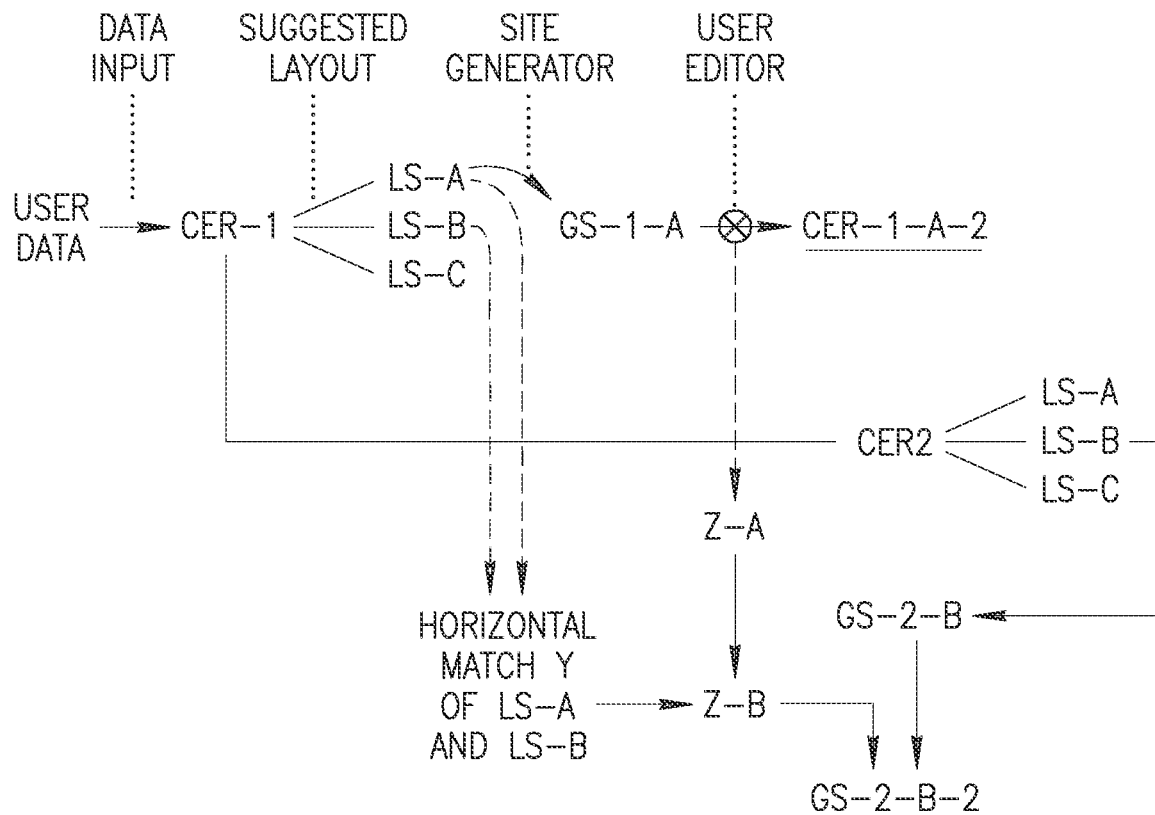
FIG. 20 is a schematic illustration of merging updates to site content, the selection of a layout solution and manual editing of the site generated by the system of FIG. 1; constructed and operative in accordance with the present invention.

Reference is now made to FIG. 20 which illustrates a scenario of the process of merging updates to a website and the selection of an alternative layout solution.

Site designer 62 may create a content element repository CER-1 (e.g. by filling questionnaires). Layout solution presenter 4272 may offer a set of possible layout solutions (LS-a, LS-b and LS-c). Site designer 62 chooses LS-a. GS generator 428 generates site GS-1-*a*.

Site designer 62 then makes some layout changes to the site GS-1-*a* using WBS editor 30, creating GS-1-*a-z*. Site designer 62 (or change reapplier 453) may update CER-1 and change it into CER-2 (e.g. due to external data changes). Site designer 62 regenerates the site, but this time chooses the layout described by LS-b instead of LS-a.

Change reapplier 453 now has to merge 3 sets of changes: the content changes from CER-1 to CER-2, the updated layout solution choice which changed from LS-a to LS-b and the explicit editing changes which changed GA-1-*a* into GS-1-*a-z*.

Change reapplier 453 may instruct CE/LE matcher 426 to create a horizontal match Y between LS-a and LS-b (e.g. based on common element IDs, or based on merging the two set of "matchings"—[CER-1 to LS-a] and [CER-1 to LS-b]).

Change reapplier 453 may then extract (from editing history repository 511) the set Z-a of editing operations used to edit GA-1-*a* into GS-1-*a-z*.

Based on Y, change reapplier 453 may then convert the editing operations set Z-a into a matching set Z-b applicable to LS-b.

Change reapplier 453 may then instruct GS generator 428 to regenerate the site based on CER-2 and LS-b, creating GS-2-*b*. Finally GS generator 428 may apply Z-b to GS-2-*b*, creating GS-2-*b-z*.

It will be appreciated that WBS editor 30 may provide a UI which allows editing of some of the layout element types rather than the specific layout element instances containing the data for the current site. This way, site designer 62 may edit (once) the layout element type definition which provides a "mini template" of a repeating object inside a repeater layout element (as described herein above), and it may affect multiple repeated objects in a repeater layout element (which use this layout element type). Such editing (known as "in-line editing") may be applicable to non-repeater layout elements as well. An example would be editing the title of a repeated element, affecting the title in other elements sharing the same layout element type (or underlying template).

It will be appreciated that this process may create a new variant of the layout element type (possibly defined using inheritance from the previous definition and a set of modifications). This new variant may be used by site designer 62 (or offered by system 100) for new layout element instances of the same type.

WBS editor 30 may provide a UI mechanism which determines if a given change to the generated site is aimed at changing a specific instance or the template underlying this instance. This is particularly important for editing of unstructured repeaters.

Visual editor change incorporator 45 may store such an alternate design in a per-user layout element type variants repository (e.g. inside the layout types repository 503). System 100 may further provide site designer 62 with the ability to publish and share such alternate designs, including the ability to offer them through object marketplace 15.

As discussed herein above A/B testing may be applied to all aspects of system 100, including (but not limited to): content element type definitions, generation of questionnaires used to fill content elements, presentation and filling in of actual questionnaires, layout element type definitions, the selection of layout elements and layout groups and the selection of design kits to use.

A/B tester 46 may apply standard A/B testing to the content of the tested entity, which entities are presented to the user and in which order and priority.

Figure 21:
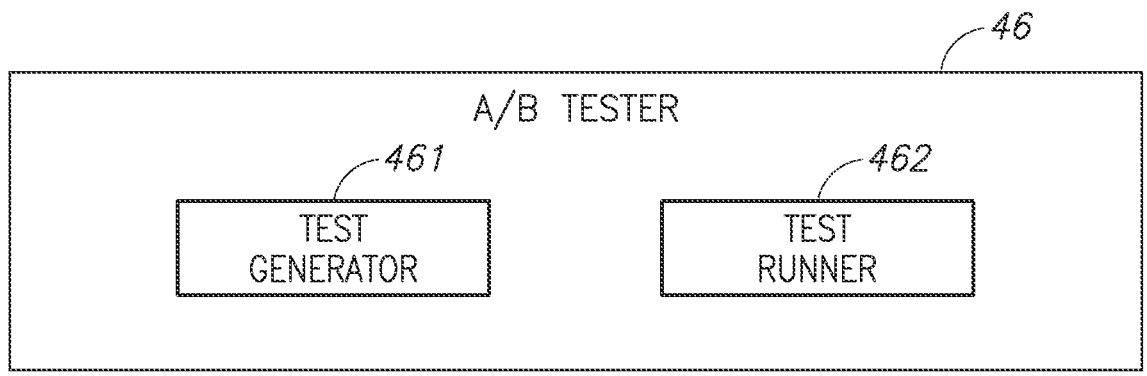
FIG. 21 is a schematic illustration of the elements of the A/B tester of FIG. 1, constructed and operative in accordance with the present invention.

Reference is now made to FIG. 21. A/B tester 46 may comprise a test generator 461 to generate the A/B tests and a test runner 462 to run them. A/B tester 46 may store the results in BI repository 510 or alternatively in a separate dedicated repository.

It will also be appreciated that the results of such A/B testing may be used by SGS admin 61 and site designer 62 to manually adjust the behavior of system 100, and can also be used as further input to a machine learning engine as described herein above. It will also be appreciated that such A/B testing may be completely automatic, or controlled by site administrator 61 as required.

A/B tester 46 may use an experiment manager and infrastructure similar to those described in US Patent US 2016/0124839 entitled "System and Method of Handling Complex Experiments in a Distributed System" published May 5, 2016 and assigned to the common assignee of the present invention.

Repurposer 47 may allow CER 506 (that has been filled by site designer 62) to be used for additional purposes, such as the generation of an alternative website view which provides better information for search engine indexing (a search-engine friendly version, possibly including a specialized site-map or additional SEO support information).

Repurposer 47 may also allow using CER 506 information to interface to external systems, e.g. when registering the website in an industry index website. As another example, system 100 may support the automatic registration of a law office in a law office directory and may also index the website under the specific services provided by the registering law office.

Repurposer 47 may allow CER 506 to be used for marketing purposes, e.g. allowing marketing to be directed at WBS 5 users whose website has specific attributes and to create a presentation of the business information in various standard business semantics schema or/interchange format (such as XBRL). Repurposer 47 may also provide individualized promotions e.g. promotions to users in a given line of business or for these providing a specific service.

Repurposer 47 may also allow CER 506 to interface through data formats and protocols which require semantic understanding of the websites, such as data formats and protocols related to the semantic web.

As discussed herein above, the main UI sequence is a sequence of typically short questionnaires. It will be appreciated that such a UI sequence lends itself very well to voice guidance/voice assistance input. SGS voice walkthrough driver 48 may provide a virtual assistant such as Apple's Siri, Google Now or Microsoft Cortana when working on a mobile device (though sound input may also be used on a desktop device as well) to read the questionnaires to site designer 62 and to receive answers.

SGS voice walkthrough driver 48 may either be standard software available on the underlying platform, or a specialized voice input option designed for system 100 to quickly create a website.

It will be appreciated that the discussion above has focused on a full embodiment of system 100 as provided to a regular site designer 62. In an alternative embodiment to the present invention system 100 may also be implemented in a variety of modes and use cases as described herein below.

In a regular scenario, system 100 may be used by a regular designer (the consumer) to create a website. In this scenario, regular users may use the full processing path, from answers to content elements to layout elements to a created website. Such users may typically use pre-defined questionnaires, content element types and layout element types.

Such a user may typically use a data gathering tool such as external data gatherer 43 and internal data gatherer 44 from existing websites or social media presences, as well as external data sources as described herein above. It will be appreciated that this version of system 100 may be implemented at a number of levels which differ based on the handling of the underlying elements which include questionnaires, content elements, layout elements (including layout groups and preset page sections) and design kits.

At the basic level, the user (designer) may use system 100, but underlying elements are designed and modified by the website building system vendor internal personnel only. At a more advanced level, advanced users may be able to design their own underlying elements (possibly inheriting from system-provided underlying elements). This may be available for some underlying element types but not for others (e.g. a user may create his own design kits, but can't create his own content elements and layout elements). At an even more advanced level, users may create some or all of the underlying element types, and may also offer their creations via underlying element marketplaces (for purchase by other users) such as object marketplace 15.

Reference is now made to FIGS. 22A-22G which illustrate schematic screenshots of some of the stages in the website creation process.

Figure 22A:
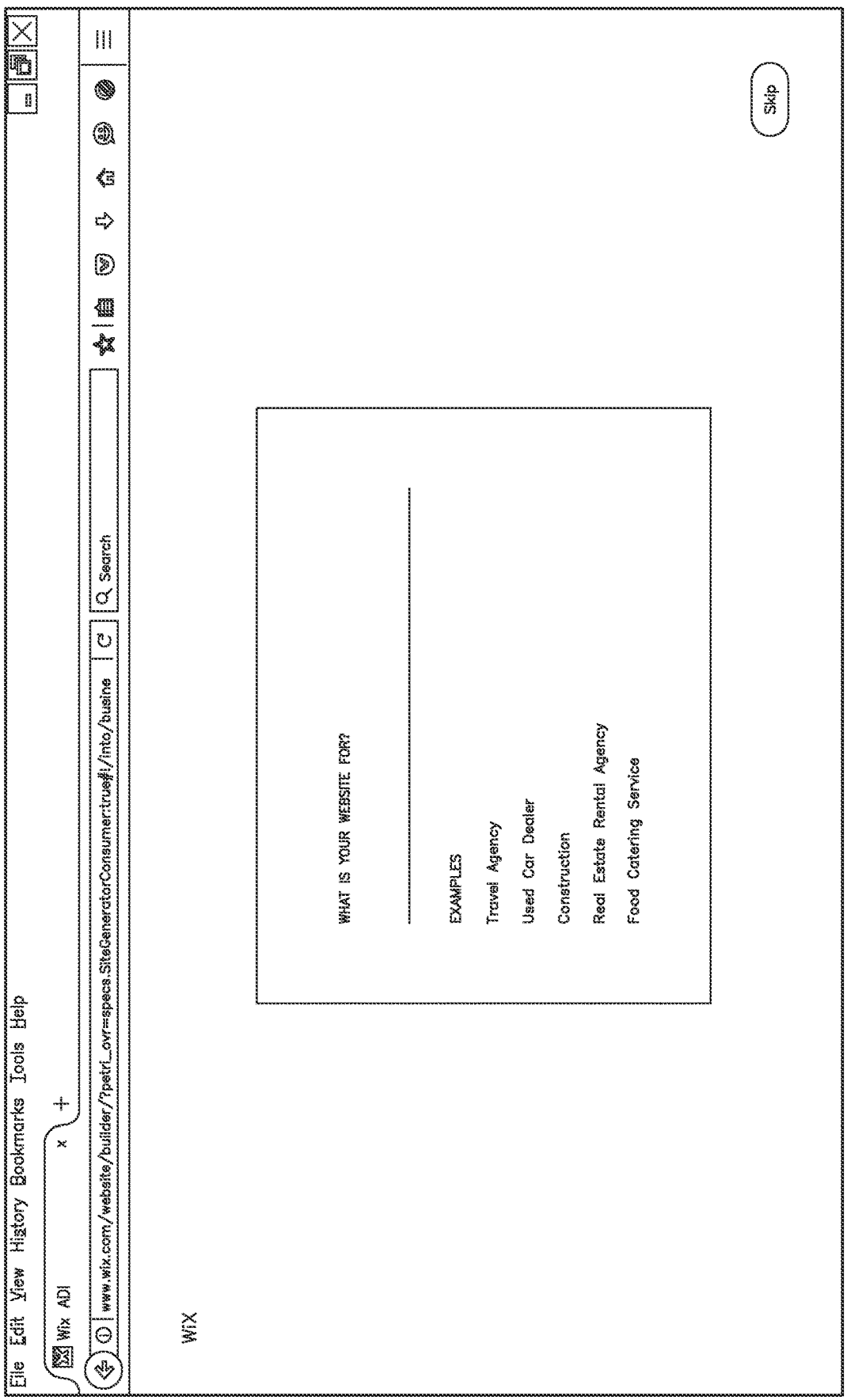
FIGS. 22A-22G are schematic illustrations of the website creation process of the system of FIG. 1, constructed and operative in accordance with the present invention.

FIG. 22A illustrates the display of a list of example business types, and allowing the user to select from them or type a free text business type description.

Figure 22B:
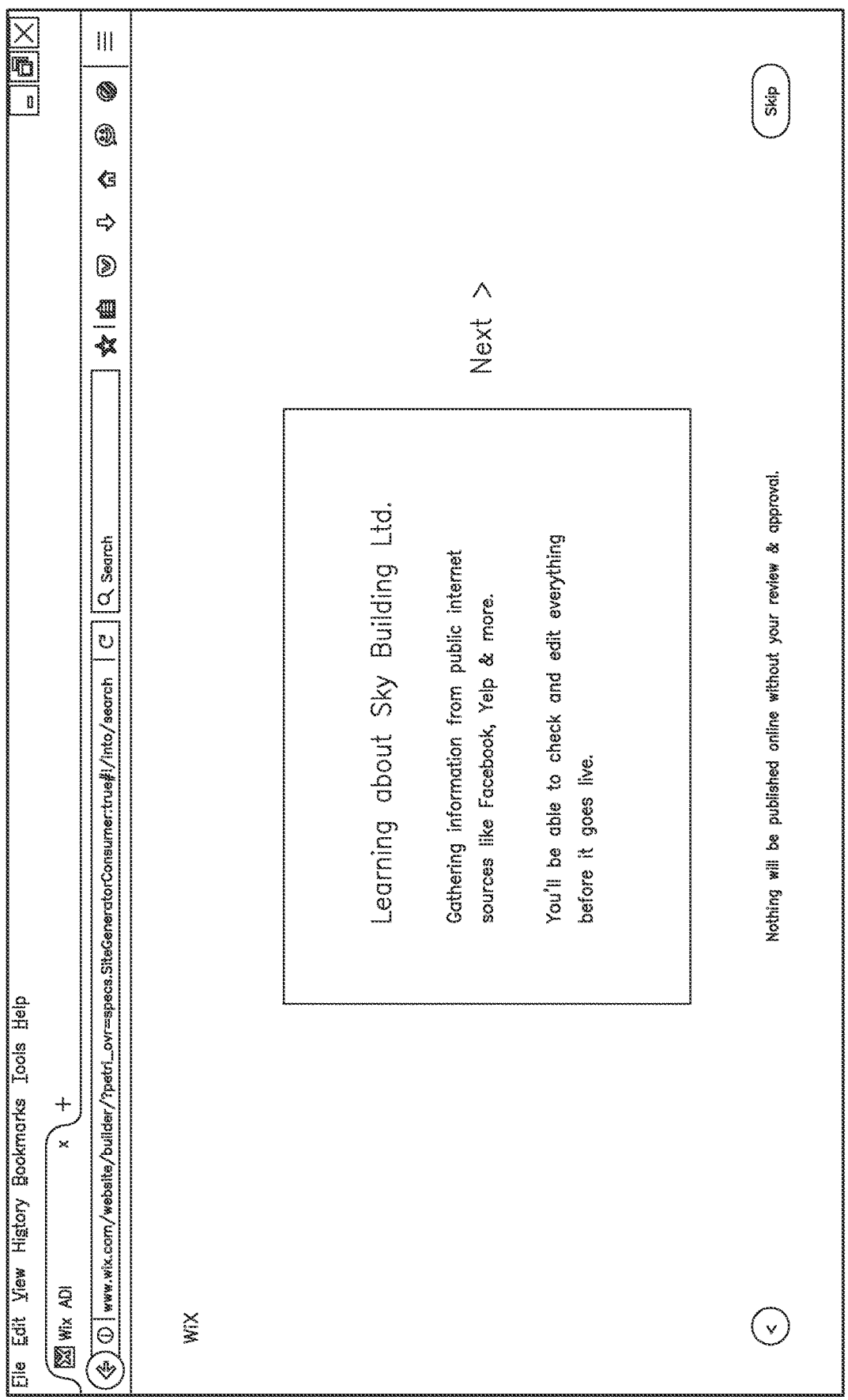

FIG. 22B illustrates how system 100 gathers information from public sources about the business.

Figure 22C:
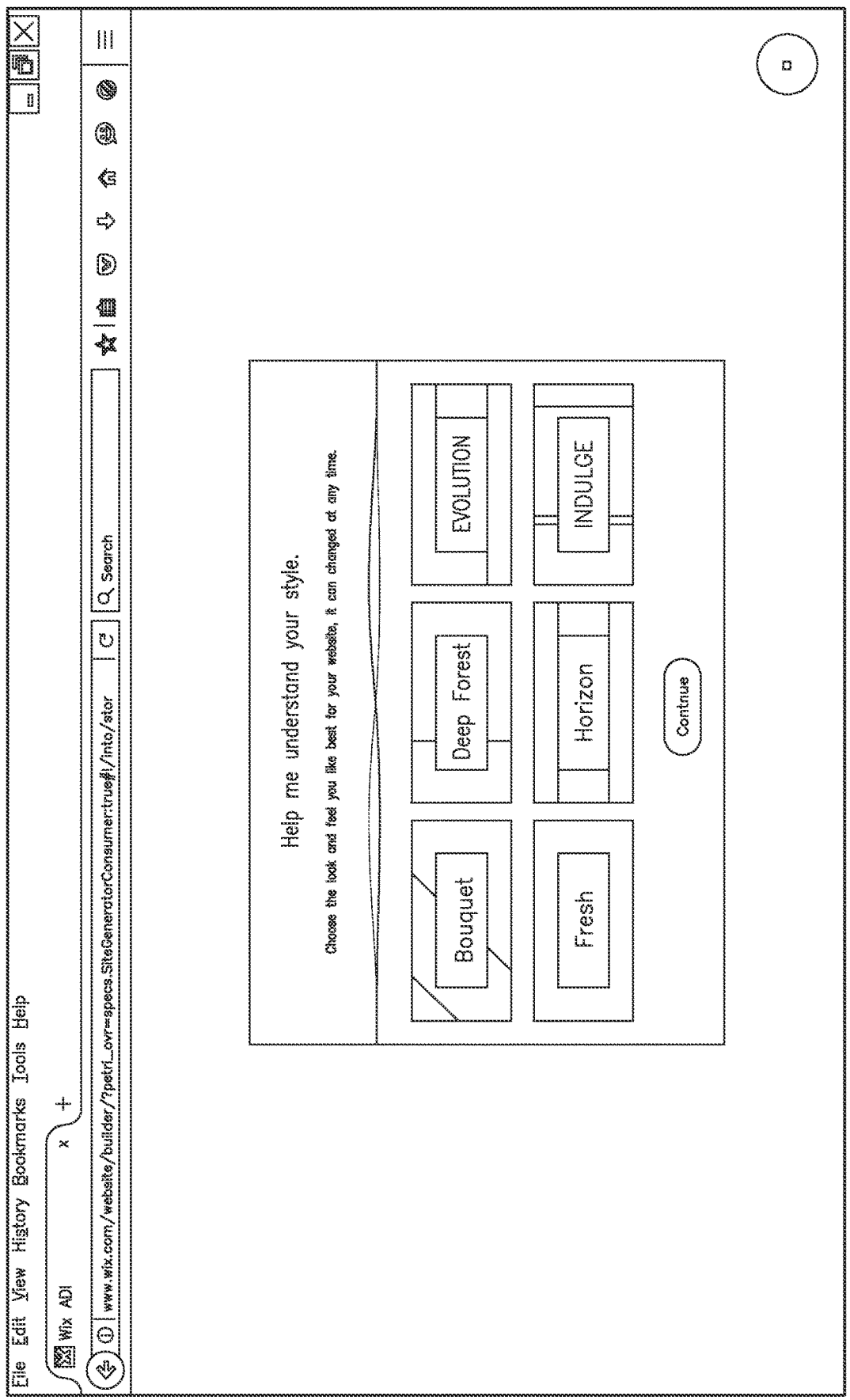

FIG. 22C illustrates how the user is prompted to select a design kit for the site.

Figure 22D:
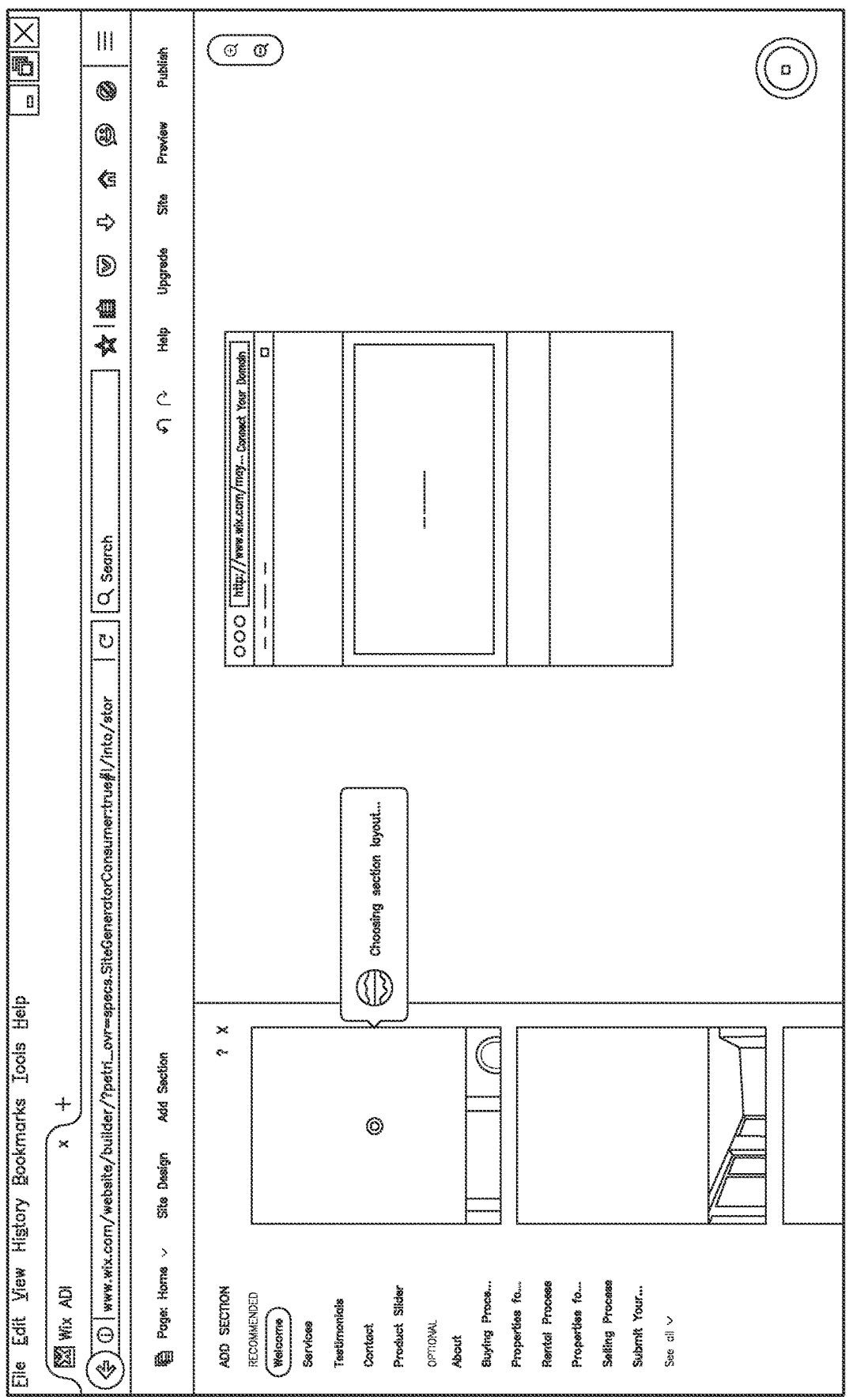

FIG. 22D illustrates how the user is prompted to select a section layout for the site.

Figure 22E:
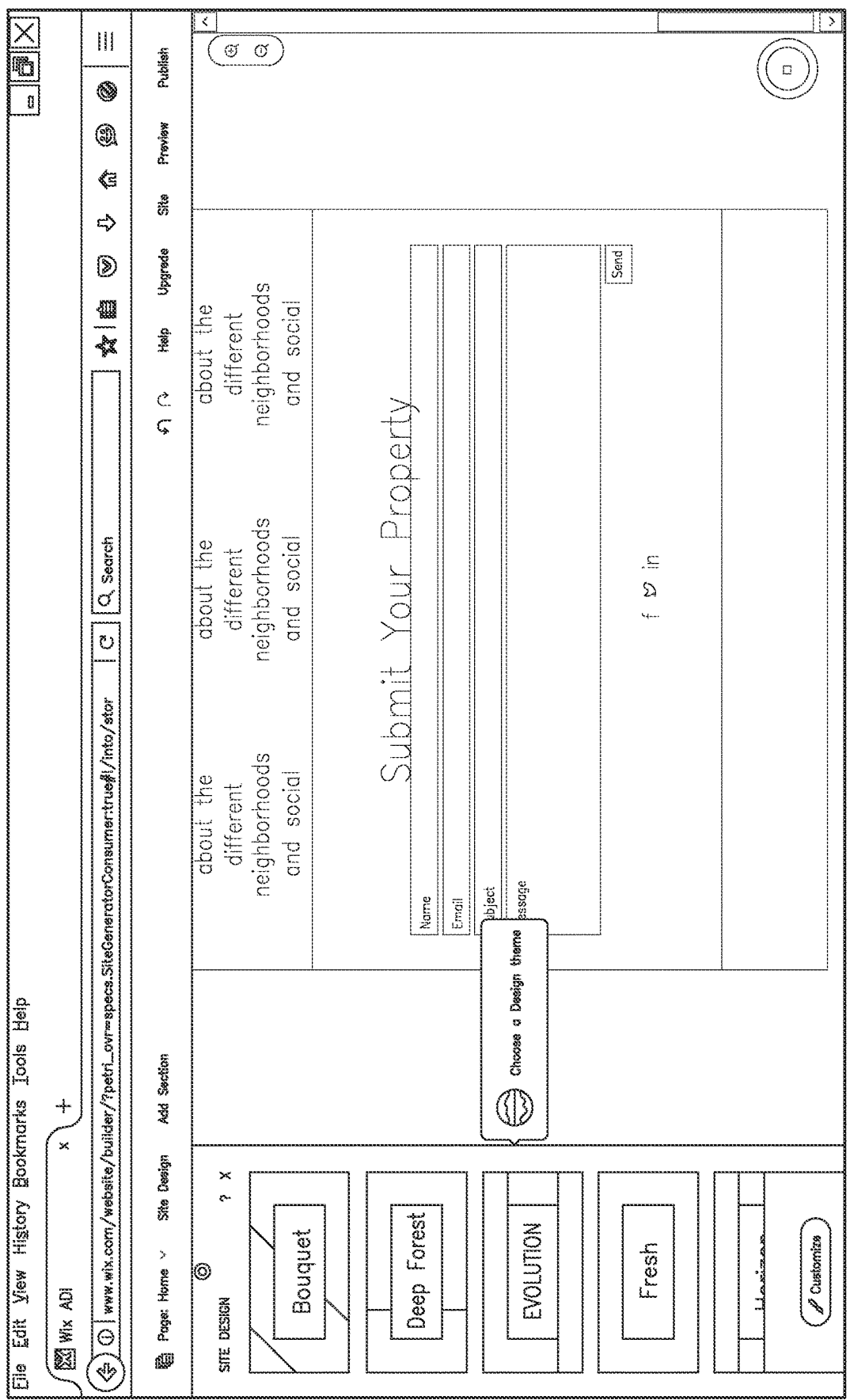

FIG. 22E illustrates how the user selects a new design kit.

Figure 22F:
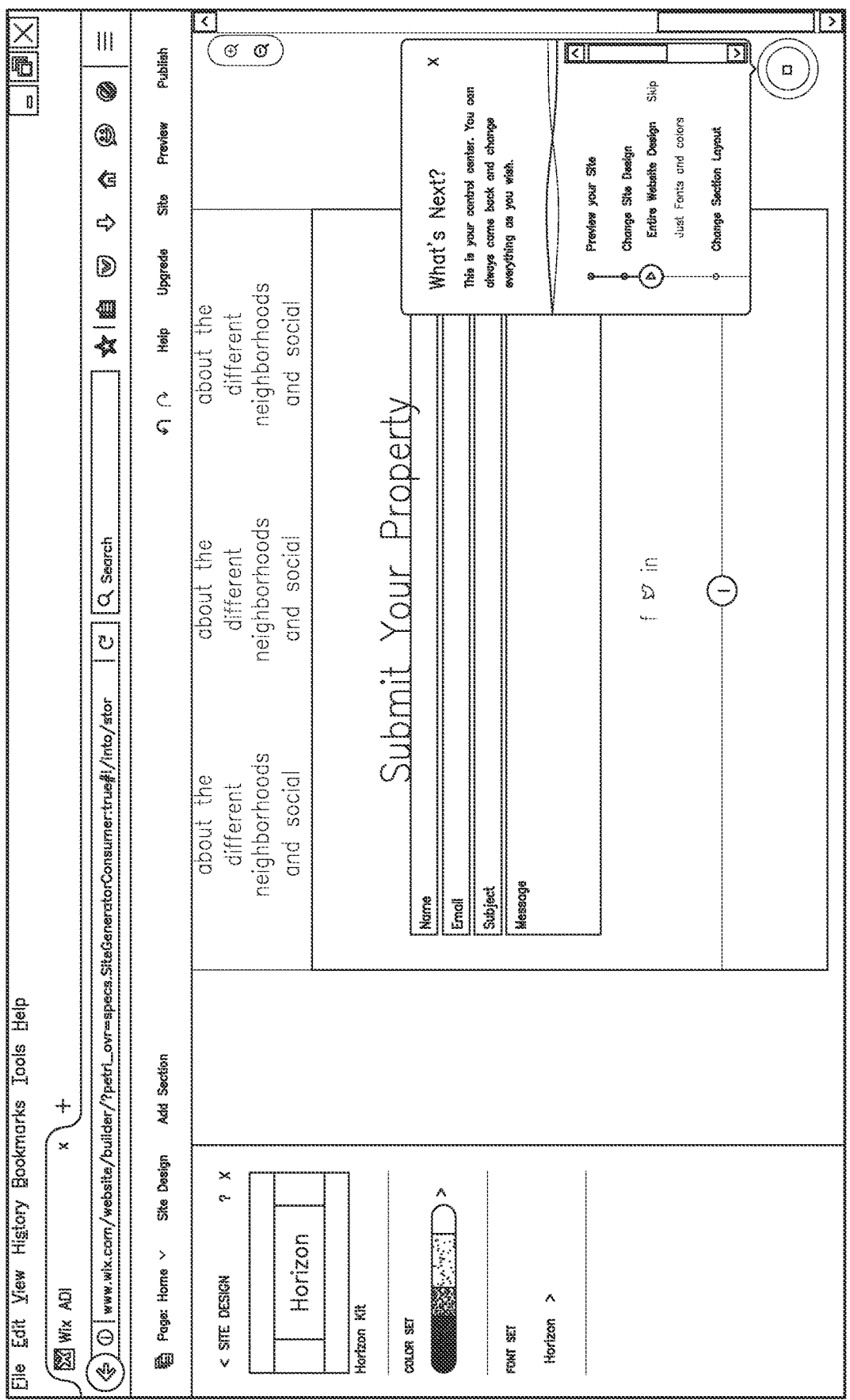

FIG. 22F illustrates how the user chooses to perform color customization with a prompt showing a list of possible color sets.

Figure 22G:
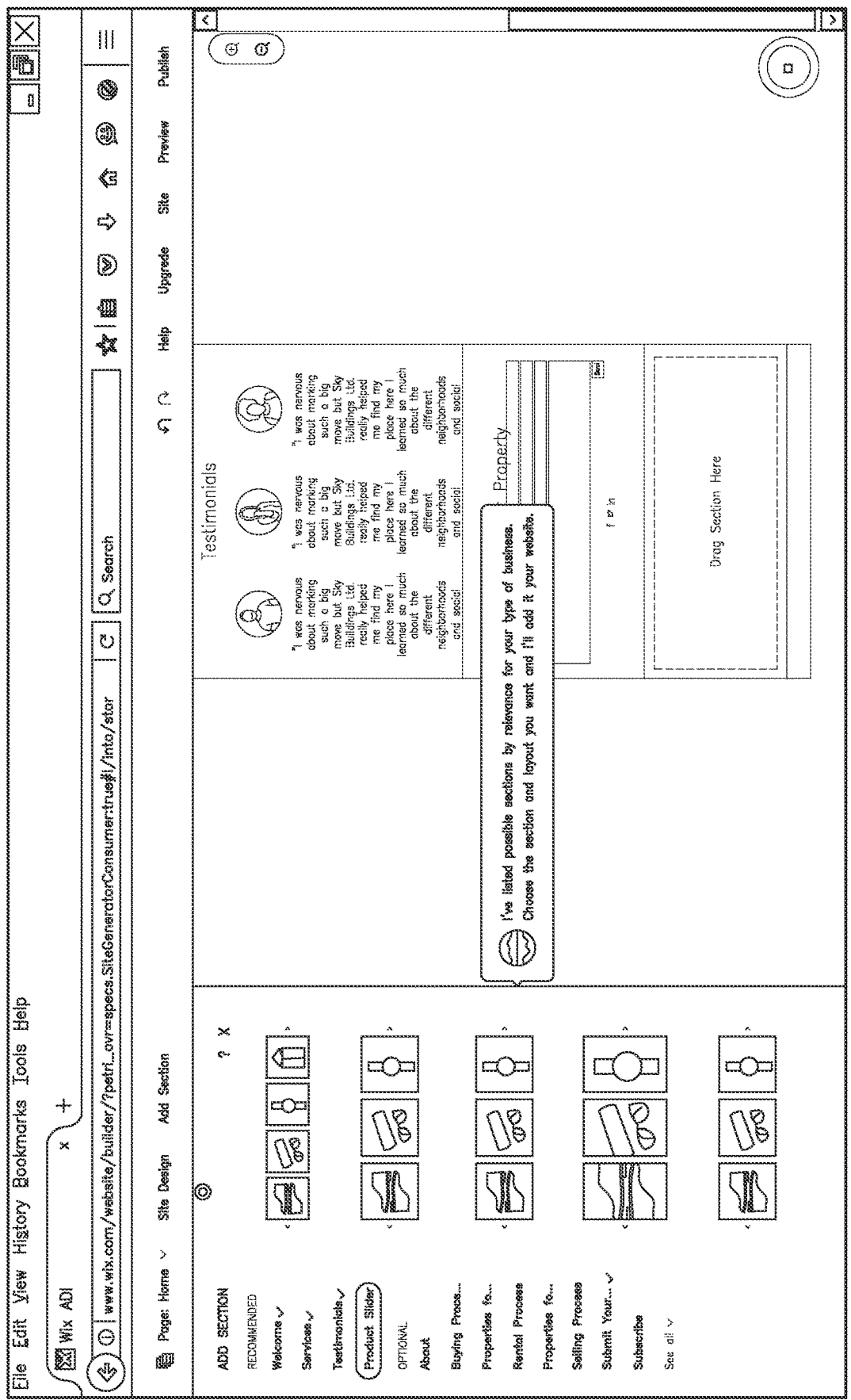

FIG. 22G illustrates how the user chooses to add a product slider (i.e. product display gallery component) section.

In an alternative embodiment to the present invention, the workflow may be divided between the user and a professional designer (or studio). In this scenario, site designer 62 may fill in site design form(s) to specify the information for the site. This process could include the full set of questionnaires needed to build CER 506, or a subset of this set (to be completed later).

The filled CER 506 is sent to a professional designer who uses site generation system 40 to create the possible layout solutions, select the best one and further fine-tune the generated site (e.g. by select alternative layout elements and arrangements at various levels). The final site is then returned to the site designer 62 for review and publishing.

The professional designer could be (for example) a site designer 62, an external designer providing design services to site designer 62 or an in-house designer employed by the organization of site designer 62. On-going maintenance of the created site may be performed by the original (ordering) site designer 62 or the designer.

In yet another embodiment, system 100 may be used by professional designers (or design studios) to quickly create a large number of template applications (or application elements) for use by less sophisticated designers. Such professional designers may be website building system vendor employees or external designers.

The professional designer may sell or otherwise distribute the generated websites, to be used as template by another designer who may customize them to create their own specialize website.

It will be appreciated that the professional designer may distribute the created template websites as "stand alone" websites, defined as collections of pages and components and completely disconnected from the site generation system described herein. The professional designer may also distribute the site together with the associated CER 506 and LER 507 allowing the less sophisticated designer to use the template and modify it through site generation system 40.

In the latter scenario, site generation system 40 may implement a 2-level CER 506/questionnaire system, so that the professional designer may access and answer all of the questionnaires, but allow the less sophisticated designers (who use the template) to access only a subset of questionnaires.

In a further embodiment, system 100 may be used as a translation or adaptation platform. It will be appreciated that system 100 may be used to create sites which may support multiple layouts adapted to multiple languages. It is well known that the same text can have vastly different attributes (such as length, height and maximal single word size) in different languages, and these different attributes may require the use of different page layouts. Such different layouts may have a completely different look and feel, e.g. one language may use a 2 column layout and another language may use a 3 column layout.

System 100 may also support the creation of such multi-layout translated websites by providing a number of features including the extraction of a translation kit containing all relevant text strings and association to their place in the website. Such a translation kit could be easily sent to a translation service which may create a translated version of the extracted text.

System 100 may also re-integrate the processed translation kit into the website by supporting having multiple (per language) versions for each content element or each translatable text field, so that multiple versions of the text can be stored in parallel.

System 100 may also apply different layout elements to some content elements so as to support different per-language layout, create different versions of the same website (having different layouts) while still keeping just one copy of the non-translated data and support repeating the processes above on an incremental basis, so that updated versions of a given site can be translated as well.

It will be appreciated that the discussion herein above, has focused on websites hosted by the website building system provider (which implements the system). However, system 100 may be implemented with additional types of websites and other non-web digital creations. These may include, for example, the following (or any combination thereof): full websites and website sections (e.g. a subset of the website's pages) or sections of one or more website pages, websites designed for regular desktop computer viewing, mobile websites and tablet-oriented websites, websites created by a website building system but hosted in a different manner (e.g. not by the website building system vendor) and websites running locally on a local server installed on the user's machine. These may include (for example) websites serving as a UI and hosted within other systems (including embedded systems and appliances).

Other types of websites and other non-web digital creations may also include websites or other displayed visual compositions hosted within larger systems, including (for example) pages hosted within social networks (such as Facebook), blogs, portals (including video and audio portals which support user-customizable page such as YouTube channels) etc. This may include other types of remotely accessible on-line presence which are not regarded as a website.

Other types of websites and other non-web digital creations may also include interactive (mobile or otherwise) applications, including hybrid applications (which combine locally-installed elements with remotely retrieved elements) and non-interactive digital creations, such as e-mails, newsletters and other digital documents.

It will also be appreciated that the discussion above applies to source websites (including other on-line digital resources) that are accessed or otherwise reviewed or analyzed by external data gatherer 43 and internal data gatherer 44 (such as when gathering information for content element types or actual content elements). The discussion also applies to target websites (including and other digital creation) generated by the site generation system 40.

As discussed herein above, source data may also be extracted from various industry directories and information services. Such resources may not be relevant as target site platforms, although system 100 may submit CER-based information to such directories and services as discussed herein above It will be further appreciated that both source and target websites (or other creations/resources) may reside on the same website building system hosting system 100, or may reside on a separate website building system (on non-website building system) hosting providers.

Regarding source websites and resources (analyzed to gather information for the user website), system 100 may support the use of resources from all of the sources above, including those belonging to the user itself, as well as those belonging to other users (as part of the crowd-sourced information gathering as described herein above).

Figure 23:
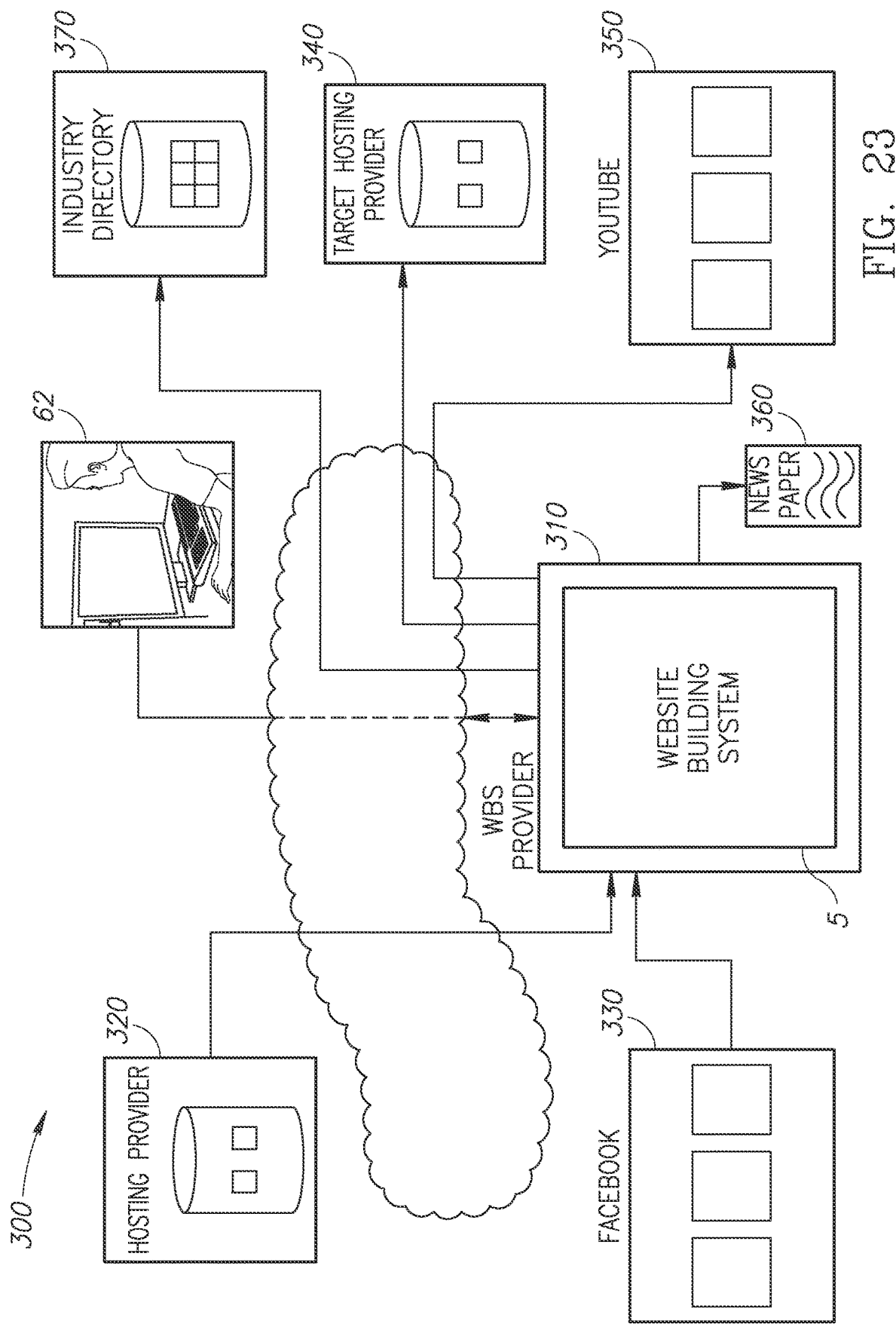
FIG. 23 is a schematic illustration of multiple source and target options for the system of FIG. 1, constructed and operative in accordance with the present invention.

Reference is now made to FIG. 23 which illustrates a system 300 which includes multiple source and target options for website building system 5. System 300 may be included in the offering provided by a given website building system provider 310 and may import and analyze information from multiple sources (including websites hosted by website building system provider 310 or by hosting provider 320 as well as Facebook pages on the Facebook site 330). It will be appreciated that some of the resources (on hosting provider 320 and Facebook site 330) may belong to site designer 62, and some to other users (i.e. other site owners).

In this scenario, site generation system 40 may generate a website hosted by WBS provider 310 or on by target hosting provider 340 (identical to or different from hosting provider 320 which may be used for imported and analyzed sites), and generate in parallel a YouTube channel page to be posted to the YouTube servers 350.

In addition, system 300 may update an industry directory 370 and also allow site designer 62 to generate a printed newspaper 360.

In yet another embodiment, system 100 may use off-line printed information of the business (for which the website is being built) to extract data about the business (and pre-fill some content elements). This could include the business card of the business employees, brochures, leaflets and other promotional material (as well as non-promotional material such as manual or training guides). Any such off-line material which contains the business contact information and details may be useful. This could be done (for example) using a scanner, or through a mobile device camera used (for example) to photograph the business card and the images may be stored in CER 506.

Thus system 100 may allow a user to build a system to generate a component based website that is integrated with a visual editor. The component based website may be based on layout solutions that are offered to the user for selection which are created from information gathered from the analysis of the answers received from a user questionnaire together with related gathered information about the user from external and internal sources and general crowd sourcing and artificial intelligence based on the user's industry and family types to establish preferred layouts.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for a website building system (WBS), said method being performed by a hardware processor, said method comprising:
   storing in at least one database, content elements having types, layout elements having types, WBS components of websites of users of said WBS and preferences for at least presentation and aesthetics for websites of users of said WBS;
   gathering related information on a user of said WBS building a new website according to answers to at least one questionnaire and available industry identifying information;
   analyzing content, aesthetics and layout elements of other users of said WBS at least within said industry according to said related information and generating at least one of: at least one industry layout element having industry-preferred aesthetics for said industry, an element-based website of said user and improved question types for questionnaires;
   using artificial intelligence and machine learning techniques to determine preferred layout solutions for said new website according to the output of said analyzing and said preferences;
   generating multiple layout solutions for elements of said new website according to the output of said artificial intelligence and machine learning techniques and offering said multiple layout solutions to said user;
   receiving from said user a user selected layout; and
   generating said new website from said user selected layout.

2. The method according to claim 1 wherein said generating said new website also comprises creating at least one of: content element types, layout element types, and questionnaire types.

3. The method according to claim 1 wherein types of said layout-related elements comprise of at least one of: a layout element, a layout group and a preset page section.

4. The method according to claim 1 wherein said gathering comprises:
   gathering said related information from general user related sources and resources external to said website building system; and
   gathering said related information from within said website building system.

5. The method according to claim 4 wherein said gathering said related information from external user and other general user related sources and resources comprises:
   importing said related information from relevant social media sites;
   extracting and importing said related information from data feeds;
   importing and analyzing the relevance of said related information from external websites; and
   matching between extracted and analyzed said related information and content element fields.

6. The method according to claim 5 also comprising:
   importing offline documents relevant to said related information; and
   analyzing the relevance of said offline documents.

7. The method according to claim 4 wherein said gathering said related information from within said website building system comprises at least one of:
   analyzing general user information stored by said website building system while maintaining user privacy;
   analyzing general business information stored by said WBS; and
   analyzing editing history of said user.

8. The method according to claim 1 wherein said generating multiple layout solutions comprises:
   generating multiple layout solutions from predefined layout elements, industry family related site structure, industry related media and a design kit.

9. The method according to claim 1 and further comprising providing direct creation and editing of sites using at least one of:
   invoking a component editing interface when said user edits the layout of said components;
   invoking list editing operations for list-oriented changes; and
   reapplying said user edits to said generated new website or site area.

10. A website building system (WBS), said WBS comprising:
- a memory;
- a hardware processor;
- at least one database, stored in said memory, storing content elements having types, layout elements having types, WBS components of websites of users of said WBS and preferences for at least presentation and aesthetics for websites of users of said WBS;
- a data gatherer running on said hardware processor to gather related information on a user of said WBS building a new website according to answers to at least one questionnaire for a user and available industry identifying information;
- at least one analyzer running on said hardware processor to analyze content, aesthetics and layout elements of other users of said WBS at least within said industry according to said related information and generating at least one of: at least one layout element having industry-preferred aesthetics for said industry, an element-based website of said user and improved question types for questionnaires;
- a machine learner running on said hardware processor using artificial intelligence and machine learning techniques to determine preferred layout solutions for said new website of said user according to the output of said at least one analyzer and said preferences;
- a layout solution handler running on said hardware processor to generate multiple layout solutions for elements of said new website according to the output of said machine learner, to offer said multiple layout solutions to said user and to receive from said user a user selected layout; and
- a site generation system running on said hardware processor to generate said new website from said user selected layout.

11. The system according to claim 10 wherein said site generation system also comprises an element type creator to create at least one of:
- content element types, layout element types and questionnaire types.

12. The system according to claim 10 wherein types of said layout-related elements comprise of at least one of: a layout element, a layout group and a preset page section.

13. The system according to claim 10 wherein said data gatherer comprises:
- an external data gatherer to gather said related information from user related sources and resources external to said website building system; and
- an internal data gatherer to gather said related information from within said website building system.

14. The system according to claim 13 wherein said external data gatherer comprises:
- a social media importer to import said related information from relevant social media sites;
- a data feed importer to extract and import said related information from data feeds;
- an external website importer and analyzer to import and analyze the relevance of said related information from external websites; and
- a data matcher to match between extracted and analyzed said related information and content element fields.

15. The system according to claim 14 also comprising:
- a document importer to import offline documents relevant to said related information; and
- a data analyzer to analyze the relevance of said offline documents.

16. The system according to claim 13 wherein said internal data gatherer comprises at least one of:
- an additional user data analyzer to analyze general user information stored by said website building system, said additional user data analyzer having a privacy maintainer to maintain user privacy;
- a BI (business intelligence) analyzer to analyze general BI information stored by said website building system; and
- an editing history analyzer to analyze editing history of said user.

17. The system according to claim 10 wherein said layout solution handler comprises:
- a layout solution generator to generate multiple layout solutions from pre-defined layout elements, industry related site structure, industry related media and a design kit; and
- a layout solution presenter to present said multiple layout solutions to said user for selection.

18. The system according to claim 10 and further comprising at least one of:
- a place editor running on said hardware processor to invoke a component editing interface when said user edits the layout of said components;
- a list change handler running on said hardware processor to invoke list editing operations for list-oriented changes; and
- a change reapplier running on said hardware processor to reapply said user edits said generated new website or site area.

* * * * *